(12) United States Patent
Nakao et al.

(10) Patent No.: US 6,452,650 B1
(45) Date of Patent: Sep. 17, 2002

(54) POLYMER DISPERSION TYPE LIQUID CRYSTAL DISPLAY ELEMENT, PRODUCING METHOD THEREFOR AND APPARATUS FOR USE IN THE PRODUCING METHOD

(75) Inventors: Kenji Nakao, Osaka; Shinya Kosako; Tsuyoshi Uemura, both of Kadoma; Hirofumi Kubota, Osaka; Masao Yamamoto, Kishiwada; Kazuo Inoue, Hirakata; Seiji Nishiyama, Takatsuki, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 08/934,901

(22) Filed: Sep. 22, 1997

(30) Foreign Application Priority Data

| Sep. 25, 1996 | (JP) | ............................................. 8-252592 |
| May 26, 1997 | (JP) | ............................................. 9-134977 |
| Jun. 13, 1997 | (JP) | ............................................. 9-156303 |
| Sep. 3, 1997 | (JP) | ............................................. 9-238195 |

(51) Int. Cl.$^7$ .......................................... G02F 1/1334
(52) U.S. Cl. ........................................ 349/86; 349/93
(58) Field of Search ....................... 349/86, 88, 33, 349/92, 93, 188, 189

(56) References Cited

U.S. PATENT DOCUMENTS

| 4,688,900 A | * | 8/1987 | Doane et al. ................. 349/86 |
| 5,056,898 A | * | 10/1991 | Ma et al. ....................... 349/86 |
| 5,301,046 A | * | 4/1994 | Konuma et al. ............... 349/93 |
| 5,680,185 A | * | 10/1997 | Kobayashi et al. ........... 349/88 |
| 6,067,135 A | * | 5/2000 | Shimizu et al. ............... 349/86 |

FOREIGN PATENT DOCUMENTS

| JP | 5-80302 | 4/1993 |
| JP | 7-181454 | 7/1995 |
| JP | 2-48398 | 9/1996 |

* cited by examiner

Primary Examiner—William L. Sikes
Assistant Examiner—Tai V. Duong
(74) Attorney, Agent, or Firm—Parkhurst & Wendel, L.L.P

(57) ABSTRACT

A polymer dispersion type liquid crystal display element according to the invention is structured such that a complex of polymer and liquid crystal droplets is held between a pair of substrates. The liquid crystal droplets are deformed into a compressed structure of their being contracted in a cell gap direction and an amount of deformation of the liquid crystal droplets is set to be in range in which a phenomenon of liquid crystal molecules rising up in the cell gap direction is not caused by excluded volume effects of the liquid crystals. This construction that the amount of deformation of the liquid crystal droplets is set to be in range in which the phenomenon of liquid crystal molecules rising up in the cell gap direction is not caused by excluded volume effects of the liquid crystals can provide an increased tendency of the liquid crystal molecules to align in parallel to a phase boundary of the substrates. As a result of this, the polymer dispersion type liquid crystal display element having excellent threshold characteristics and scattering characteristics and high display characteristics can be achieved.

11 Claims, 31 Drawing Sheets

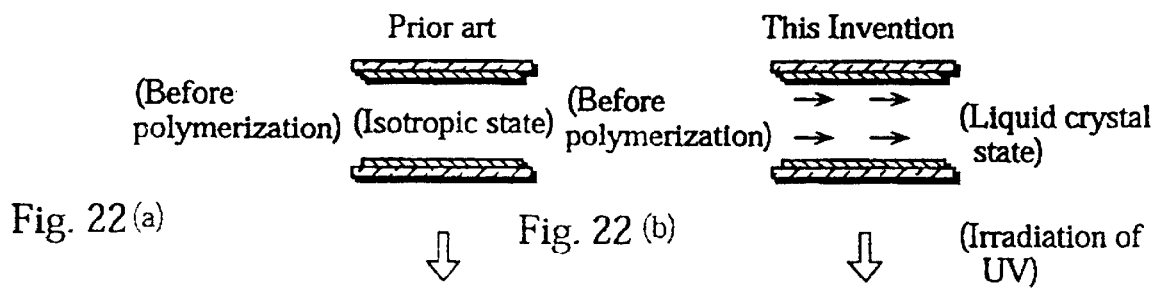
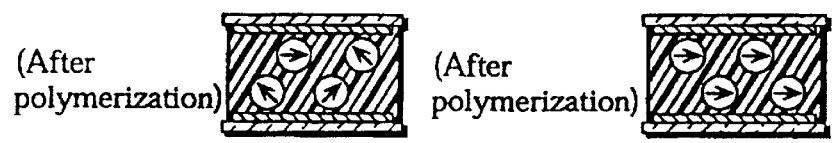
Fig. 22(a)  Fig. 22(b)
Fig. 23
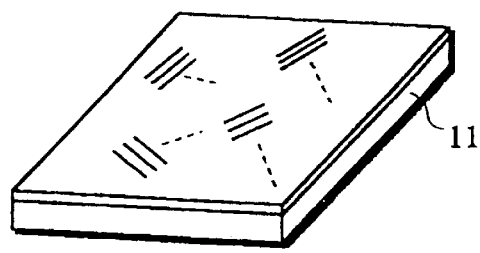
Fig. 24
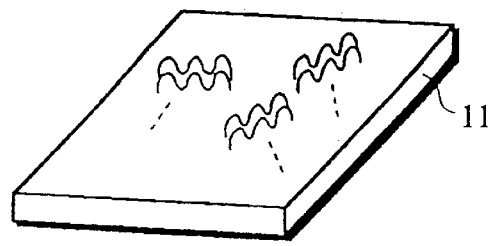

Fig. 29
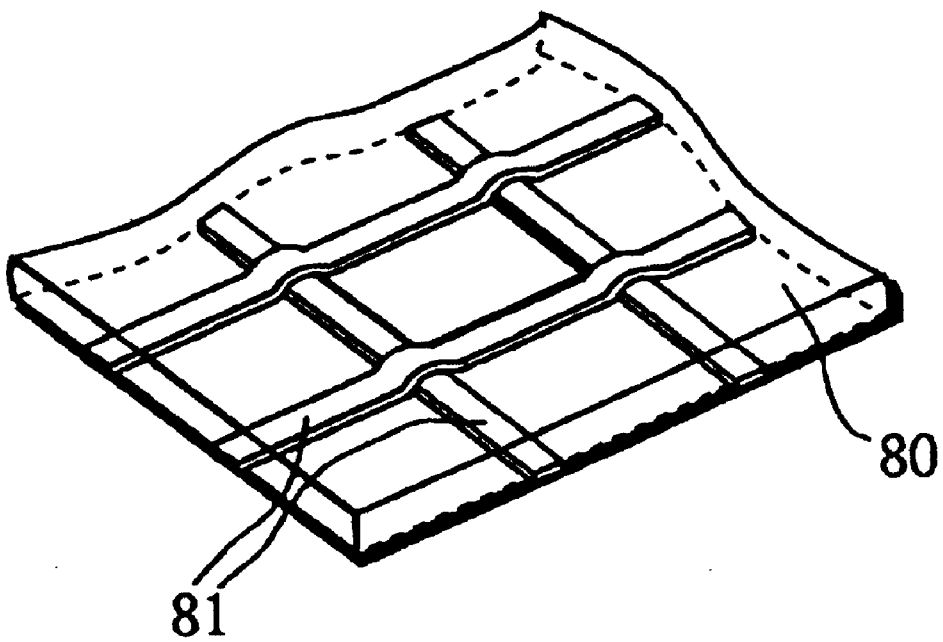
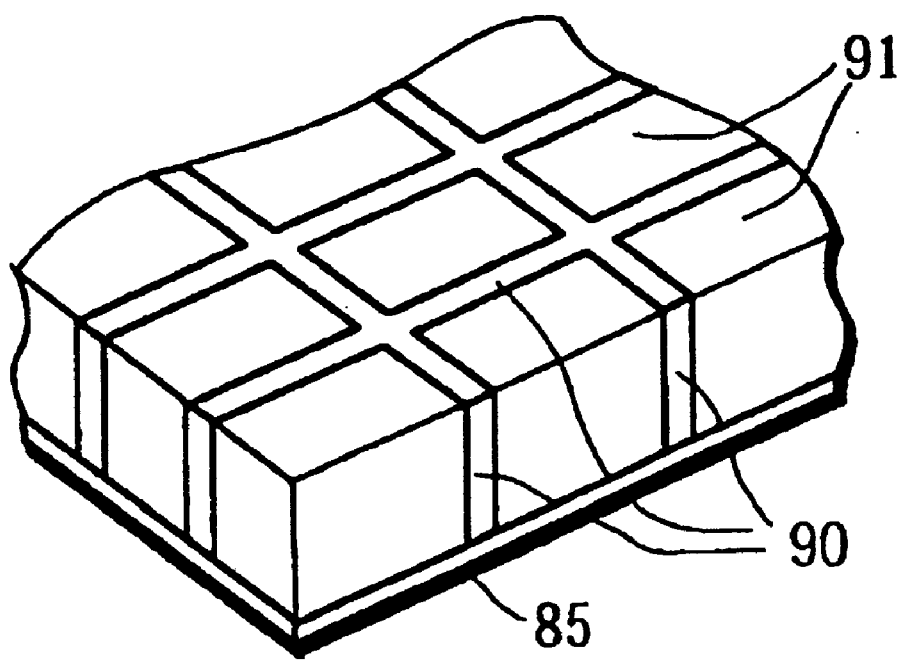

Fig. 35
Fig. 35 (a)
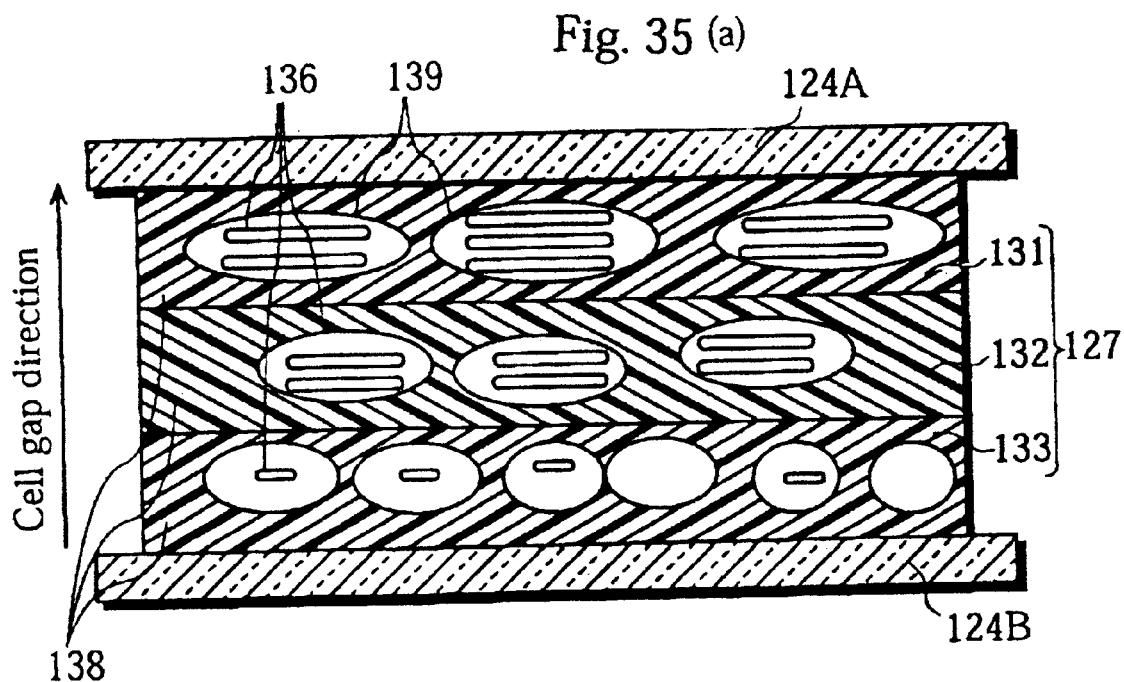
Fig. 35 (b)
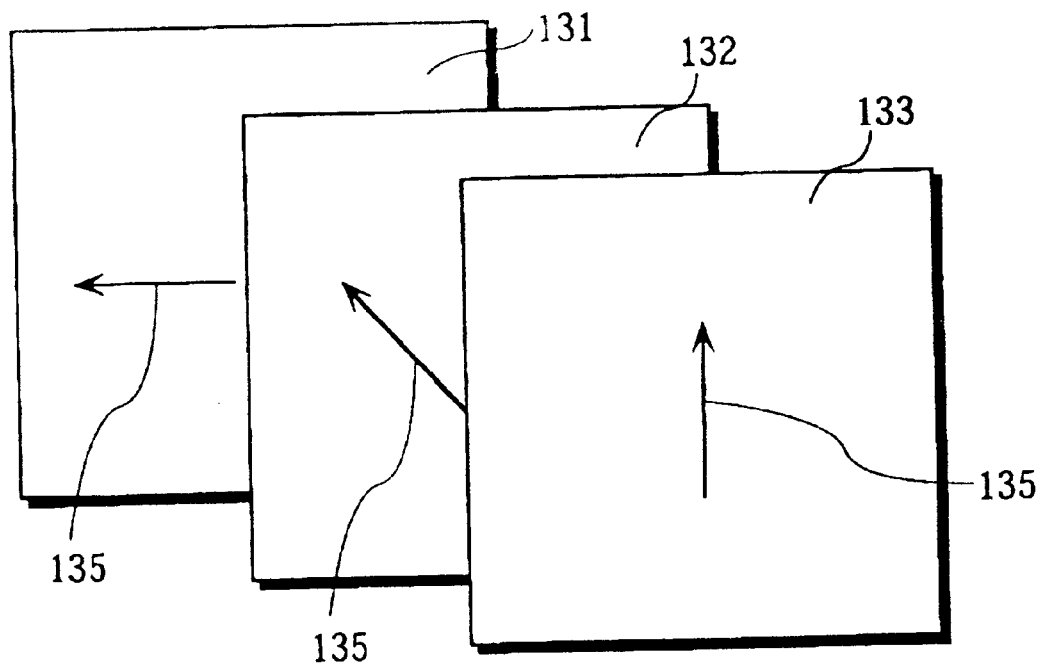

POLYMER DISPERSION TYPE LIQUID CRYSTAL DISPLAY ELEMENT, PRODUCING METHOD THEREFOR AND APPARATUS FOR USE IN THE PRODUCING METHOD

BACKGROUND OF THE INVENTION (1) Field of the Invention

The present invention relates to a polymer dispersion type liquid crystal display element of light-scattering mode, a producing method therefor and an apparatus for use in the producing method. More particularly, the invention relates to a polymer dispersion type liquid display element for use in liquid crystal televisions, computer terminals, liquid crystal projectors, and others, a producing method therefor and an apparatus for use in the producing method.

(2) Description of the Prior Art

Liquid crystal display element are widely used in various kinds of articles, including displays of wristwatches, and electronic calculators, navigation systems, notebook PCs, liquid crystal monitors, data projectors and projection liquid crystal TVs, taking advantage of their characteristics of low-profile, compact size, low voltage drive, and low power consumption. Among display modes of the liquid crystal display element, the TN (Twisted Nematic) mode is widely used, in which a liquid crystal display element having a structure of liquid crystal molecules being twisted at 90° below and above between two opposing, upper and lower substrates is held by two polarizers. The STN (Super Twisted Nematic) mode of liquid crystal display element designed to improve a time-division drive characteristic of the TN mode is also wisely used in, for instance, word processors for Japanese characters. Recently, information equipment is in actual use using ferro-electric liquid crystals, in which liquid crystal molecules are changed in alignment by means of spontaneous polarization of the liquid crystal molecules and the resultant electro-optical effects are used for displays.

These liquid crystal display element, however, require at least one polarizer, so that they involve the problems of darkness, necessity of alignment phase treatment and difficulties in controlling cell gap.

On the other hand, a different mode of liquid crystal display element has been proposed according to which the polarizer is no longer required for the liquid crystal display element, and the liquid crystal molecular alignments are controlled by electric field to produce an opaque state or a transparent state. In this mode of liquid crystal display element, a complex of liquid crystals and transparent polymers is held between two substrates and an ordinary ray refractive index of the liquid crystal molecules with anisotropy in positive dielectric constant is adapted to match with a refractive index of the transparent polymers. When a voltage is applied to allow the major axes of the liquid crystal molecules to be aligned in parallel with the electric field, to match the refractive index of the liquid crystal molecules with refractive index of the transparent polymers, the scattering of light does not occur at the phase boundary to thereby produce the transparent state. On the other hand, while no voltage is applied thereto, the liquid crystal molecules are being oriented in different directions and their refractive index does not match with that of the transparent polymer at the phase boundary between the liquid crystal and the transparent polymer, so that the light scattering occurs to produce the opaque state. With the aid of this phenomenon, the opaque state or the transparent state is produced.

A representative example of this mode is what is called NCAP (Nematic Curvilinear Aligned Phase) in which nematic liquid crystals are micro-encapsulated with polyvinyl alcohol or equivalent (Fine Particles and Industry, Vol. 22, No. 8 (1990)).

Further, there is another mode called PDLC (Polymer Dispersed Liquid Crystals) in which liquid crystal fine droplets are dispersed in polymer matrix (Flat Panel Display '91, on page 219, published by NIKKEI BP).

Also, there is a still another mode called PNLC (Polymer Network Liquid Crystals) having a structure of resins spreading in a continuous phase of liquid crystals in the form of a three dimensional network (Engineering Laboratory Report from Electric Information Institute, EID89-89, on page 1).

The complex of the liquid crystals and the transparent polymers are generally called as polymer dispersion type liquid crystals.

Typically, the method of producing the complex of the liquid crystals and the polymers includes the steps of: injecting a mixed composition, into which uncured resin monomers, such as ultraviolet curing acrylic or epoxy resins, and liquid crystal materials are dissolved, in between two substrates; and irradiating the mixed composition with ultraviolet to polymerize the resin monomers to produce a phase separation of the liquid crystals and the resins. This yields the structure of the liquid crystals being dispersed in the polymers or the structure of the polymer spreading in the liquid crystals in the form of network (Flat Panel Display '91, on page 219, published by NIKKEI BP, and Engineering Laboratory Report By Electric Information Institute, EID89-89, on page 1, for example).

Some examples of this polymer dispersion type liquid crystal are disclosed by Japanese Laid-Open Patent Publications No. Hei 5(1993)-80302 and No. Hei 7(1995)-181454, in which in order to improve scattering effects of the complex of the liquid crystals and polymers with respect to light, the liquid crystal droplets are deformed or compressed to have a flat plate-like shape in section (i.e., the length vertical to the substrates is smaller than the length parallel with the substrates). Specifically, the Japanese Laid-Open Patent Publication No. Hei 5(1993)-80302 discloses that flat plate-like liquid crystal droplets are formed by being pressed under conditions of heating and that it is preferable that the flat liquid crystal droplets have a compression rate (deformation ratio) of 1.2 to 5.0 (which equates to 20 to 80 on a deformation rate basis, as mentioned later). The Japanese Laid-Open Patent Publication No. Hei 7(1995)-181454 discloses that flat plate-like liquid crystal droplets are formed by being pressed while being irradiated with ultraviolet and that it is preferable that the liquid crystal droplets are deformed to have a thickness of ½ of a length in section; in practice, the liquid crystal droplets are deformed at the rate of about ½ to ¼ (which equates to 50 to 75 on a deformation rate basis, as mentioned later).

It is said that forming the liquid crystal droplets into flat plate-like shape provides advantages of increasing steepness and decreasing hysteresis.

Our study has proved, however, that when the liquid crystal droplets are deformed at the compression rate of 1.2 or more (which equates to 20 on a deformation rate basis, as mentioned later), as in the conventional examples mentioned above, deterioration in display characteristics such as reduction of contrast occurs, rather than improvement.

Further, according to Japanese Laid-Open Patent Publication No. Hei 5(1993)-80302, after the compressing process of the liquid crystals, the mixture is not subjected to any polymerization process. Due to this, the liquid crystal display element after compressed remain in the state in which polymerization reaction of the resin monomers immediately before compression is not yet completed and thus are incompletely cured. Hence, the compressing effects are relaxed with the passage of time, to cause the problem that the compressed liquid crystal droplets gradually return to their original before-compressed state. On the other hand, an attempt to prevent the relaxation of the compression effects after compression in the case where the mixture is not subjected to any polymerization process after the compressing process of the liquid crystals requires that the liquid crystal droplets are compressed in a state in which the polymerization of the resin monomers is completely concluded or is almost completely concluded. However, this disadvantageously needs much time for compression.

In this respect, according to Japanese Laid-Open Patent Publication No. Hei 7(1995)-181454, the mixture is polymerized after the compression of the liquid crystals, and as such solves the problem that the compressed liquid crystal droplets gradually return to their original before-compressed state as well as the problem that much time is needed for compression. However, with this prior art, since the two steps of polymerization are performed either by the photo polymerization with ultraviolet or by the thermal polymerization by heating, another problems are arisen as described below.

In the case where the two steps of polymerization are both performed by the photo polymerization with ultraviolet, even when the polymerization reaction of the resin monomers is desired to be, for example, 80% complete of the entire in the course of the polymerization before the compressing process, to allow for the compressing process of the liquid crystals, it is difficult to realize such a desired state, and variations in the degree of progress of the polymerization reaction may be caused for each of the liquid crystal cells. This is because the progress of the polymerization depends on the time for irradiation of ultraviolet as well as because the polymerization reaction can progress in a very short time. Thus, the variations in degree of progress of the polymerization reaction produce the variations in deformation ratio of the liquid crystals after the compressing process.

With this prior art, the degree of progress of the polymerization reaction has a strong influence on the compressing, particularly because the deformation ratio (compression rate) is very large. This causes the problem that the variations in deformation ratio caused by the variations in degree of progress of the polymerization reaction may exceed a tolerance to decrease the reliability of the liquid crystal display element. On the other hand, an attempt to increase the reliability of the liquid crystal display element results in reduction of manufacturing profits; increase of troublesome works; and an increase of manufacturing costs.

Further, in the case where the two steps of polymerization are both performed by the thermal polymerization, the polymerization reaction progresses slowly, so that variations in degree of progress of the polymerization reaction are not so greater than those by the photo polymerization, but nevertheless, in view of the deformation ratio being too great, the same problems as those in the case with the photo polymerization may be caused.

The polymer dispersion type liquid crystal display element, capable of eliminating the need for polarizers, have excellent characteristics of solving the problems of darkness, necessity of alignment phase treatment and difficulties in controlling cell gap, on the one hand, but have a disadvantage of possible deterioration in contrast on the other hand. Accordingly, the polymer dispersion type liquid crystal display element are being desired to have an improved contrast.

It is the key to improvement of contrast how the scattering of light should be produced while a voltage is not applied to electrodes between which the liquid crystals are sandwiched. It is now under discussion on how to increase cell gap or anisotropy $\Delta n$ in dielectric constant in order to produce a full scattering of light.

Various approaches to increase the anisotropy $\Delta n$ in dielectric constant have been proposed so far, but because of the limitations of liquid crystal materials and the like, none of them have succeed in providing satisfactory results.

With the approach to increase the cell gap, the number of scattering of light can be increased to an extent of the expansion of the cell gap, to ensure the scattering of light. However, the increase of the cell gap causes reduction of the electric field to be added to the liquid crystal layer for the application of the same voltage as that applied to an usual liquid crystal cell having a non-increased cell gap. Thus, an attempt to allow the liquid crystals to be oriented satisfactorily with the increased cell gap needs a larger voltage, which invites another problem of an increased voltage.

A polymer dispersion type liquid crystal display element capable of reducing a driving voltage, without any increase of the cell gap, while ensuring required contrast is disclosed in Japanese Laid-Open Patent Publication No. Hei 8(1996)-248398. In the prior art layers of polymer dispersion liquid crystal complex are laminated to form a laminated body and liquid crystal molecules in each layer of the polymer dispersion liquid crystal complex are aligned in a given direction in a plane substantially parallel with electrode surfaces. In addition, orientations of the liquid crystal molecular alignments in one layer of polymer dispersion liquid crystal complex and those in the other layer are so set as to intersect at right angles relative to each other by means of an alignment layer treatment such as a rubbing.

With this prior art of Japanese Laid-Open Patent Publication No. Hei 8(1996)-248398, the liquid crystal molecular alignments are regulated by means of the rubbing to improve the scattering effect, so only two layers of polymer dispersion liquid crystal complex can be formed. In addition, although the orientations of the liquid crystal molecules in one layer of polymer dispersion liquid crystal complex and those in the other layer are so set as to intersect each other at right angles, the liquid crystal molecules are oriented, in principle, only in two directions, when viewed from the cell gap direction, and hence it is difficult to obtain a fully satisfactory scattering of light. Besides, to begin with, the alignment treatment of the rubbing has a drawback of its requiring complex processes.

To sum up the problems of the prior art mentioned above,

① When the liquid crystal droplets are deformed at a compression rate of 1.2 or more, as described in Japanese Laid-Open Patent Publications No. Hei 5(1993)-80302 and No. Hei 7(1995)-181454, deterioration in display characteristics, such as deterioration of contrast, occurs, rather than improvement.

② An only single step polymerization, as described in Japanese Laid-Open Patent Publication No. Hei 5(1993)-80302, involves a problem that the compressing effects are relaxed with the passage of time, so that the compressed liquid crystal droplets gradually return to their original before-compressed state; or a problem that more time is needed for the compression.

Also, when the polymerization is performed in two steps either by the photo polymerization with ultraviolet or by the thermal polymerization by heating, as described in Japanese Laid-Open Patent Publication No. Hei 7(1995)-181454, the problem of decrease in reliability of the liquid crystal element is caused, on the one hand, and an attempt to increase the reliability of the liquid crystal element leads to problems of reduction of manufacturing profits, increase of troublesome works and increase of manufacturing costs, on the other hand.

③ When the liquid crystal molecular alignments are regulated by means of the rubbing to improve the scattering effect, as described in Japanese Laid-Open Patent Publication No. Hei 8(1996)-248398, it is difficult to obtain a fully satisfactory scattering of light. Also, to begin with, the alignment layer treatment of the rubbing has a drawback of its requiring complex processes.

SUMMARY OF THE INVENTION

It is accordingly an object of the present invention to provide a polymer dispersion type liquid crystal display element capable of providing improved scattering characteristics without any deterioration of display characteristics, and a producing method thereof.

Another object of the invention is to provide a polymer dispersion type liquid crystal display element capable of providing an increased steepness of the transmitted light amount with respect to voltage, to enable a passive matrix drive, and a producing method thereof.

Still another object of the invention is to provide a method for producing a liquid crystal display element which maintains compressed effects of liquid crystals for a long time to produce an enhanced reliability and an apparatus for use in the producing method.

A further object of the invention is to provide a liquid crystal display element capable of providing satisfactory scattering effects without any rubbing treatment and without any increase of a driving voltage and a producing method thereof.

The above objects are accomplished by a polymer dispersion type liquid crystal display element comprising a pair of substrates; an electrode formed on an opposite inner surface of each of the substrates; polymers; liquid crystal droplets; and polymer liquid crystal complex held between the pair of substrates, the polymer liquid crystal complex comprising the polymers and the liquid crystal droplets dispersed in the polymers, and liquid crystal molecules in the liquid crystal droplets being oriented in a direction parallel to the substrates and oriented randomly in a plane parallel to the substrates.

Also, the above objects are accomplished by a polymer dispersion type liquid crystal display element comprising a pair of substrates; an electrode formed on an opposite surface of each of the substrates; polymers; liquid crystal droplets, the liquid crystal droplets being deformed into a compressed structure of their being contracted in a cell gap direction; and polymer liquid crystal complex held between the pair of substrates, the polymer liquid crystal complex comprising the polymers and the liquid crystal droplets dispersed in the polymers, an amount of deformation of the liquid crystal droplets being set to be in range in which a phenomenon of liquid crystal molecules rising up in the cell gap direction is not caused by excluded volume effects of the liquid crystals.

It is noted here that the term "polymer dispersion type liquid crystal element" is intended to include polymer dispersion type liquid crystal element generally known as a complex of polymers and liquid crystals, including NCAP (Nematic Curvilinear Aligned Phase), PDLC (Polymer Disperse Liquid Crystal) and PNLC (Polymer Network Liquid Crystal). Hence, the term "polymer dispersion type liquid crystal element" as used herein is intended to include not only the one in which liquid crystal droplets are dispersed in an island form in a polymer matrix or are associated in series but also the one in which resins spread in continuous phases of liquid crystals in the form of a three dimensional network.

In addition, the term "amount of deformation of liquid crystal droplets" as used herein is intended to mean the ratio of "a difference between the length of a liquid crystal droplet extending along the direction parallel to the substrates and the length thereof extending along the call gap direction" relative to "the length of the liquid crystal droplets extending along the direction parallel to the substrates".

Following is the reason the construction of the invention can accomplish the object of improving scattering effects.

With a typical polymer dispersion type liquid crystal display element, liquid crystal droplets have a spherical form and the liquid crystal droplets are then oriented on a random basis not only with respect to the substrates but also in a plane parallel to the substrates. This random alignment of the liquid crystal droplets is caused by the spherical liquid crystal droplets having a symmetry property and lacking of regularity in the direction for poles to be produced. This alignment of the general type of liquid crystals cannot fully provide the scattering effects. Accordingly, it is thought that it is effective for obtaining the satisfactory scattering effects to treat the liquid crystal molecules in the liquid crystal droplets to be aligned in the direction parallel to the substrates. This is because since the scattering of light is produced by mismatch in difference in refractive index between the liquid crystals and the polymers and the mismatch in refractive index between the liquid crystal droplets, aligning the liquid crystals in the horizontal direction to the substrates allows effective refractive index anisotropy $\Delta n$ to be increased, and as a result of this, the scattering of light is increased. However, even when the liquid crystal molecules are aligned in parallel to the substrates, if the liquid crystal molecules are oriented in a uniform direction, the scattering of light is reduced. This is because since the difference in refractive index between the liquid crystal droplets is small, a sufficient intensity of the scattering is not obtained. Hence, the most desirable formation of the liquid crystal molecular alignments for improving the scattering effects is that the liquid crystal molecules in the liquid crystal droplets are aligned in parallel to the substrates and also are oriented randomly in a plane parallel to the substrates.

On the other hand, forming the liquid crystal droplets into a compressed shape enables the liquid crystal molecules to be aligned in parallel to the substrates. This is because when the liquid crystal droplets are deformed into a structure of their being compressed in the cell gap direction, the length of each liquid crystal droplet extending along the cell gap direction becomes smaller than the length thereof extending along the direction parallel to the substrates, so that the liquid crystal droplets come to have asymmetry. It was found that the liquid crystal molecules in the liquid crystal droplets thus compressed were oriented in the direction parallel to the substrates. Accordingly, the liquid crystals are so oriented that bipolar axes come close to parallel to the substrates. However, the liquid crystal droplets compressed in the cell gap direction still have a circular shape in cross section taken along a line parallel to the substrates without deformation. Thus, the liquid crystal droplets have symmetry in a plane parallel to the substrates, and as such provides no regularity for the liquid crystal molecular alignments and allows the same to be oriented randomly. Thus, deforming the liquid crystal droplets into a compressed form enables the liquid crystal molecules in the liquid crystal droplets to be oriented in parallel to the substrates and also be oriented randomly in a plane parallel to the substrates, thus providing improved scattering effects.

It should be noted here that the improvement of the scattering effects is provided by the liquid crystals being aligned in parallel to the substrates by the deformation and also being oriented randomly in a plane parallel to the substrates, rather than directly by the deformation of the liquid crystal droplets. Hence, irrespective of the amount of deformation of the liquid crystal droplets, any deformation of the liquid crystals does not always provide improved scattering effects. In this respect, it was confirmed by the inventors that an excessive deformation produces deterioration of characteristics, rather than improvement. The reason therefor is that with an increasing deformation of the liquid crystal droplets, a tendency of the liquid crystal molecules in the liquid crystal droplets being aligned in the cell gap direction (the vertical direction to the substrates) is increased by excluded volume effects of the liquid crystals; in other words, the excluded volume effects of the liquid crystals cause the liquid crystal molecules to rise up vertically.

According to the invention, the liquid crystal droplets are deformed within the range in which any force which may cause the liquid crystal molecules to rise up is not produced by the excluded volume effects of the liquid crystals, whereby the orientations of the liquid crystal molecular alignments in the liquid crystal droplets can come relatively dose to parallel to the substrates. As a result of this, the polymer dispersion type liquid crystal display element capable of providing improved scattering characteristics without any deterioration of display characteristics, such as contrast, can be attained.

Experiments were conducted by the inventors in both conditions of a normal anchoring strength and of a strong anchoring strength, the results showing that when the amount of deformation of the liquid crystal droplets exceeds 10% in the normal anchoring strength, the phenomenon of the liquid crystal molecules rising up vertically is caused by the excluded volume effects of the liquid crystals. Hence, when the amount of deformation of the liquid crystal droplets is of 10% or less in the normal anchoring strength, it is ensured that the orientations of the liquid crystal molecular alignments in the liquid crystal droplets can come relatively close to parallel to the substrates. Also, when the amount of deformation of the liquid crystal droplets exceeds 20% in the strong anchoring strength, the phenomenon of the liquid crystal molecules rising up vertically is caused by the excluded volume effects of the liquid crystals. Hence, when the amount of deformation of the liquid crystal droplets is of 20% or less in the strong anchoring strength, it is ensured that the orientations of the liquid crystals molecular alignments in the liquid crystal droplets can come relatively close to parallel to the substrates.

According to the invention, the amount of deformation of the liquid crystal droplets may be expressed by parameters of a mean value θp of the angles formed by the liquid crystal molecules and the substrates; a dielectric ratio E; or a deformation rate P. This is because the tilt angle of a liquid crystal molecule with respect to a substrate, the dielectric ratio E and the deformation rate P each vary with the deformation of the liquid crystal droplets.

According to the invention, a pressing through a vacuum package, an application of a hydrostatic pressure and the like may be used as means for deforming the liquid crystals.

A liquid crystal display element according to the invention may be formed such that the liquid crystals are not be deformed in the cell gap direction, and the mean value θp of the angles formed by the liquid crystal molecules and the substrates can be lowered. This liquid crystal display element can be produced by applying magnetic field across the substrates in the course of the liquid crystals being separated out or by giving polarization to ultraviolet.

The liquid crystal display element according to the invention can raise steepness, so that the invention can suitably work not only to the liquid crystal display element of active matrix drive but also to that of the passive matrix drive.

A liquid crystal display element according to the invention may be formed such that a complex of polymers and the liquid crystals is held by a pair of substrates; the polymers are obtained by liquid crystal monomers employed as polymerizable monomers being subjected to photo polymerization; azimuths angles of the liquid crystals in a plane of the substrates are random; and the means value θp of the angles formed by the liquid crystal molecules and the substrates are lowered. This liquid crystal display element is obtained by liquid crystal monomers employed as polymerizable monomers being polymerized through the irradiation of ultraviolet to allow the liquid crystals to be separated out.

When the liquid crystal monomers are employed for the polymerizable monomers, the mixture of the liquid crystals and the polymerizable monomers exhibits a homogeneous liquid crystal layer. This acts to allow the liquid crystals to be separated out without any impairment of the liquid crystal layer when the liquid crystals are separated out by polymerization of the monomers. Hence, if the molecules of the mixture exhibiting the liquid crystal layer before polymerization are conditioned so that they can be aligned in parallel to a plane of the substrates and also oriented in random in a plane of the substrates, alignments of the liquid crystal molecules separated out by the irradiation of ultraviolet will be affected by the condition before polymerization, with the result that the liquid crystal molecules after polymerization will be aligned nearly in parallel to the plane of the substrates and also oriented in random in the plane of the substrates.

To accomplish the above objects, a method of producing liquid crystal display element according to the invention comprising two steps of polymerization of a first polymerization process and a second polymerization process, and a deformation treatment of the liquid crystal molecules is performed after the first polymerization process, followed by performing the second polymerization process, characterized by that the first polymerization is performed by thermal polymerization and the second polymerization is performed by photo polymerization, a thermal polymerization initiators' content in the mixture being set to such an amount that when the thermal polymerization initiators are wholly consumed by thermal polymerization reactions, the polymerizable materials are brought into a first predetermined polymerization state and a photo polymerization initiators' content being set to such an amount that when the photo polymerization initiators are wholly consumed by at least photo polymerization reactions, the polymerizable materials can be polymerized from the first polymerization state until a second polymerization state in which the polymerization reaction of all the polymerizable materials is completely concluded.

With the above construction, the thermal polymerization initiators are reacted in the first polymerization process and all thermal polymerization initiators are consumed, to produce the first polymerization state. In this state, for example more than half the polymerizable materials or more are polymerized, so that the mesh sizes of the complex of the liquid crystals and the polymers are almost determined. Then, the liquid crystals are pressed and are each formed into a compressed form in a cell gap direction. In the next second polymerization process, the remaining unreacted polymerizable materials are completely polymerized by reaction with the photo polymerization initiators existing in the complex to cause cross-link. This allows the compressed form of the liquid crystals to be fixed and stabilized. According to this constructed invention, since the first polymerization process is performed by the thermal polymerization and the second polymerization process is performed by the photo polymerization process, a desired first polymerization state can be obtained by adjusting the thermal polymerization initiators' content. Hence, the abovesaid problems involved in the prior art in which the first and second polymerization processes are both performed by the photo polymerization can be solved.

Further, the invention may be constructed such that the first polymerization is performed by the photo polymerization and the second polymerization is performed by the thermal polymerization; a photo polymerization initiators' content in the mixture is set to such an amount that when the photo polymerization initiators in the mixture are wholly consumed by photo polymerization reactions, the polymerizable materials are brought into a first predetermined polymerization state; and a thermal polymerization initiators' content is set to such an amount that when the thermal polymerization initiators are wholly consumed by at least thermal polymerization reactions, the polymerizable materials can be polymerized from the first polymerization state until a second polymerization state in which the polymerization reaction of all the polymerizable materials is completely concluded.

With the above construction, the photo polymerization initiators are reacted in the first polymerization process and all photo polymerization initiators are consumed, to produce the first polymerization state. In this state, for example more than half the polymerizable materials or more are polymerized, so that the mesh sizes of the complex of the liquid crystals and the polymers are almost determined. Then, the liquid crystals are pressed and are each formed into a compressed form in a cell gap direction. In the next second polymerization process, the remaining unreacted polymerizable materials are completely polymerized by reaction with the thermal polymerization initiators existing in the complex to cause cross-link. This allows the compressed form of the liquid crystals to be fixed and stabilized.

According to this constructed invention, since the first polymerization process is performed by the photo polymerization and the second polymerization process is performed by the thermal polymerization process, a desired first polymerization state can be obtained by adjusting the photo polymerization initiators' content. Hence, the abovesaid problems involved in the prior art in which the first and second polymerization processes are both performed by the photo polymerization can be solved.

Further, the invention may be constructed such that one of the substrates is provided on its surface with a metal wiring of a stripe or matrix form; the mixture is irradiated with ultraviolet from the one substrate side of the liquid crystal cell in which the mixture is injected, to allow the polymers and the liquid crystals to be phase separated by the photo polymerization; and after the extrusion process, the mixture is irradiated with ultraviolet from the other substrate side, to allow the remaining unreacted polymerizable materials to be polymerized by the photo polymerization.

With the above construction, an area of the substrate on which the metal wiring of strip or matrix form is provided is shielded from ultraviolet by the metal wiring. Thus, the ultraviolet, when irradiated from the one substrate side, can only pass through apertures (parts other than the metal wiring parts) of the one substrate, and the mesh sizes of the complex of the liquid crystals and polymers are determined by polymerization reaction of the mixture existing in the areas through which the ultraviolet can pass. However, the mixture existing in areas under the metal wiring is only partially polymerized by a leaked light and is almost unreacted. When the substrates are pressed to be deformed in a cell gap direction, the liquid crystals at the apertures can be moved along the metal wiring parts of strive or matrix form to be easily squeezed out from the end-sealing part, thus enabling the liquid crystals to be formed into a compressed form very easily. Thereafter, when the ultraviolet is irradiated from the other substrate side, the mixture existing in the areas at the metal wiring parts is polymerized, and the polymerized materials play a role of an adhesive for the entire substrate to fix and stabilize the compressed form of the liquid crystal droplets.

The one substrate may be an active substrate on which a pixel electrode and an active element are formed for each of a plurality of regions partitioned by the wiring of a matrix form. Also, the active substrate may be TFT.

Also, where a glass-transition temperature of the polymers in the first polymerization state is set Tg1 and a glass-transition temperature of the polymers in the second polymerization state is set Tg2, Tg2 may be made higher than the Tg1 by 10° C. or more. This enables the compression of the liquid crystals to be facilitated, because the liquid crystals before extrusion are low in glass-transition temperature and soft. Further, since the liquid crystals after the second polymerization process is high in glass-transition temperature, the resins become so hard that the tendency of liquid crystals to return to the before-compression state can be suppressed.

Further, the extrusion of the liquid crystals may be performed by heating. Since a coefficient of thermal expansion of the liquid crystal materials is much larger than that of the polymers and that of the cell substrates, the heating allows the liquid crystals to be squeezed out from the end-sealing part, without using any pressing apparatus, to form the liquid crystals into a compressed form and also allows the compressed form of the liquid crystals to be fixed and stabilized by returning the raised temperature to a category temperature range of 60° C. or less after the end-sealing part is sealed by sealing resins.

Other suitable pressing means, such as a press and a vacuum package, may be used for extruding the liquid crystals.

Additionally, the invention may be constructed such that the fist and second polymerization are both performed by the photo polymerization; the liquid crystal cell is cooled so that the liquid crystal droplets separated out in the first polymerization process can be deformed in a cell gap direction; and after the cooling process, the mixture is irradiated with ultraviolet in the second polymerization process, with the liquid crystal cell kept in its cooled state, so that the remaining unreacted polymerizable materials can be polymerized by the photo polymerization.

With the above construction, the photo polymerization initiators are reacted in the first polymerization process and for example more than half the polymerizable materials or more are polymerized, so that the mesh sizes of the complex of the liquid crystals and the polymers are almost determined. Then, the liquid crystal cell is cooled to deform the liquid crystals into a compressed form contracted in a cell gap direction by pressing based on a thermal stress resulting from a lager coefficient of thermal expansion of the liquid crystal materials. In this state, the polymerizable materials are irradiated with ultraviolet in the second polymerization process, so that the remaining unreacted polymerizable materials are completely polymerized by reaction with the photo polymerization initiators existing in the complex to fix and stabilize the compressed form of the liquid crystals.

In addition, the invention may be constructed such that the first polymerization process is performed by the thermal polymerization; the second polymerization process is performed by the photo polymerization; the liquid crystal cell is cooled so that the liquid crystal droplets separated out in the first polymerization process can be deformed in the cell gap direction; and after the cooling process, the mixture is irradiated with ultraviolet in the second polymerization process, with the liquid crystal cell kept in its cooled state, so that the remaining unreacted polymerizable materials can be polymerized by the photo polymerization.

With the above construction, the thermal polymerization initiators are reacted and are all consumed in the first polymerization process to produce the first polymerization state. In this state, for example more than half the polymerizable materials or more are polymerized, so that the mesh sizes of the complex of the liquid crystals and the polymers are almost determined. Then, the liquid crystal cell is cooled to deform the liquid crystals into a compressed form contracted in the cell gap direction by pressing based on a thermal stress resulting from a larger coefficient of thermal expansion of the liquid crystal materials. In this state, the mixture is irradiated with ultraviolet in the second polymerization process, so that the remaining unreacted polymerizable materials are completely polymerized by reaction with the photo polymerization initiators existing in the complex to fix and stabilize the compressed form of the liquid crystals. According to this invention, since the first polymerization process is performed by the thermal polymerization and the second polarization process is performed by the photo polymerization process, the abovesaid problems involved in the prior art in which the first and second polymerization processes are both performed by the photo polymerization can be solved by adjusting the thermal polymerization initiators' content.

Also, the invention is directed to a production apparatus comprising a means for carrying the liquid crystal cell filled with the mixture along a carriage path; an ultraviolet irradiation means, arranged at a midpoint of the carriage path, for radiating ultraviolet to a part of the liquid crystal cell; and pressing means, arranged at a midpoint of the carriage path, for pressing the area of the liquid crystal cell irradiated with ultraviolet.

The above construction can provide the result that the first polymerization process and the extrusion process of the liquid crystals can be performed automatically. In the case where the first and second polymerization processes are both performed by the photo polymerization, an attempt to control the polymerization reaction by merely regulating the ultraviolet irradiation time may often have difficulties in forming the separated liquid crystals in a compressed form, because the polymerization reaction progresses for a certain period alter the irradiation of ultraviolet. According to the invention, controlling a rotation speed of rollers and a feed rate of the liquid crystal cell to be optimum enables the liquid crystal cell to be pressed at a point the liquid crystal cell becomes an optimal polymerization state during the period from the initiation of polymerization by the irradiation of ultraviolet until the conclusion of polymerization in which phase separation of the liquid crystals by the polymerization is completed. As a result, forming the liquid crystals into a compressed form can be facilitated. Even if the polymerization by the irradiation with ultraviolet is performed only once and no polymerization process is performed after the extrusion process of the liquid crystals, since the liquid crystal cell can be pressed with the rollers at a point the liquid crystal cell becomes an optimal polymerization state, allowing for the compression of liquid crystals and relaxation of the compression effects after compression by controlling the rotation speed of rollers and the feed rate of the liquid crystal cell to be optimum in substantially the same manner as in the above, the liquid crystal display element relatively stable in compression effects after compression can be produced.

Further, in the production apparatus according to the invention, the ultraviolet irradiation means may comprise a light source for emitting ultraviolet and an optical filter to intercept only wavelength components which allow the liquid crystals to be optically resolved, and it may further include a temperature control mechanism to maintain the liquid crystal cell at a preset temperature in association with the phase-separation reaction of the liquid crystals by irradiation of ultraviolet. This construction enables the phase-separation reaction of the liquid crystals to be controlled sensitively to temperature, thus obtaining the liquid crystal display element having homogeneous compression effects. Further, the optical filter arranged enables the liquid crystals to be prevented from being optically resolved by ultraviolet, thus providing improved reliability of the liquid crystal display element.

Further, according to the invention, when the liquid crystal element is produced by the two steps of polymerization processes, the liquid crystal droplets may be deformed at the deformation ratio of 1.15 or less in the deformation process. It is noted here that the term "deformation ratio" used herein is intended to mean "the before-deformation to after-deformation ratio of the cell gap". The reason for making the deformation ratio 1.15 or less is that an excessive deformation provides deterioration of the scattering of light, rather than improvement. This deformation rate made much smaller than that of the prior art can provide improved scattering of light and can also provide specific effects mentioned below for the invention according to which the first and second polymerization processes are both performed by the photo polymerization. That is to say, as mentioned at the "Description of the Prior Art", in the case where the first and second polymerization processes are both performed by the photo polymerization, variations in deformation ratio are caused by variations in the degree of progress of the polymerization reaction in the first polymerization process. However, with the invention according to which the deformation ratio is much smaller than that of the prior art, the deformation ratio is little affected by variations in the degree of progress of the polymerization reaction, so that poor reliability of liquid crystal display element, which is the problem involved in the prior art, can be solved.

Further, to accomplish the above objects, polymer dispersion type liquid crystal display element according to the invention have a structure in which a plurality of polymer liquid crystal complex layers in which liquid crystal droplets are dispersed in polymers are laminated to form a layered product and the layered product is held between a pair of substrates on which electrodes are formed, characterized by that liquid crystal molecules in the liquid crystal droplets in each of the polymer liquid crystal complex layers are aligned in the direction substantially parallel with the substrates and also are oriented in different directions in a plane parallel to the substrates for each of the polymer liquid crystal complex layers.

With the above construction the liquid crystal molecules in the liquid crystal droplets in each of the polymer liquid crystal complex layers are aligned in the direction substantially parallel with the substrates and also are oriented nearly randomly as a whole when the liquid crystal display element is viewed along the cell gap direction. This enables the difference in refractive index between the respective layers to be considerably increased, as compared with the prior art, to provide satisfactory scattering effects. Also, each of the layers is reduced in thickness to form a laminated structure with the number of laminated layers, so as to provide satisfactory scattering effects. Due to this, there is no need to increase the thickness of the cell, so an increase in driving voltage can be avoided.

To obtain the above liquid crystal display element, in the polymerization process in which the mixture is irradiated with ultraviolet to allow the polymers and the liquid crystals to be phase separated to form the polymer liquid crystal complex layers, a polarized ultraviolet polarized in one direction may be used as the ultraviolet and the polarizing direction of the polarized ultraviolet may be changed for each of the polymer liquid crystal complex layers to control the liquid crystal alignments.

Alternatively, in the course of the polymerization process in which the mixture is irradiated with ultraviolet to allow the polymers and the liquid crystals to be phase separated to form the polymer liquid crystal complex layers, magnetic field or electric field may be added in a different direction for each of the polymer liquid crystal complex layers to control the liquid crystal alignments. These producing methods of the invention can provide liquid crystal display element of high contrast with simplified manufacturing process, without using any rubbing as the prior art.

Further, the liquid crystal display element according to the invention may be designed such that the liquid crystal molecules in the liquid crystal droplets in the polymer liquid crystal complex layers are aligned in the direction substantially parallel to the substrates and also are oriented randomly in a plane substantially parallel to the substrates. This arranged liquid crystal display element is the most preferable in alignments of the liquid crystals.

In obtaining the above liquid crystal display element, the substrates are pressed after the polymer liquid crystal complex layers are formed between the substrates by the polymerization process, so that the alignment of the liquid crystals are controlled. In detail, when the polymerizable materials are polymerized to allow the polymers and the liquid crystals to be phase separated, to form the polymer liquid crystal complex layers, the liquid crystal molecules in the liquid crystal droplets in the polymer liquid crystal complex layers thus produced are oriented randomly not only with respect to the substrates but also in a plane parallel to the substrates. It is known that when the substrates are pressed in this state, to form the liquid crystal droplets into a compressed form, the liquid crystal molecules in the liquid crystal droplets are oriented in the direction generally parallel to the substrates. Thus, by pressing the substrates, the liquid crystal molecules in the liquid crystal droplets in the polymer liquid crystal complex layers can be so controlled as to be oriented in the direction substantially parallel to the substrates and also be oriented randomly in a plane substantially parallel to the substrates.

The liquid crystal droplets may be formed with coloring matters of dichroism being mixed with the liquid crystals. This can produce a guest host type liquid crystal display element capable of absorbing light by means of the coloring matters of dichroism.

BRIEF DESCRIPTION OF THE DRAWINGS

FIGS. 22(a)–(d) are diagrams showing a before-polymerization stale and an after-polymerization state in each of Prior Art and Example 12 of the 1st Embodiment of the invention;

FIG. 23 is a perspective view of one substrate used in Example 13 of the 1st Embodiment of the invention;

FIG. 24 is a perspective view of the other substrate used in Example 13 of the 1st Embodiment of the invention;

FIG. 29 is a exploded perspective view of an active matrix type liquid crystal display element of Example 6 of the 2nd Embodiment of the invention;

FIG. 35 is a schematic representation of the liquid crystal display element of Example 1 of the 3rd Embodiment of the invention, FIG. 35(a) is a sectional view in schematic form depicting the liquid crystal display element and FIG. 35(b) is a schematic representation showing directions in which the liquid crystal molecules of the liquid crystal display element are oriented;

DETAILED DESCRIPTION OF THE PREFERRED EMBODIMENT

First Embodiment

EXAMPLE 1

Referring now to the accompanying drawing figures, an example of liquid crystal display element of the first embodiment of the invention is described below.

Figure 1:
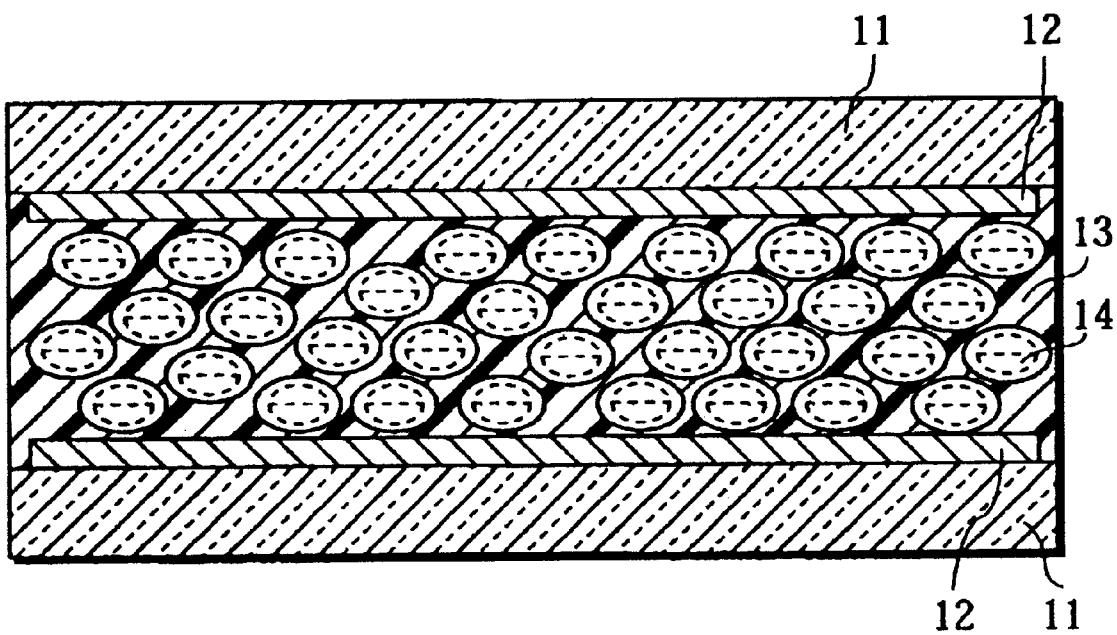
FIG. 1 is a sectional view of a liquid crystal display element of Example 1 of the 1st Embodiment of the invention.
Figure 2:
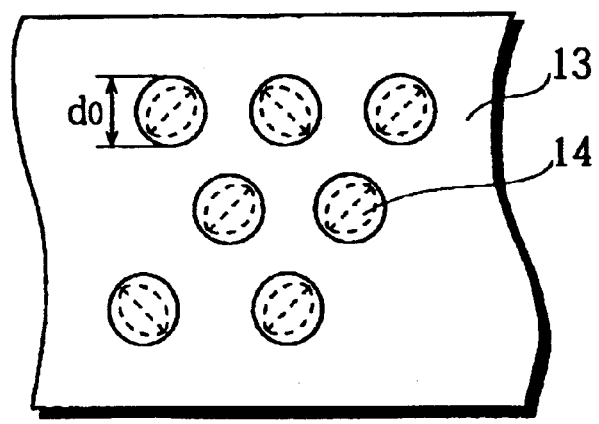
FIG. 2 is a plan view of a part of the liquid crystal display element of Example 1 of the 1st Embodiment of the invention.

FIG. 1 shows a sectional view of the liquid crystal display element of the invention, and FIG. 2 shows a plan view of the same. In the liquid crystal display element shown in FIG. 1, transference electrodes 12 are formed on two opposing substrates 11 at the inside thereof, respectively. Between the transference elect 12, polymer liquid crystal complex in which liquid crystal droplets 14 are dispersed in the polymers 13 are arranged. Each liquid crystal droplet 14 has a diameter d0 of about 1.2 $\mu$m (See FIG. 2). Coloring matters of dichroism may be contained in the liquid crystals, which would then be a guest host type liquid crystal device which absorbs light by the coloring matters of dichroism.

The invention is characterized in that each liquid crystal droplet 14 is deformed in the cell gap direction. In the case shown in FIG. 1, the liquid crystal droplets 14 each have a flat structure with the length compressed in the cell gap direction. In detail, the liquid crystal droplets 14 are each formed into a compressed form with only its length in the cell gap direction being compressed, but are kept circular in section parallel to the substrates without deformation. In FIG. 1, the liquid crystal molecular arrays are depicted as a bipolar structure with two poles orienting at the lateral sides of the figure, with an intention of defining the bipolar axes as being located in nearly parallel with the substrates, not as being arranged in uniaxially. Also, for the sake of simplicity, in FIG. 1, the liquid crystal droplets are depicted as all having an uniform shape, but actually are not so uniform in shape as those on in FIG. 1. The bipolar axes exist on a random basis in a plane parallel to the substrates, as shown in FIG. 2.

With reference to FIG. 3, the method for producing the liquid crystal element will be described below.

Figure 3A:
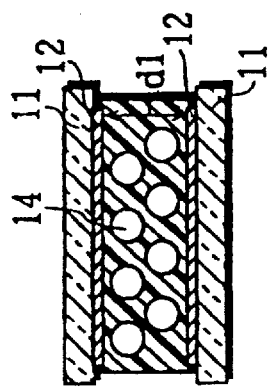
FIGS. 3($a$)–($f$) are production process diagrams of the liquid crystal display element of Example 1 of the 1st Embodiment of the invention.

First, as shown in FIG. 3(a), two substrates 11 are laminated together with confronting each other. The transference electrodes 12 are formed on the substrates 11 at the inside thereof. An active matrix substrate forming TFTs (Thin Film Transistors) is used for one of the substrates. A distance between the two substrates 11 (cell gap) d1 is kept uniform with spacers 15 of resin beads each having a grain size of for example 12 $\mu$m sprayed in advance on the substrates.

Figure 3B:
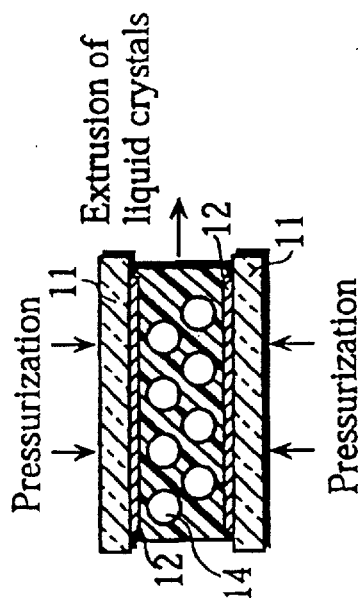
Figure 3C:
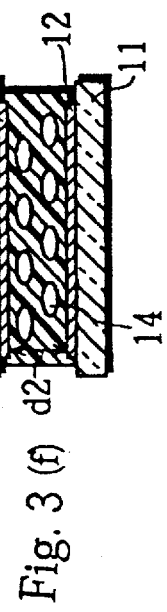
Figure 3D:
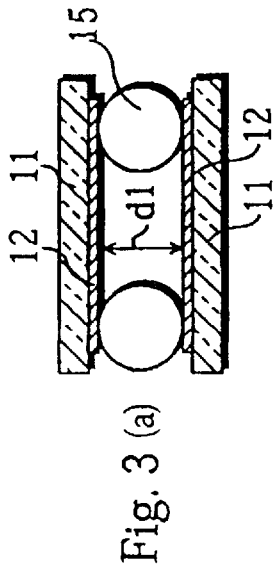

Next, as shown in FIG. 3(b), a mixture of liquid crystals, polymerizable monomers, oligomers, and polymerization initiators is introduced in between the substrates 11 by means of a vacuum filling. At this time, a vacuum injection port (not shown) formed at a sealing portion of the liquid crystal panel at the side thereof is not yet sealed. Thereafter, polymerization of the polymerizable monomers with the oligomers is made by irradiation of ultraviolet with dominant wavelengths of 365 nm, as shown In FIG. 3(c). By this treatment, the polymerizable monomers and the oligomers are polymerized to produce polymer network type liquid crystal element in which spherical liquid crystal droplets 14 as liquid crystal materials are dispersed in series in the polymer matrix, as shown in FIG. 3(d). The polymer dispersion type liquid crystal element in which the liquid crystal droplets are dispersed in the polymer matrix may be structurally produced, of course.

Figure 3E:
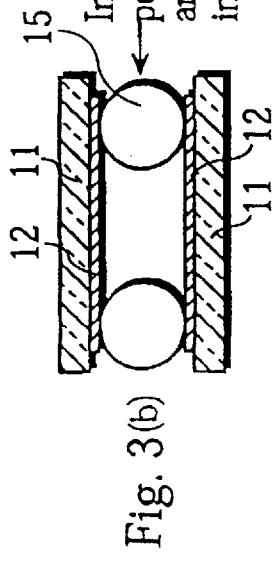

Then, as shown in FIG. 3(e), the liquid crystal structure is deformed to extrude or squeeze out some liquid crystals filled in liquid crystal panels.

Figure 4:
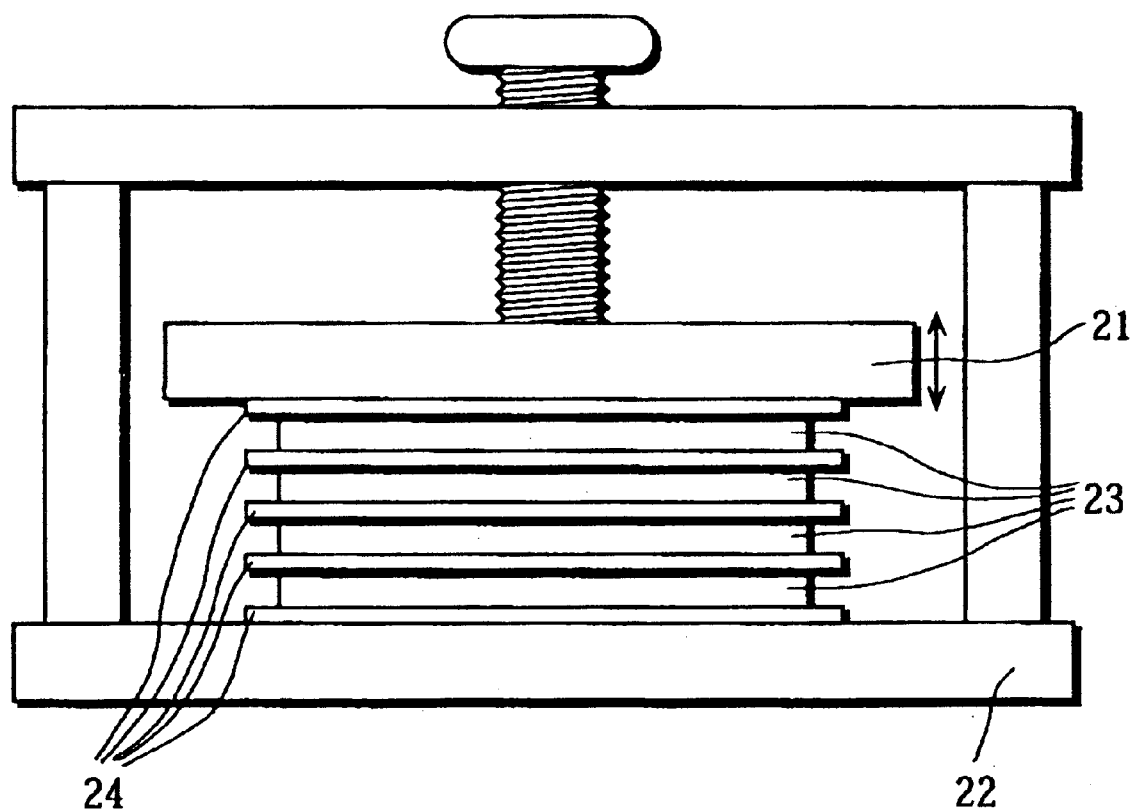
FIG. 4 is a front view of an apparatus for producing the liquid crystal display element of Example 1 of the 1st Embodiment of the invention.

In the embodiment of the invention, a pressing is adopted for this deformation process of the liquid crystal structure. Specifically, a pressing force is applied to the panels after polymerization under irradiation of ultraviolet by use of a jig (a device) as shown in FIG. 4. At the stage of this deformation process, the panel is not yet sealed.

The panel pressing step is briefly described below. A plurality of panels 23 are sandwiched between surface blocks 21, 22 of the jig, with buffers 24 sandwiched between the panels 23. The surface block 21 is so mounted as to be movable in parallel, and the panels 23 is pressed with the surface block 21 by tightening a screw fitted thereto.

Figure 3F:
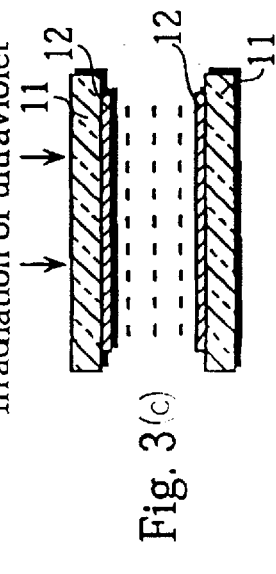

Thus, after the liquid crystal element with the polymer network structure is formed, the panel 23 is pressed to deform the liquid crystal structure so as to squeeze out some liquid crystals filled in the panels, as shown in FIG. 3(e). Though this pressing step, the liquid crystal display element with a compressed structure of the liquid crystal droplets 14 being compressed in the cell gap direction were produced, as shown in FIG. 3(f).

The results of the experiment performed by the inventors proves that when the produced liquid crystal element was allowed to stand under pressure at room temperature, the liquid crystal droplets were deformed in the cell gap direction by 3% in 5 hours. At that time, in the polymer dispersion type liquid crystal element taking on the liquid crystal droplets structure, the liquid crystals were able to be squeezed out in a like manner, which shows that the polymer materials are in the form of gel and have properties of allowing the liquid crystal materials to pass through them with a long time. The liquid crystal droplets were compressed in a state in which the polymerization of the polymers was completely concluded or was nearly completely concluded, allowing for relaxation of the compression effects of liquid crystal droplets after compression. Hence, the deformed liquid crystal droplets can no longer return to their original form after compression with passage of time.

The extent of the deformation was able to be determined by the change in the cell gap, and the amount of deformation was able to be changed by varying the time for the produced liquid crystal element to be allowed to stand and the pressing strength.

For allowing the liquid crystal element to be deformed in the cell gap direction by 3% in 5 hours, the pressing fore of 0.8 Kg/cm$^2$ more is needed. The pressing force of 3 Kg/cm$^2$ or more is desirable for shortening the time for extrusion. The pressing force of 10 Kg/cm$^2$ or more is desirable for the extrusion within 6 hours.

When the liquid crystal structure is deformed like this, the properties of the liquid crystal display element are significantly changed. To quantify the changes in the liquid crystal structure, the deformation rate P is defined here as P(%)= (Cell gap before deformation−Cell gap after deformation)/ (Cell gap before deformation)×100. The cell gap measures at room temperature, for example. When this is applied to the case of FIG. 3 in which the liquid crystal structure was deformed from the state of FIG. 3(d) into the state of FIG. 3(f) and the cell gap was reduced from d1 to d2, P is represented as P(%)=(d1−d2)/(d1)×100. This indicates the amount of deformation of the liquid crystal structure which is equivalent of the compression for the liquid crystal droplet structure and means that each liquid crystal droplet 14 is decreased in thickness in the cell gap direction by P %. In the case of the polymer network structure, the thickness decreases by P % likewise, and the proportion of the liquid crystal molecules aligned in substantially parallel with the glass substrates at the polymer phase boundary increases. Although the liquid crystal droplets were deformed by this production process, it was confirmed that the length of the liquid crystal droplet extending in the direction parallel to the substrates was little deformed after the deformation process of P %, while the length thereof extending in the cell gap direction was deformed by P % only. This is because the liquid crystals were extruded or squeezed out by the pressing process, so that the liquid crystals in the liquid crystal droplets changed in volume. Here, the amount of deformation is defined in accordance with the pressing condition P % for the production process; that is, the "amount of deformation" as used herein is intended to mean the ratio of "a difference between the length of a liquid crystal droplet extending along the direction parallel to the substrates and the length thereof extending along the cell gap direction" relative to "the length of the liquid crystal droplet extending along the direction parallel to the substrates". Thus, the amount of deformation is meant to be equal to the pressing condition (deformation rate) P %. Hence, for explanatory convenience's sake, the term "deformation rate" as used in the description given below is intended to include the term "amount of deformation", unless it is particularly specified as a parameter which represents the extent of deformation in the liquid crystals in the pressing process.

Next, the properties of the thus produced liquid crystal element of the invention will be described with reference to the drawings. The essence of the invention resides in that the liquid crystal structure is deformed to disturb the symmetry property of the liquid crystal droplets, whereby the orientations of the liquid crystals aligned come relatively close to parallel to the substrates.

Figure 5:
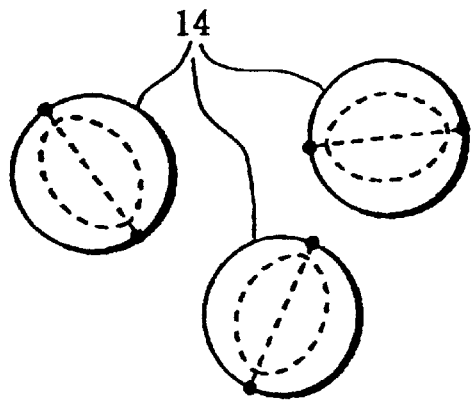
FIGS. 5($a$)–($e$) are diagrams for illustrating the relationship between deformation and orientation formation of the liquid crystals of the liquid crystal display element of Example 1 of the 1st Embodiment of the invention.
Figure 5:
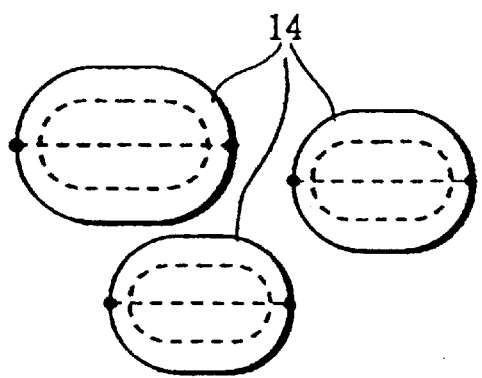
Figure 5:
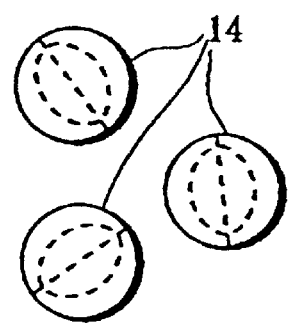
Figure 5:
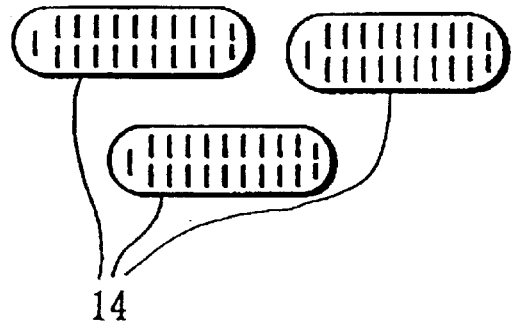
Figure 5:
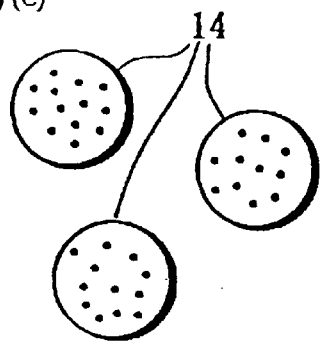

FIG. 5 illustrates the liquid crystal droplets independent of each other and the phenomenon generated in the bipolar alignment adopted as the alignment formation of the liquid crystals. When the liquid crystal droplets 14 are complete sphere, as shown in FIG. 5(a), poles (represented by black circles) orient randomly. These are equivalent of typical polymer dispersion type liquid crystal display element. In this case, the liquid crystal droplets 14 each are symmetry in shape and thus have no anisotropy in shape, so that no regularity is generated in the direction for the poles to be generated.

When the liquid crystal droplets are deformed as slightly as 0–10%, as in the embodiment of the invention, the spherical liquid crystal droplets are changed into a compressed shape, as shown in FIG. 5(b). When the liquid crystal droplets are deformed into an asymmetric shape, the liquid crystals are oriented in accordance with the asymmetry. In this Example, the structure for the poles of the bipolar structure to be generated horizontally is stabilized. In the illustration, the poles of the bipolar structure may appear to be horizontally aligned unidirectionaly, but they are symbolically depicted, with the intention of indicating that the poles are horizontally aligned. In practice, the poles are oriented in a plane of the substrates on a random basis. A schematic form depicting the poles of the bipolar structure when viewed from above is shown in FIG. 5(c). Since this alignment of the liquid crystals is caused by the structural asymmetry of the liquid crystal droplets, although the amount of deformation is relatively small, the alignment of the liquid crystals can come substantially close to the horizontal.

It was found, however, that when the liquid crystal droplets 14 were deformed at an excessive compression rate of 10% or more, the characteristics were deteriorated, rather than improved. The reason there for is that the over 10% deformation of the liquid crystal droplets 14 causes the form of the liquid crystal droplets 14 to come close to a disc-like shape, and as such generates a tendency of the liquid crystal molecules to be aligned along the direction of their being deformed (in the vertical direction as viewed in the drawing). This is because when the form of the liquid crystal droplet comes close to a disc-like shape, the liquid crystal molecules are aligned along the direction of the minor axes of the liquid crystal droplets 14 by excluded volume effects or packing effects of the liquid crystals. The liquid crystals of this Example have a tendency to align in parallel with the phase boundary of the polymer, but, as the deformation of the liquid crystal droplets increases, the tendency toward the vertical alignment exceeds the tendency toward the parallel alignment along the phase boundary of the polymer through the excluded volume effects. It was confirmed that this led to the phenomenon that the liquid crystal molecules are vertically oriented as shown in FIG. 5(d). Shown in FIG. 5(e) is a schematic form depicting the liquid crystal droplets 14 of FIG. 5(d) when viewed from above.

The phenomenon of the liquid crystals rising vertically was found to be dependent on the size of the liquid crystal droplets 14 as well, and as such makes it hard for larger liquid crystal droplets 14 to rise up vertically. The size of the liquid crystal droplets 14 described here means a larger diameter thereof when viewed from the above. Also, it was found that the liquid crystals of 10 $\mu$m or more had a tendency to relatively resist to rise-up. The smaller the particle diameter of the liquid crystal droplets becomes, the further the scattering of light increases in intensity, so it is desirable for application to the scattering type liquid crystal display element that the liquid crystal droplets have a size of 2 $\mu$m or less. It was found, however, that under the condition of the particle diameter of 2 $\mu$m or less, the intensity of the scattering did not increase until the deformation rate was 10% or more. It is noted here that all data mentioned later are those obtained under the condition that the diameter of each of the liquid crystal droplets is about 1.2 $\mu$m.

Also, an interaction between the phase boundary of the polymers and the liquid crystals and a dependency on anchoring strength were also found, and a was confirmed that with an increasing anchoring strength or with an increasing tendency of the liquid crystals to be horizontally aligned along the phase boundary of the polymer, it became hard for the liquid crystals to rise up vertically. The strong anchoring strength causes a problem of increase in driving voltage, so that it is difficult for liquid crystals strong in anchoring strength to be used as the dispersion type liquid crystal display element However, if an ample driving voltage can be applied to the liquid crystals, larger scattering of light can then be provided.

As mentioned above, the liquid crystal droplets were deformed as slightsly as 10% or less to disturb the symmetry property of the liquid crystal droplets, and as a result, the orientations of the liquid crystal molecules came close to parallel to the substrates. With this array of the liquid crystal molecules, the following properties of the element was obtained.

Figure 6:
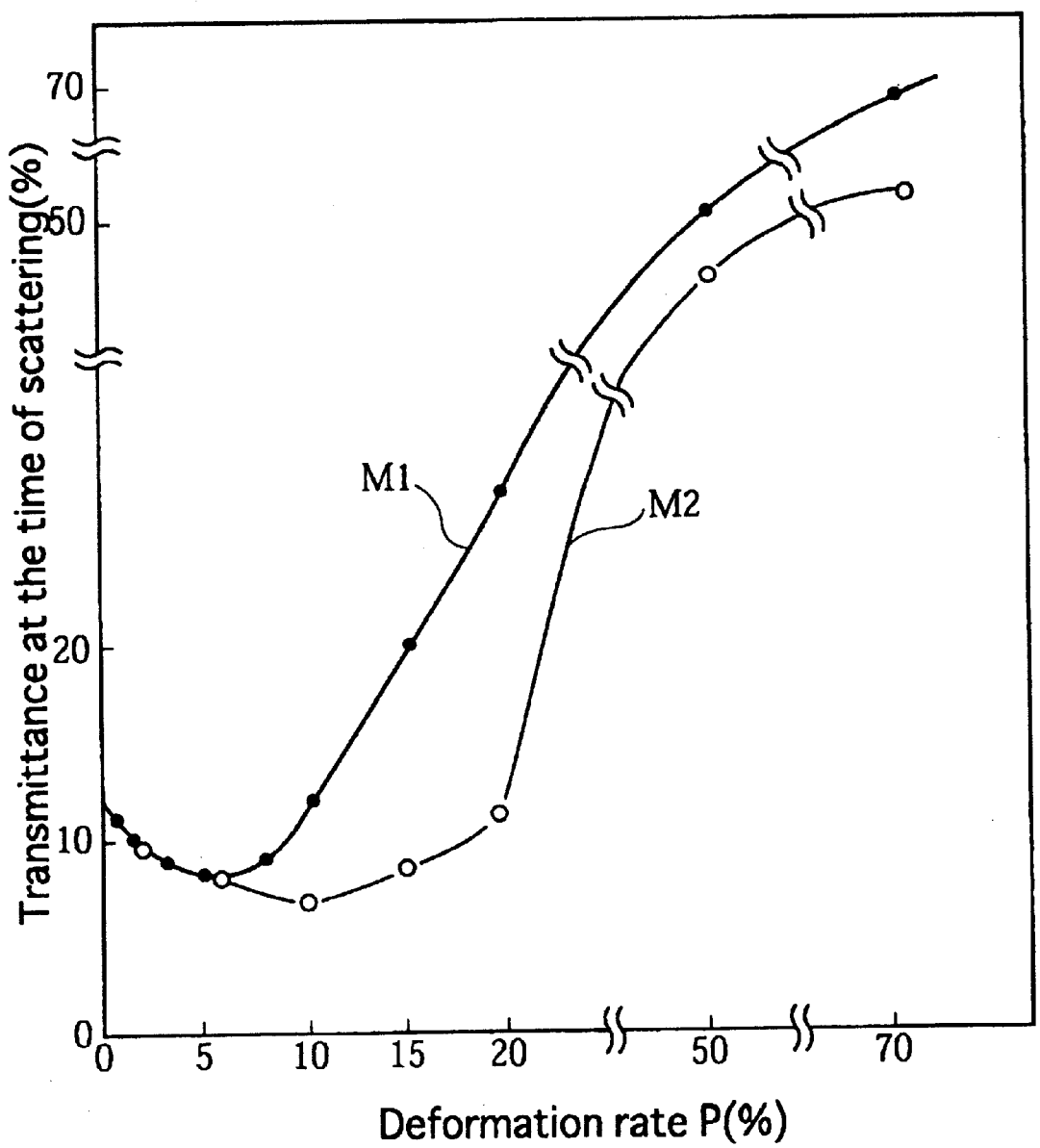
FIG. 6 is a diagram for representing the relationship between transmittance and a deformation rate at the scattering of light of the liquid crystal display element of Example 1 of the 1st Embodiment of the invention.

FIG. 6 shows a change in transmittance at the scattering resulting from the change in the deformation rate P as mentioned above. In FIG. 6, the axis of ordinates shows the transmittance at the time of no electric filed added. In FIG. 6, a line M1 represents a change in the case of a normal anchoring strength and a line M2 represents a change in the case of a strong anchoring strength. Additionally, also in FIGS. 7, 8 and 10 as described later, the line M1 represents a change in the case of a normal anchoring strength and the line M2 represents a change in the case of a strong anchoring strength. The way of evaluating the anchoring strength is however not standardized at present so the inventors evaluated the anchoring strength by using an evaluation parameter given below.

(Driving Voltage $V_{90}$ For Non-deformation)/(Particle Diameter)

In Example 1, the evaluation parameter for the normal anchoring strength was about 6.5 and the evaluation parameter for the strong anchoring strength was about 11.5. As detailed below, at the evaluation parameter over 10, the scattering was seen with the deformation of 20%, and accordingly the deformation of 20% or less is effective for improvement of characteristics.

First, a description on the normal anchoring strength represented by the line M1 will be given below. As represented by the line M1 in FIG. 6, in the range of the deformation rate P of 0 to 10%, the transmittance decreases as the deformation rate increases. The more the scattering increases, the more the transmittance decreases, for the reason of which in the range of the deformation rate P of 0 to 10%, the scattering intensity which is inverse to the transmittance increases as the deformation rate P increases. A high intensity of the scattering and a low transmit are desirable to obtain high contrast This increase in the scattering intensity was stemmed from the liquid crystal molecules being arranged in nearly parallel with the substrates. The anisotropy $\Delta n$ in the refractive index with respect to the direction parallel to the substrates, which contributes to the scattering, increases effectively as the orientations of the liquid crystal molecules come close to the horizontal direction, and as such increases the intensity of the scattering. The deformation rate of 3 to 10% is the most desirable for providing the maximum scattering of light for the device.

In the case where coloring matters of dichroism are contained in the liquid crystals, the coloring matters of dichroism are also aligned nearly horizontally as the liquid crystal molecules are aligned nearly horizontally. This allows the dichroism ratio been the coloring matters to increase, for the reason of which improved absorption coefficient and contrast were obtained.

However, as represented by the line M1 in FIG. 6, the intensity of the scattering of light deteriorated steeply at the transmittance of 10% or more, and in fact the intensity of the scattering was not improved; rather than it was deteriorated by doing the deformation. This is because when the liquid crystal droplets are compressed too much, the tendency of the liquid crystal molecules being aligned vertically to the substrates is strengthened.

Also, the improvement in intensity of the scattering is dependent on the anisotropy $\Delta n$ in refractive index of the liquid crystal materials, and some effects were seen when the Δn was 0.245 or more and significant effects were obtained when the Δn was 0.26 or more.

Figure 7:
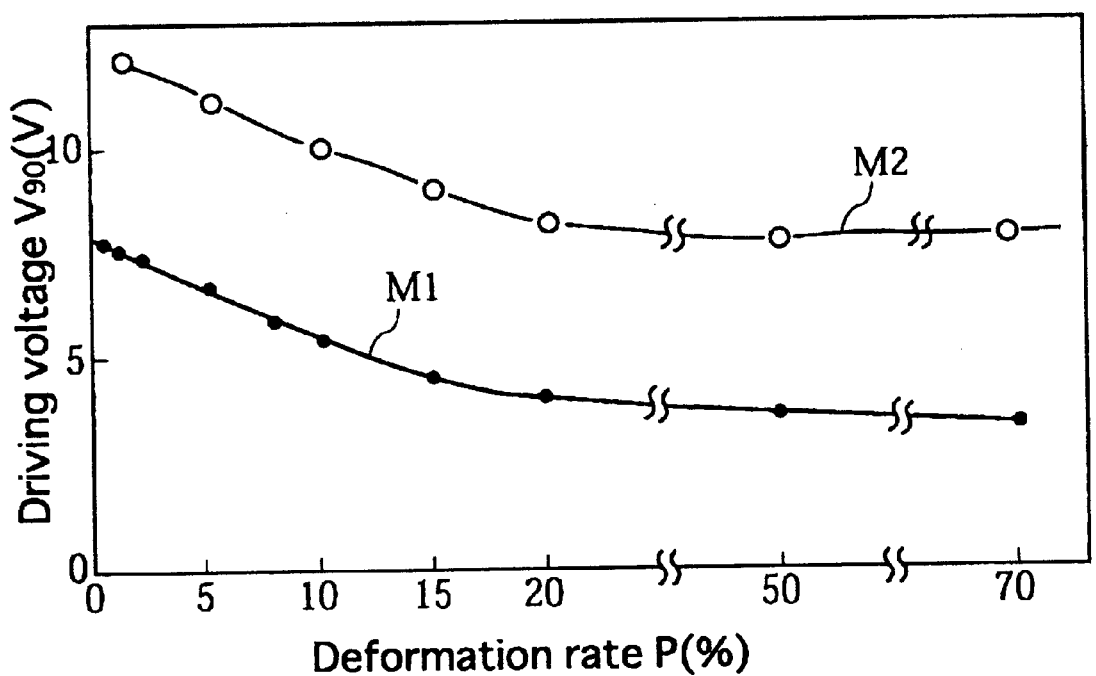
FIG. 7 is a diagram for representing the relationship between a driving voltage V90 and the deformation rate of the liquid crystal display element of Example 1 of the 1st Embodiment of the invention.

Shown in FIG. 7 is a change in driving voltage V90 across the same cell gap resulting from the change in the deformation fate P as mentioned above. It is noted here that V90 means the driving voltage at the transmittance of 90%.

As apparent from the result represented by the line M1 of FIG. 7, as the deformation rate P increases, the V90 decreases. This is also because as the orientations of the liquid crystal molecular alignments came dose to parallel to the substrates, the effective anisotropy Δ∈ in dielectric cons increased. This dependence of V90 is dependent on the anisotropy Δ∈ in dielectric constant of the liquid crystal materials. From the obtained results, it was confirmed that the V90 decreased at Δ∈ of 5 or more and decreased significantly at Δ∈ of 8 or more.

Figure 8:
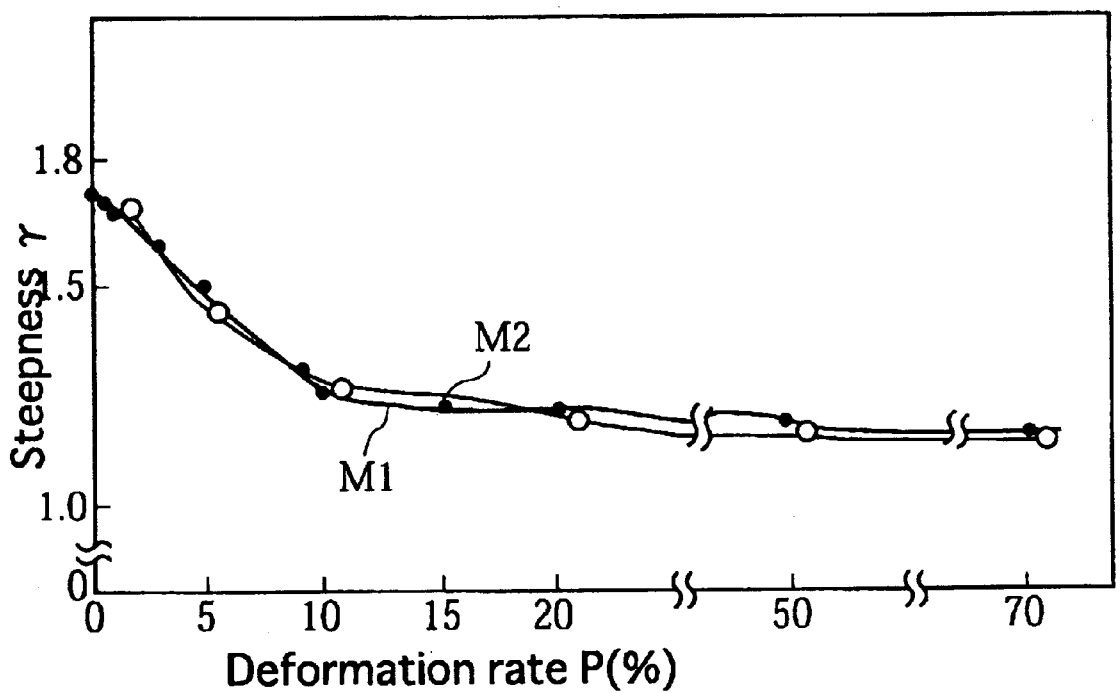
FIG. 8 is a diagram for representing the relationship between steepness γ and the deformation rate of the liquid crystal display element of Example 1 of the 1st Embodiment of the invention.
Figure 9:
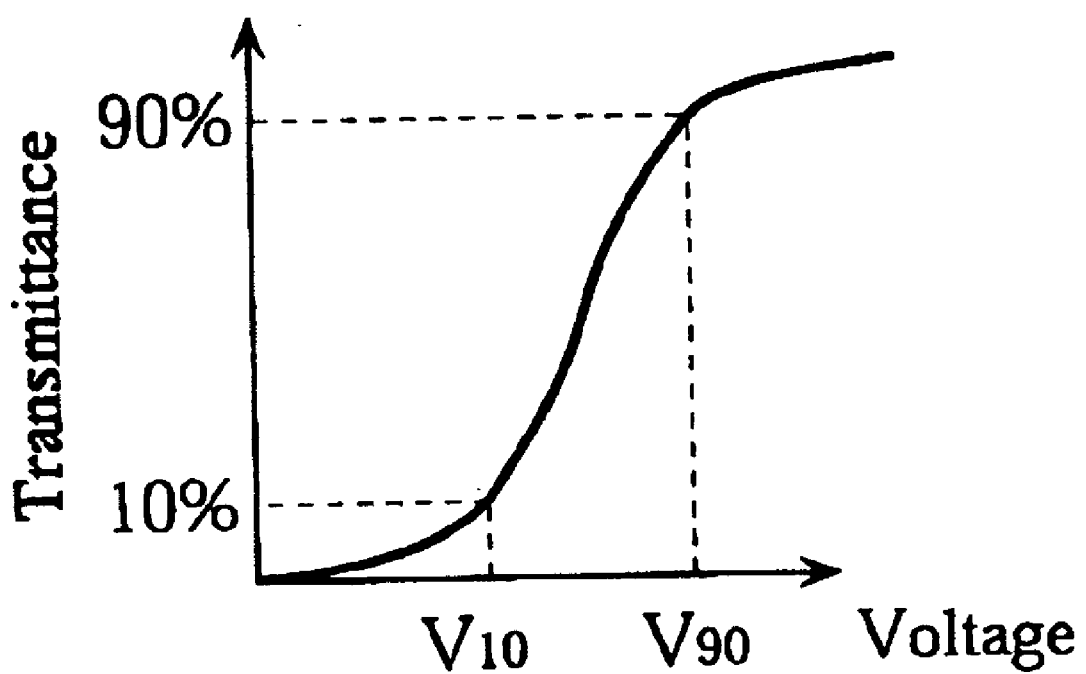
FIG. 9 is a diagram for representing the relationship between driving voltages V10, V90 and the transmittance.

Shown in FIG. 8 is a change in steepness resulting from the change in deformation rate P as mentioned above. It is noted here mat as so in FIG. 9, the index γ representing the steepness is defined by the ratio between the driving voltage V90 at the transmission of 90% and the driving voltage V10 at the transmission of 10%; that is, γ can be expressed as γ=V90/V10. As apparent from the result represented by the line M1 of FIG. 8, the values of y decreases as the deformation rate P increases, that is, the steepness becomes steeper with an increasing deformation rate P.

Figure 10:
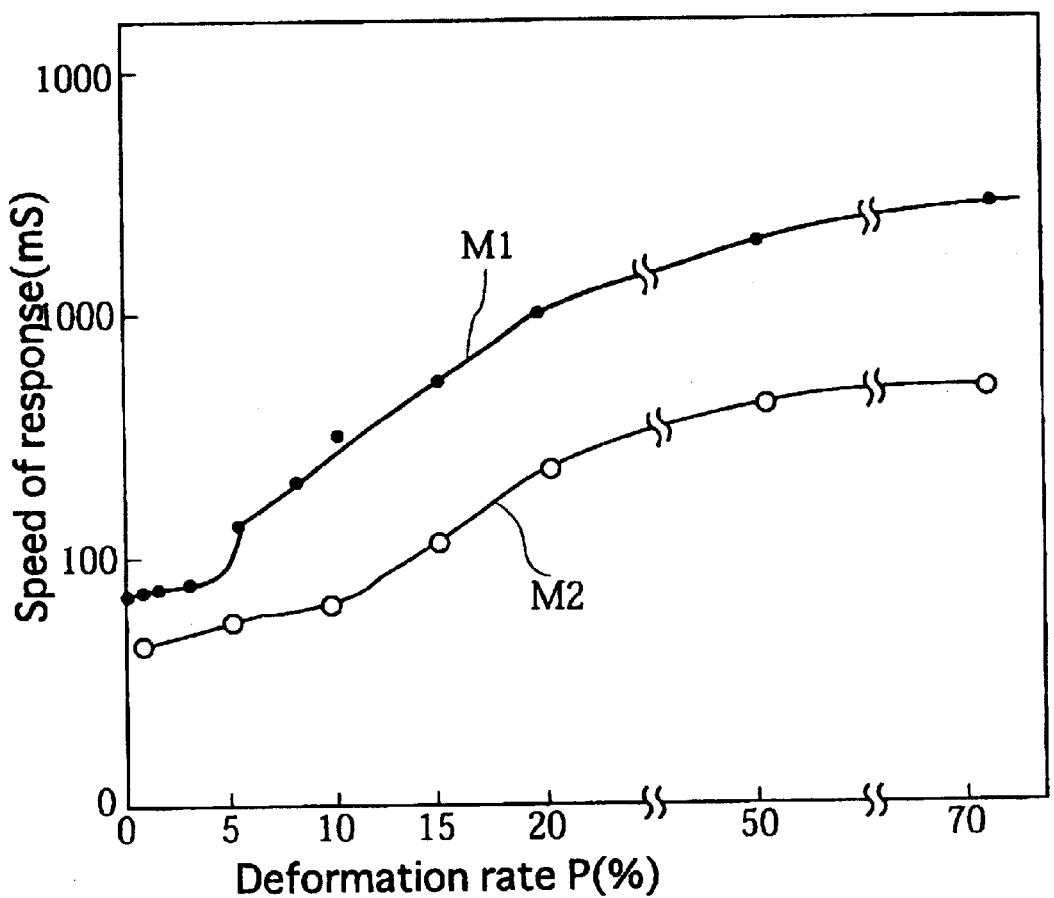
FIG. 10 is a diagram for representing the relationship between a speed of response and the deformation rate of the liquid crystal display element of Example 1 of the 1st Embodiment of the invention.
Figure 11A:
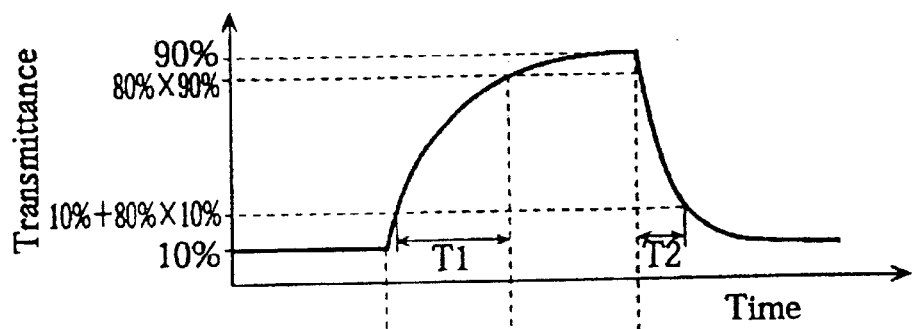
FIGS. 11($a$)–($b$) are diagram for representing change of the transmittance relative to the driving voltages V10, V90.
Figure 11B:
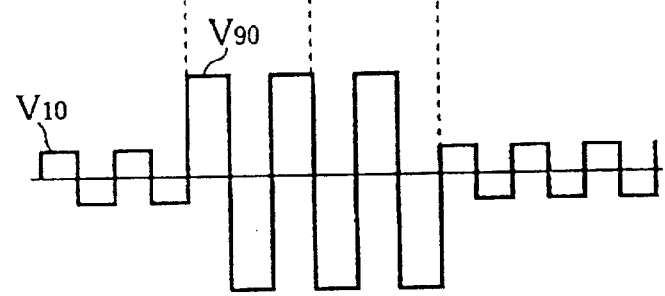

Shown in FIG. 10 is a change in speed of response resulting from the change in the deformation rate P as mentioned above. It is noted here that the speed of response was evaluated using the following values. When alternating waveforms of V90 and V10 shown in FIG. 11(b) are applied to the liquid crystal panels alternately, the amount of the transmitted lights changes from 10% (i.e., 80%×10%) to 90% (i.e., 80%×90%) and from 90% (i.e., 80%×90%) to 10% (i.e., 80%×10%) in the amount-of-change range between 10% and 90%, as shown in FIG. 11(a). The values obtained by adding the rising time T1 for the amount of the transmitted lights to change from 10% to 90% in the amount-of-change range been 10% and 90% and the rising time T2 for the same to change from 90% to 10% were taken as evaluation values of speed of response. As obvious from the line M1 of FIG. 10, the speed of response decreases with an increasing deformation rate P.

The decrease in the applied voltage V90 is one of the factors that cause the speed of response to decrease with an increasing deformation rate P as mentioned above, but the principal factor is that the orientations of the liquid crystal molecular alignments come relatively close to parallel to the substrates, and accordingly the momentum required to bring the molecules to rise up by the application of voltage increases.

As mentioned above, the deformation rate P advantageously provides the increased intensity in the scattering and the decrease in the applied voltage V90, but disadvantageously provides reduction of the speed of response. When the TFT substrate is used as in the embodiment of the invention, the γ property need not be made steepness, so that it is desirable to satisfy the relation of the deformation rate P(%) being 10% or less, without any consideration of the y property. This is because the transmittance decreases for the present with an increasing deformation rate, but after the deformation rate exceeds 10%, the transmittance increases rather than when the liquid crystal droplets are not deformed, as apparent from the result represented by the line M1 of FIG. 6.

Also, from the viewpoint of attaching importance to the speed of response, it is preferable to satisfy the relation of deformation rate P(%) being 5% or less, because the transmittance increases steeply at the deformation rate of 5%, as seen from the result represented by the line M1 of FIG. 6.

For the abovesaid deformation of the liquid crystal droplets, it is essential that the orientations of the liquid crystal molecular alignments are brought relatively close to parallel to the substrates (in other words, the effective tilt angles (θp) of the liquid crystal molecules are controlled) by the deformation of the liquid crystal droplets. It is noted here that the effective tilt angles are an index to indicate angles at which the mean orientations of the liquid crystal molecules to which no electric field is added are tilted from the parallel direction of the substrates. On the other hand, when the orientations of the liquid crystal molecular alignments are brought dose to parallel to the substrates, as described above, the dielectric con varies. Hence, defining the dielectric constant is also practicable for attaining the liquid crystal display element capable of providing improved scattering characteristics without impairing the display characteristics and also providing an increased steepness of the transmitted light amount with respect to voltage, to enable a passive matrix drive.

The inventors have succeeded in defining the dielectric constant experimentally. Specifically, when the dielectric constant are measured through the application of a very low voltage of about 0.1V, it is assumed that no substantial error exists bet the measured values measured under the application of a very low voltage and values of the dielectric constant obtained under the application of no voltage. Hence, considering the measured values as dielectric constant of the liquid crystal molecules to which no voltage is applied, the inventors conducted characteristic tests on liquid crystals of non-deformed and those different in deformation rate.

As a result of this, if the dielectric ratio E is set as E=(∈L−∈⊥)/Δ∈, improvement in scattering property and reduction of voltage were attained when E is in the range of 0.08 or more to less than 0.345. In the above equation, ∈L represents dielectric constant of the liquid crystal molecules to which no voltage is applied; ∈⊥ represents dielectric constant in a vertical direction of the liquid crystal molecules; and Δ∈ represents a difference between a dielectric constant ∈∥ of a parallel direction to the liquid crystal molecules and ∈⊥. Preferably, E is in the row of 0.11 or more to less than 0.345. It is noted that no deformation is given to the liquid crystals at the value of E of 0.345; the deformation rate P becomes 10 at the value of E of 0.08; and the deformation rate P becomes 5 at the value of E of 0.11.

As described above, desirable dielectric constant of the liquid crystals was experimentally specified successfully, while the relation between the effective tilt angle (θp) of the liquid crystal molecule and the dielectric constant ∈L thereof is given by $\in L = \in\perp + \Delta\in \times \sin^2 \theta p$. Hence, it is possible to define the effective tilt angle (θp) from the value of E of the liquid crystal molecules.

If it is now assumed that the absolute value of an angle at which rod-like liquid crystal molecules are tilted from the direction parallel to the substrates is expressed as θ and the mean value of all liquid crystal molecules is expressed as θp, the condition of E follows that θp is in the range of 17 or more to less than 35.5, preferably of 20 or more to less than 35.5. It is noted that at the value of θp of 35.5, no deformation is given to the liquid crystals.

The associated relationship among the dielectric ratio E, the moan value θp and the deformation rate P is shown in Table 1 given below.

TABLE 1

| Dielectric ratio E | Mean Value θ p | Deformation rate |
|---|---|---|
| 0.345 | 35.5 | 0 |
| 0.33 | 35 | 0.5 |
| 0.11 | 20 | 5 |
| 0.1 | 18 | 8 |
| 0.08 | 17 | 10 |
| 0.05 | 13 | 15 |
| 0.03 | 10 | 20 |

Next, the characteristics in the case of the strong anchoring strength is described below with reference to FIGS. 6, 7, 8 and 10. The characteristics in the case of the strong anchoring strength are represented by the line M2 in FIGS. 6, 7, 8 and 10. In the case of strong anchoring strength as well, a similar phenomenon to that in the case of the normal anchoring strength is generated, but the tendency of the liquid crystals to rise up vertically to the substrates is reduced. This is apparently seen from the line M2 in FIGS. 6, 7, 8 and 10.

The relationship between the transmittance and the deformation rate at the time of scattering shown in FIG. 6 is such that: at the deformation rate of 10%, the intensity of the scattering amounts to nearly maximum, in other words, the transmittance amounts to the minimum; at the deformation rate of 10% or more, the transmittance Increases; and at the deformation rate of 20%, the scattering of light amounts to the same value as at the initial state of no deformation being given, as shown in the line M2. At the deformation of 20% or more, the scattering of light gets worse than at the initial state and no improvement of scattering effects was seen. In other words, in the case of high anchoring strength, the effect of improvement of the scattering was seen at the deformation rate of 20% or less, as represented by the line M2.

Also, as represented by the line M2 of FIG. 7. the driving voltage decreases with an increasing deformation rate P, which is the same as in the case of the line M1 for the normal anchoring strength. However, the strong anchoring strength involves a disadvantage of a rise of the driving voltage, and as such required nearly two times more driving voltage in Example 1. Though the strong anchoring strength involves the disadvantage of a rise of the driving voltage, if the driving mode can afford to raise the driving voltage, the strong anchoring strength forms an effective means.

Also, FIG. 8 shows the relationship with steepness. There is no fundamental difference over the case of the normal anchoring strength. Further, FIG. 10 shows the relationship with the speed of response. The speed of response increases with an increasing anchoring strength, depending on high applied voltage.

EXAMPLE 2

In the embodiment 2, the extrusion of the liquid crystals was performed by means of a heat treatment. The polymer dispersion type liquid crystal element after polymerization or the polymer network type liquid crystal element was maintained at 120° C. for 50 hours without sealed. By this treatment also, the cell gap was reduced by 3% and the similar properties to those described above was obtained. This results from a volume expansion caused by the heat treatment. Specifically, the liquid crystal materials expand at the coefficient of volume expansion of about 0.3×10-3 [K-1]. Hence, the liquid crystal material develops into an expanded state under the high temperature of 120° C. and thus the internal pressure was increased. As a result of this, the liquid crystal materials are brought into a state that is virtually the same as the pressed state, an accordingly the liquid crystals are squeezed out from the unsealed injection port. The extrusion of the liquid crystal materials is thus produced.

Also, with the rise to the isotropic liquid phase, which is in a higher level in temperature than the nematic phase by heating, the fluidity was significantly increased, so that the extrusion of the liquid crystal materials was effectively performed.

EXAMPLE 3

In Example 3, the extrusion of the liquid crystals was performed by means of both pressure and heating. Performing the extrusion by means of the pressure only, as in the case of Example 1, requires a relatively much time, because the liquid crystals are not high in fluidity. Here, the liquid crystal display element was allowed to stand at a high temperature (120° C.) with pressurized with the jig of Example 1. By allowing the liquid crystal element to stand at a high temperature, the fluidity is raised, so the time for extrusion can be shortened. In the embodiment, it took 3 hours to obtain the deformation rate of 3%.

EXAMPLE 4

Figure 12:
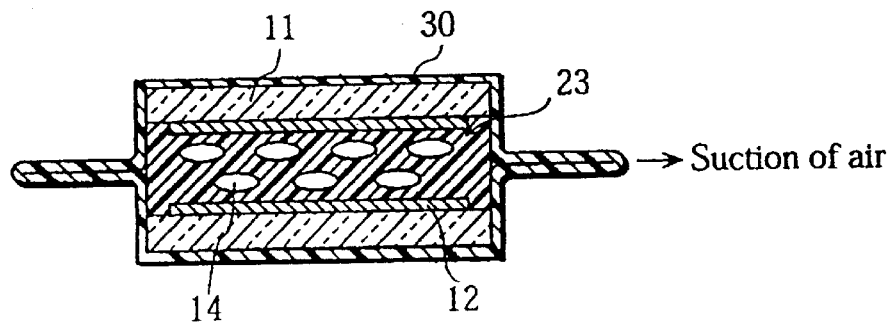
FIG. 12 is a sectional view of an apparatus for producing the liquid crystal display element of Example 4 of the 1st Embodiment of the invention.

In Example 4, the pressurization was performed by means of a vacuum pack, as shown in FIG. 12. In Examples 1 and 3 using the pressuring jig, there is a possibility that contaminants may enter into between the panels to produce unevenness in pressing. In this Example, the liquid crystal panels 23 were contained in a pack 30 and then a vacuum was produced in the pack 30 by suction of air, whereby the liquid crystal panels were pressed uniformly. This process however requires sufficient time because the pressure employed is as low as the atmospheric pressure. In the embodiment, it took 30 hours to obtain the deformation rate of 3% when the panels are allowed to stand at 120° C.

EXAMPLE 5

In Example 5, an application of hydrostatic pressure is employed for the pressurization. After having been subjected to the vacuum package beamed the abovesaid liquid crystal panels were given pressure by soaking the panels in a pressure tank, at which the hydraulic pressure was 1 kbar. Then, the panels were allowed to stand at room temperature. In the embodiment, it took 8 hours to obtain the deformation rate of 3%.

EXAMPLE 6

Figure 13:
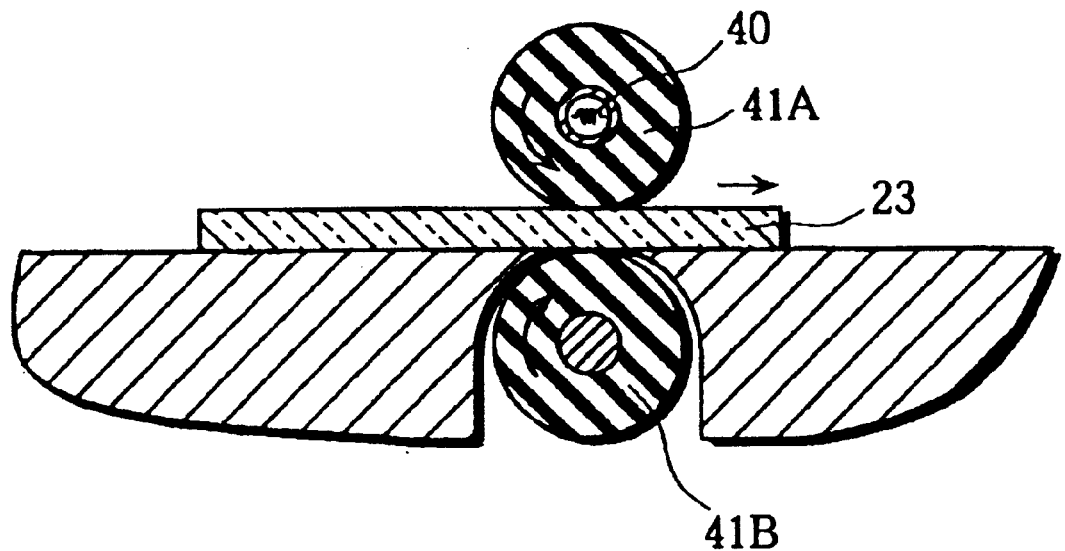
FIG. 13 is a sectional view of an apparatus for producing the liquid crystal display element of Example 6 of the 1st Embodiment of the invention.

In Example 6, the extrusion was performed by means of a roller press. Specifically, as shown in FIG. 13, the panel 23 was inserted in between a roller 41A containing a heating means 40 and a roller 41B, to do the extrusion. In the embodiment, it took 30 minutes to obtain the deformation rate of 1%.

EXAMPLE 7

In Example 7, the extrusion was performed by means of a volume expansion of a chalcogenide glass. Example 7 is substantially the same as Example 1, except that a chalcogenide glass layer is formed on the substrate 11 at the inner side from the electrode 12, which is one characteristic feature of Example 7, and that after the irradiation of ultraviolet the chalcogenide glass is irradiated with a laser beam, which is another characteristic feature in operation of Example 7.

It is generally known that the chalcogenide glass (e.g. As2 S3) is expanded in volume when irradiated with a laser beam (See, Japanese Laid-Open Patent Publication No. Hei 8-86903, for example). The chalcogenide glass layer was pre-formed in the liquid crystal panel. After the liquid crystals were separated out through the irradiation of ultraviolet to obtain the polymer network structure, the chalcogenide glass layer was irradiated with the laser beam. Then, the chalcogenide glass was expanded to allow the internal pressure of the liquid crystal panel to rise, with the aid of which the extrusion of the liquid crystals were attained.

EXAMPLE 8

In the above-described Examples 1 through 6, after polymerization, the liquid crystals were squeezed out by means of pressure and the like so that the liquid crystals can be deformed in the cell gap direction to bring the orientations of the liquid crystal molecular alignments relatively dose to parallel to the substrates. In contrast to this, Example 8 features that orientations of the liquid crystal molecular alignments are brought close to parallel to the substrates without any deformation of the liquid crystals. The liquid crystal molecules tend to align along magnetic field. With the aid of this tendency or property, the liquid crystals were rotated in the magnetic field and thereby the orientations of the liquid crystal molecular alignments were successfully aligned relatively uniformly with respect to the direction parallel to the substrates.

Figure 14:
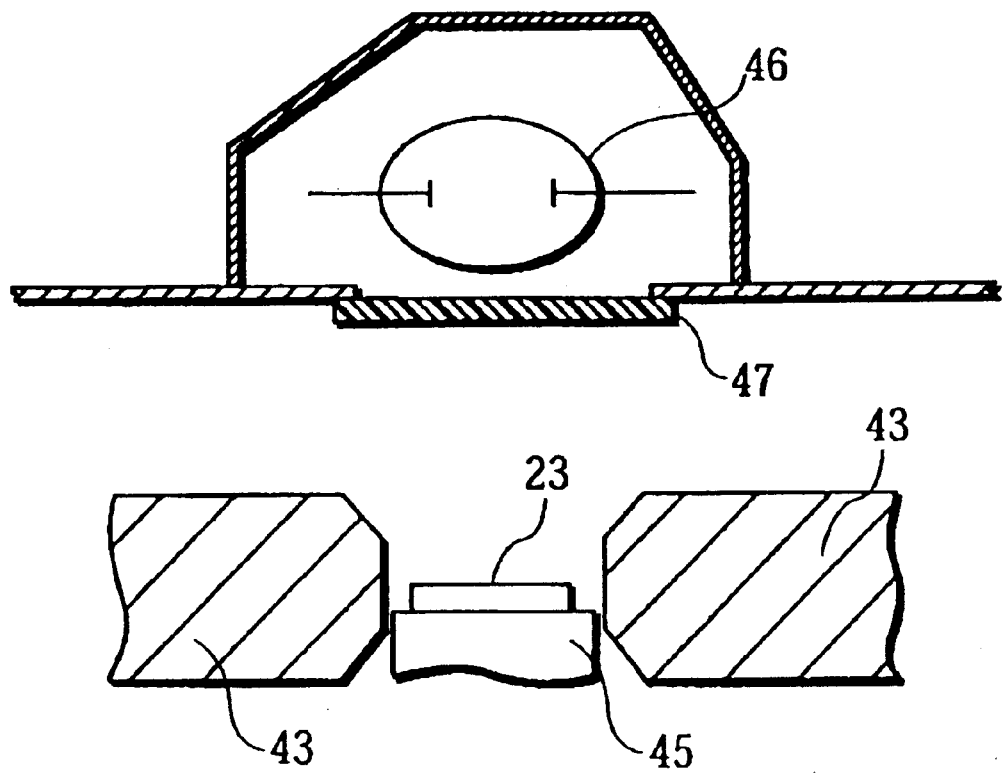
FIG. 14 is a sectional view of an apparatus for producing the liquid crystal display element of Example 8 of the 1st Embodiment of the invention.
Figure 15:
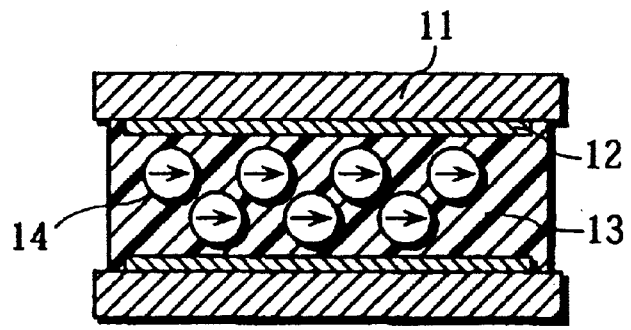
FIG. 15 is a sectional view of the liquid crystal display element of Example 8 of the 1st Embodiment of the invention.
Figure 16:
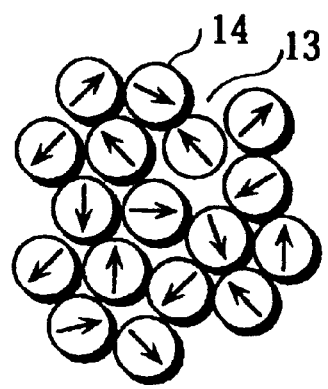
FIG. 16 is a plan view of a part of the liquid crystal display element of Example 8 of the 1st Embodiment of the invention.

Specifically, as shown in FIG. 14, a turntable 45 was installed in the magnetic field generated by magnetic field addition means 43, and the polymerizing process as described in Example 1 was carried out on the turntable 45. The ultraviolet from a ultraviolet lamp 46 was irradiated on the liquid crystal panel 23 mounted on the turntable 45 through a filter 47 and thereby the polymerization of the monomers was progressed to deposit the liquid crystals. When a voltage is being applied to the magnetic field at this time, the liquid crystal molecules tend to align along the direction of the magnetic field. Here, the turntable 45 is being rotated, so that there is a high probability for the liquid crystal molecules to orient in the direction parallel to the substrates, thus allowing the liquid crystal molecular alignments in the direction parallel to the substrates to be uniform in orientation, as shown in FIG. 15. Further, the rotation of the turntable 45 allows the liquid crystal molecules to be random in respect of orientation in a plane of the substrates, as shown in FIG. 16. FIG. 16 is a conceptual representation of the liquid crystal display element when viewed from the top. In FIGS. 15 and 16, the orientations of the liquid crystal molecular alignments are each depicted by an arrow.

When reduction of the effective tilt angle is made by means of the press and deformation, equally pressing the liquid crystal molecules in the cell gap direction is difficult, and as such generates a shearing stress in the direction parallel to the substrates, to allow the main axes of the liquid crystals to align along the shearing direction. In this respect, in Example 8, by rotating the turntable 45 in the magnetic field, the orientations of the liquid crystals aligned were brought relatively dose to parallel with the substrates but random in a plane of the substrates, thereby providing a further improved intensity of the scattering.

Also, where the effective tilt angles of the liquid crystals are controlled by means of the magnetic field, as in the case of Example 8, the liquid crystal droplets are nearly a sphere in shape and are not given any particular deformation. However, it was found that at the magnetic field strength of 0.3 tesla, the effective angle ($\theta$p) of the liquid crystal droplets was a 30 degree and thus the proportion of the deformation with respect to the direction parallel to the substrates increased relatively. The degree of the molecular alignments was dependent on the magnet field strength, and the effect was seen at the magnetic field strength of 0.1 tesla or more. At the magnetic field strength of 3 tesla or more, the effective tilt angle ($\theta$p) of the liquid crystal molecules of substantially a zero degree was obtained.

When the polymer dispersion type liquid crystal element is pressed and deformed, the scattering of light begins to deteriorate steeply with the deformation rate of 10% or more. This is why as the deformation increases, the molecules begin to rise up vertically to the substrates, as mentioned above, and thereby the effective tilt angles increase. For this reason, the deformation has a limitation in reducing the effective tilt angle. In Example 8, the effective tilt angles were able to be reduced to a zero degree by the reduction of the tilt angels of the molecules, without performing the deformation. This enabled the intensity of the scattering to be increased without any deterioration of the intensity of the scattering as shown in the FIG. 6. According to Example 8, the good properties was obtained when the effective tilt angle $\theta$p was in the range of 0 or more to less than 35.5. If this condition is applied to the case where the dielectric constant is set as $E=(\in L - \in \perp)/\Delta \in$, taking $\in L$ as dielectric constant of liquid crystals contained in the complex, $\in \perp$ as a dielectric constant in a vertical direction of a liquid crystal molecule in a simple liquid crystal and $\Delta \in$ as anisotrpy in the dielectric constant in the simple liquid crystal, the rest follows that E is in the range of 0 or more to less than 0.345.

Further, in Example 8, no anisotropy in azimuth angles of the liquid crystal molecules with respect to the direction parallel with the substrates is beneficial for facilitating generation of the scattering of light.

EXAMPLE 9

Figure 17:
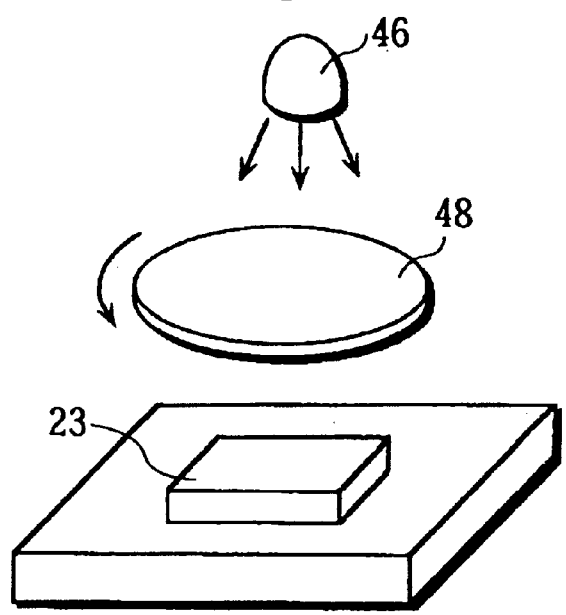
FIG. 17 is a perspective view of an apparatus for producing the liquid crystal display element of Example 9 of the 1st Embodiment of the invention.

As shown in FIG. 17, the polymerization made through the application polarized ultraviolet in the polymerization process also enabled the orientations of the liquid crystal molecular alignments to come close to parallel to the substrates, without any pressing of the liquid crystals, as in the case of Example 8.

Specifically, when polymerized through the application of ultraviolet to deposit the liquid crystals, the monomers were irradiated with the polarized ultraviolet. Here, an ultraviolet polarizer 48 was set between a liquid crystal panel 23 and a ultraviolet lamp 46 and was kept on rotating. The polarized ultraviolet impinges on the panel 23 and so the polymerization of the monomers progresses, with anisotropy in orientation of polarized lights. Since orientation of polarization changed, the probability of the liquid crystal molecules being oriented nearly in parallel with the substrates increased, though random with respect to the orientation in a plane of the substrates.

EXAMPLE 10

In Example 10, the polymerization was performed under high temperature, and thereby the polymer dispersion type liquid crystal element or polymer network type liquid crystal element deformed into a compressed form was attained.

As described in Example 1, temperature of the liquid crystal panel filled with the mixture of liquid crystals and monomers is increased to high temperature, at the temperature of which ultraviolet is irradiated to allow the liquid crystals to be deposited. The liquid crystals formed at high temperature have a isotropic shape under high temperature (sphere in the polymer dispersion type liquid crystal element). When the formed liquid crystals are cooled to room temperature, the liquid crystals are contracted in volume. The coefficient of contraction of glass is small, so the liquid crystals are small in contraction in the plane of the substrates. Due to this, the contraction of volume is generated in the cell gap direction. When the liquid crystals, after polymerization at 60° C., were cooled to 30° C., the volume of the liquid crystals were contracted 3% in the cell gap direction, which equals to the deformation rate P(%) of 3%. Thus, the same property was obtained in this Example.

The polymerization at 35° C. is sufficient for obtaining the deformation rate P(%) of 0.5%; the polymerization at 40° C. or more is desirable for obtaining satisfactory effects. From around 70° C. the size of the polymer matrix increased disadvantageously, and over 80° C. the monomer materials vaporized undesirably. A sufficient polymerization temperature is in the range of 35° C. or more to 80° C. or less, preferably, 40° C. or more to 70° C. or less.

EXAMPLE 11

In Example 11, the passive matrix drive employing no TFT substrates was made available. The panel structure is substantially the same as that of Example 1, but the substrates used are those using no TFT. Due to this, in this Example, selection signals were scanned over one of the substrates, whereas signals corresponding to the presence or absence of displays are applied to the other of the substrates.

The passive matrix is somewhat poor in speed of response and in scattering of light, but is not required for properties so much as the TFT panel; rather than the passive matrix is advantageous in considerable costs reduction.

As described in Example 1, the steepness increases with an increasing deformation rate. As shown in FIG. 8, the γ becomes 1.3 or less at the deformation of 8% or more, then enabling the passive matrix drive of 10 lines or more. However, when the deformation rate exceeds 20%, the intensity of the scattering under a low temperature deteriorates so significantly that it is difficult to use. In addition, with the deformation rate of 20% or more, pressure reduction develops considerably, causing the problem that bubbles are easily generated under a low temperature. From the viewpoint of attaching importance to the speed of response, it is preferable to limit the deformation rate to 15% or less.

The effective tilt angle (θp) of the liquid crystal molecules is then in the range of 10 or more to 18 or less, preferably, 13 or more to 18 or less, and the dielectric ratio (E) comes to be in the range of 0.03 or more to 0.10 or less, preferably, 0.05 or more to 0.10 or less.

EXAMPLE 12

Figure 18:
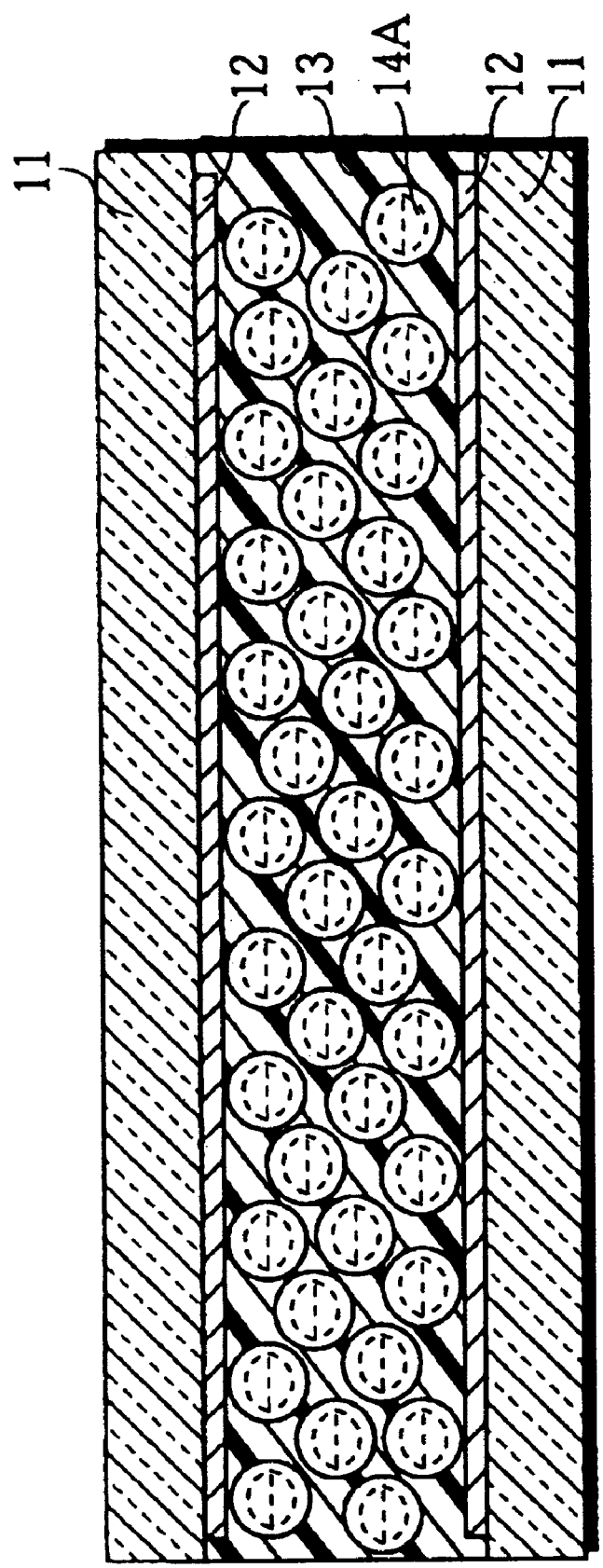
FIG. 18 is a sectional view of the liquid crystal display element of Example 12 of the 1st Embodiment of the invention.
Figure 19:
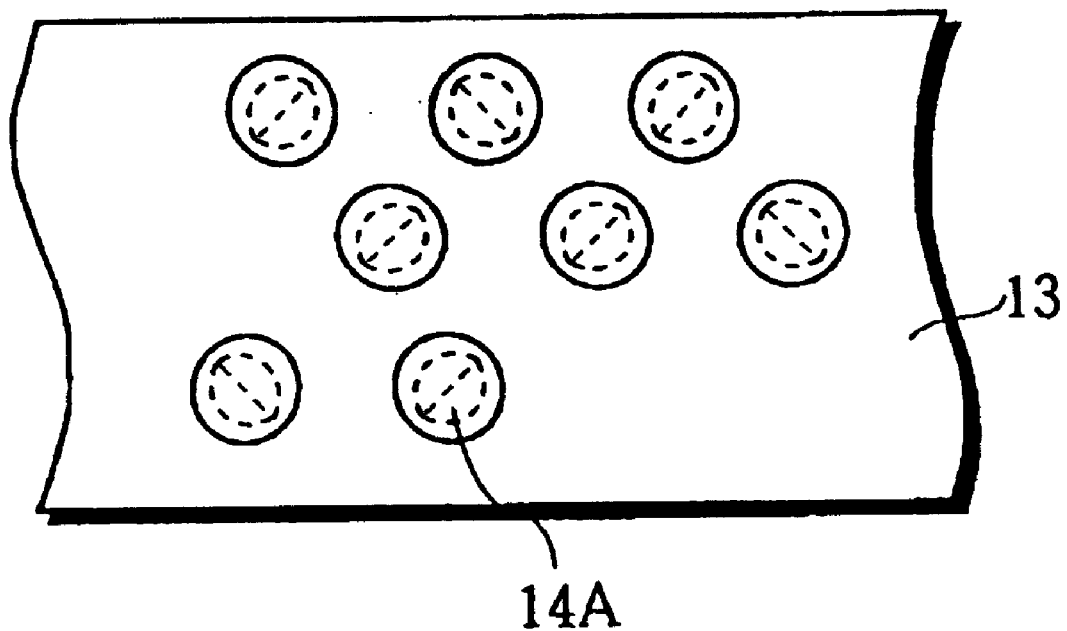
FIG. 19 is a plan view of a part of the liquid crystal display element of Example 12 of the 1st Embodiment of the invention.

FIG. 18 shows a sectional view of the liquid crystal display element of Example 12 according to the invention, and FIG. 19 shows a plan view thereof. In FIGS. 18 and 19, the same element as those in Example 1 are provided with the same numerals and the explanation thereon is omitted. Example 12 is different form Example 1 in that the liquid crystal droplets 14A each have a spherical structure, not a compressed structure and that the liquid crystal molecules in the liquid crystal droplets 14A aligned are rendered more random in a plane of the substrates.

In FIG. 18, the array of the liquid crystal molecules is depicted as a bipolar structure with two poles orienting at the lateral sides of the Figure, with an intention of defining the bipolar axes as being located in nearly parallel with the substrates, not as being aligned in uniaxially. The bipolar axes are located in the plane of the substrates on a further random basis than in Example 1, as shown in FIG. 19.

By bringing the orientations of the liquid crystal molecular alignments close to the horizontal like this, the anisotropy Δn in refractive index with respect to the direction parallel to the substrates which contributes to the scattering of light is increased effectively, and as a result of this the scattering intensity is increased. Also, the effective anisotropy Δ∈ in dielectric constant is also increased, with the result that the driving voltage is decreased. In addition, since uniform liquid crystal molecular alignments in the inside of the liquid crystal droplets are ensured over almost all liquid crystal droplets 14, the γ property of the driving voltage is made steeper advantageously.

Next, the method of producing the liquid crystal display element having the abovesaid structure will be described below. First, two substrates 11 are laminated together with their confronting each other. Transference electrodes 12 are formed on the substrates 11 at the inside thereof, respectively. An active matrix substrate forming TFTs (Thin Film transistors) is used for one of the substrates. A distance (cell gap) between the two substrates 11 can be kept uniform with resin beads of a grain size of for example 12 μm sprayed in advance on the substrates.

Next, a mixture of liquid crystals, polymerizable monomers, oligomers and polymerization initiators is introduced in between the substrates 11 by means of a vacuum filling. Thereafter, polymerization of the polymerizable monomers with the oligomers is made by irradiation of ultraviolet with dominant wavelengths of 365 nm to thereby produce polymer network type liquid crystal element in which spherical liquid crystal droplets 14A as liquid crystal materials are dispersed in series in the polymer matrix. The polymer dispersion type liquid crystal element in which the liquid crystal droplets are dispersed in the polymer matrix may be structurally produced, of course.

In this process, liquid crystal monomers are employed as the polymerizable monomers, which is the characteristic feature of the invention. The "liquid crystal monomers" herein used is the one called as a UV curable liquid crystal, which is a compound which exhibits a liquid crystal condition in a monomer state (See, Symposium on page 391 of The $22^{nd}$ Liquid Crystal Symposium by Mr. Hasebe and others, for instance).

Figure 20A:
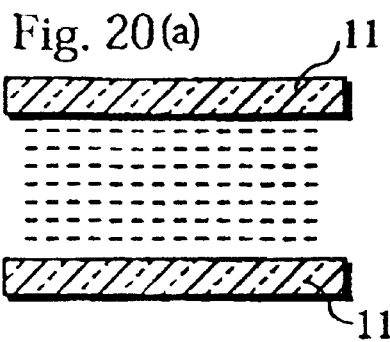
FIGS. 20(a)–(b) are diagrams illustrating a polymerization process in the case of employing liquid crystal monomers.
Figure 20B:
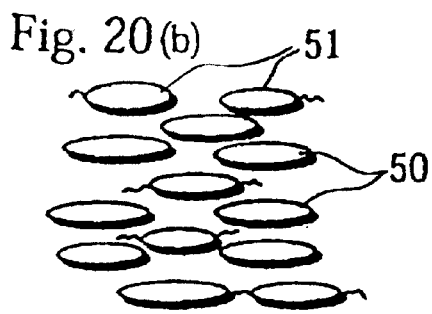
Figure 21A:
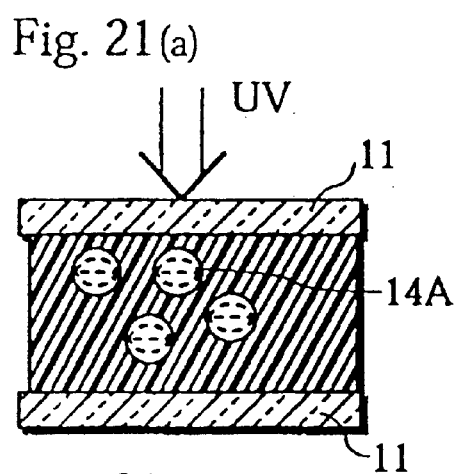
FIGS. 21(a)–(b) are diagrams illustrating a polymerization process in the case of employing liquid crystal monomers.
Figure 21B:
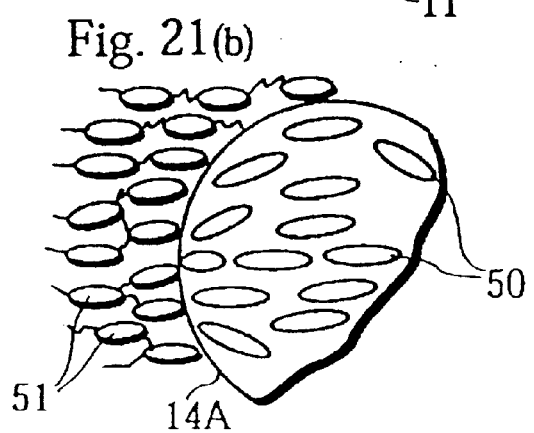

When the liquid crystal monomers are employed as the polymerizable monomers, the mixture of the liquid crystals, polymerizable monomers, oligomers, and polymerization initiators displays a homogeneous liquid crystal layer at room temperature. When this mixture is injected in between the abovesaid substrates, the mixture of the liquid crystals and the liquid crystal monomer in this Example are aligned in parallel to the substrates. With the invention, the surfaces of the substrates are not particularly required to be coated by any layer, but some alignment layer with a horizontal alignment property, which is used with the TN element and the like, may be applied to the surfaces of the substrates. However, no rubbing treatment for aligning the element in one direction is performed, differently from the case of the TN element. Like this, the mixture has exhibited a liquid crystal condition since before polymerized, and its molecules are being aligned in parallel to the substrates. However, since the mixture undergoes no rubbing treatment, the molecules are aligned in the plane of the substrates on a random basis. This state is shown in FIG. 20. FIG. 20 shows the state prior to polymerization, FIG. 20(a) is a general view and FIG. 20(b) is a partially enlarged view of FIG. 20(a). For the sake of simplicity, the liquid crystal molecules 50 are depicted in the drawings as if they are aligned laterally, but they are symbolically depicted with the intention of indicating that they are horizontally aligned; that is, it does not mean that the liquid crystal molecules are aligned unidirectionally. The liquid crystal molecular alignments are random in orientation when viewed from the above. When the mixture in that state is irradiated with ultraviolet, the liquid crystal monomers 51 are polymerized and associated together progressively. Due to this, the molecules of the liquid crystal monomers 51 increase in size, and then the liquid crystal molecules 50 are excluded. For this reason, when the polymerization is advanced, the liquid crystal monomers 51 polymerized with the liquid crystals are separated progressively. In this Example, the liquid crystals thus separated took a droplet form or a network form. This state is shown in FIG. 21. FIG. 21(a) is a general view and FIG. 21(b) is a partially enlarged view of FIG. 21(a). The liquid crystal molecules 50 have been aligned in parallel to the substrates from the initial condition, under the influence of which the molecules 50 hove the strong tendency of being aligned in parallel to the substrates even after polymerization. According to the invention, the state in which the liquid crystal molecules 50 is aligned close to parallel to the substrates after polymerization was realized by use of the liquid crystal monomers 51.

Further, it may be said that the characteristic feature of the invention resides in that the abovesaid mixture is in the liquid crystal condition, in which the irradiation of the ultraviolet is performed to separate the liquid crystal monomers. In the prior art in which the polymerizable monomers different than the liquid crystal monomers are employed, the mixture of the liquid crystals, polymerizable monomers, oligomers, and polymerization initiators displays an isotropic liquid phase, as shown in FIG. 22(a). When the mixture of such a isotropic liquid phase is irradiated with ultraviolet, the monomers are polymerized to allow the liquid crystals to be separated out. The then liquid crystal molecules are in the state in which the orientations of the liquid crystal molecular alignments are inhomogeneously distributed, as shown in FIG. 22(a). In FIG. 22, the orientations of the liquid crystal molecular alignments are indicated by arrows.

On the other hand, the mixture according to the invention, in which the liquid crystal monomers are employed for the polymerizable monomers, has exhibited a homogeneous liquid crystal layer since before polymerization, as shown in FIG. 22(b), and as such enables the polymerization process in which the liquid crystals are separated out from in the liquid crystal layer. Thus, the liquid crystal molecules are affected by the initial orientations of the liquid crystal molecular alignments, so if the initial orientations of the liquid crystal molecular alignments are preset horizontally with respect to the substrates, the molecules then have the increased tendency of being aligned nearly the horizontal even after polymerization.

The mixture employing the liquid crystal monomers for the polymerizable monomers is injected in between a pair of substrates and then is irradiated with the ultraviolet. The liquid crystal monomers and the oligomers are then polymerized, with the polymerization initiators formed as the nucleus, and as a result of this, the liquid crystal droplets 14A (or the polymer network) are formed. Here, if the condition for allowing the molecules to be aligned in parallel to the phase boundary of glass in the before-polymerization liquid crystal layer is preset, the molecules is then affected by the paralleled condition before polymerization, to increase the tendency of the orientations of the liquid crystal molecular alignments after polymerization being aligned nearly in parallel to the phase boundary of glass, as shown in FIG. 22(b), thus ideally obtaining the structure in which the bipolar axes of the molecules are aligned in parallel to the phase boundary of glass. Further, the liquid crystal monomers may include chiral carbon. This can provide a helical structure for the liquid crystal molecules to spiral in the cell gap direction, to provide further improved scattering effects.

In Example 12, a polyimide layer (RN740, trade name, made by NISSAN CHEMICAL INDUSTRIES, LTD.) was applied to a glass substrate 11 and baked, so that the liquid crystal molecular arrays before polymerization are preset to be nearly parallel to the phase boundary of glass. Here, there is no need to subject the polyimide layer to the rubbing treatment, which contributes to simplification in process. The rubbing treatment is not suitable for this invention in that the orientations of the liquid crystal alignments are aligned uniaxially by the rubbing treatment. Rather than that, it is desirable for the invention to keep the initial orientations of the alignments random without doing any alignment treatment. In Example 12, no specific alignment treatment was made, so that before polymerization the liquid crystal molecules were aligned in parallel to the phase boundary of glass but were noted on a random basis in the plane of the substrates. Hence, there was the strong tendency of the liquid crystal molecules, after formation of liquid crystal droplets, being oriented on a random basis with respect to the direction in a plane of the substrates but aligned in parallel to the phase boundary of the glass. Also, the effective tilt angles ($\theta$p) of the then liquid crystal molecules were reduced and became as small as 20°.

Thus, according to Example 12, by presetting the liquid crystal molecular alignments in the liquid crystal display element to be parallel to the phase boundary of glass, similar results to those in the above-described embodiments were attained, while also by orienting the liquid crystal molecular alignments in the plane of the substrates on a further random basis than in the above-described embodiments, further improved scattering characteristics were yielded.

In this respect it is noted, for reference purposes, that in the case of the mode in which polymerization is carried out in magnetic field or by the application of polarized ultraviolet, as in the case of Example 8 or 9, rotation speed of the turntable or of the polarizer must be controlled, so that it is difficult to produce completely random orientations of the liquid crystal molecular alignments in the plane of the substrates. In Example 12, completely random orientations of the liquid crystal molecular alignments in the plane of the substrates was achieved with a simple mode, as mentioned above, thus providing an advantage of facilitating the production.

Next, comparison between the liquid crystal display element produced by the above-described method of Example 12 and those produced by the conventional method in which no liquid crystal monomers were employed as the polymerizable monomers was made on their characteristics of a scattering gain, the driving voltage and the $\gamma$ property. The term of "scattering gain" herein used means an index to indicate the degree of the scattering of light. If the scattering gain is set G, the G is represented as G=(a luminance of panel/a illumination of panel)×$\pi$. Also, the liquid crystal display element of Example 12 have the effective tilt angles ($\theta$p) of 20°.

By bringing the liquid crystal molecular arrays close to parallel to the horizontal, in other words, by reducing the effective tilt angles (θp) of the liquid crystal molecules, or by decreasing the dielectric ratio E, the results of increased scattering property, reduced driving voltage, and increased steepness of the γ property were produced, as shown in Table 2.

TABLE 2

|  | Prior Art | This Invention |
|---|---|---|
| Scattering Gain | 1.2 | 0.85 |
| Driving Voltage | 8 | 7.0 |
| γ Property | 1.7 | 1.5 |

The test results of the inventors showed that the intensity of the scattering was increased at the θp of less than 35.5, and the contrast was significantly improved at the θp of 20 or less. If expressed by the dielectric ratio E, in place of by the effective tilt angles (θp), the results follow at the scattering property was increased with the dielectric ratio E being in the range of 0 or more to less than 0.345, and the contrast was significantly improved with the dielectric ratio E of 0.11 or less.

Referring now to the anisotropy Δn in refractive index of the liquid crystal monomers, there is a problem that the increasing Δn causes deterioration in transparency when a voltage is applied. The test results of the inventors showed in this respect that there was no practical problem when the Δn was 0.20 or less, and the transmittance obtained could stand comparison with that of typical acrylic monomers when the Δn was 0.15 or less.

EXAMPLE 13

In Example 13, one of the pair of substrates 11 was given microscopic rubbing treatments in several directions, as shown in FIG. 23, and microscopic asperities were formed on the other of the substrates, as shown in FIG. 24. Others are the same as those of Example 12.

The microscopic rubbing treatments were carried out by pressing a roughened sheet having microscopic asperities with 20 μm pitches against the surface of the substrate 11 and rubbing it thereon in several directions at several times per direction. The polyimide layer (RN740, trade name, made by NISSAN CHEMICAL INDUSTRIES, LTD.) was employed for the alignment layer. The microscopic asperities on the other substrate 11 were made of acrylic resins and were randomly formed with 1 μm pitches and 0.1 μm heights.

The microscopic rubbings and asperities on the surfaces of the substrates thus formed provided the results that the orientations along which the molecules of the mixture before polymerization are to be arranged were rendered more random and finer, thus providing further improved intensity of the scattering.

Further, the embodiment 13, in which one substrate was given to microscopic rubbing treatments and microscopic asperities were formed on the other substrate, may be modified so that only one substrate is given to the microscopic rubbing treatments, while a general type substrate is used for the other substrate without forming any microscopic asperities thereon. Likewise, the embodiment 13 may be modified so that the microscopic asperities are formed on one substrate, while a general type substrate given to no rubbing treatments is used for the other substrate.

Though references were given to the liquid crystal display element of active matrix drive in Examples 12 and 13, the invention according to which the liquid crystal monomers are employed for the polymerizable monomers is suitably workable to the liquid crystal display element of passive matrix drive. In the case where the invention is applied to the liquid crystal display element of passive matrix drive, the effective tilt angle (θp) of the liquid crystal molecules may be in the range of 10 or more to 18 or less, preferably, 13 or more to 18 or less, or if expressed by the dielectric ratio E, in place of by the effective tilt angel, it follows that the dielectric ratio E may be in the range of 0.03 or more to 0.10 or less, preferably, 0.05 or more to 0.10 or less.

Second Embodiment

While in the first embodiment mentioned above, the polymerization process to the mixture is performed in only one step, in the second embodiment, the polymerization process to the mixture is performed in two steps including a step for performing a polymerization to the mixture even after the compressing process of the liquid crystals, to produce the liquid crystal display element. The use of this two-steps polymerization mode enables the liquid crystal compression time to be considerably shortened, in comparison with the first embodiment. The substantial contents of the second embodiment will be described below, with reference to Examples 1 through 8.

EXAMPLE 1

In Example 1, the liquid crystal display element according to the invention was produced by means of (1) preparation of an evacuated cell; (2) preparation of the mixture; (3) an injection process of the mixture into between the substrates; (4) a first polymerization process; (5) an extrusion process of the liquid crystals; and (6) a second polymerization process.

Specific description on these processes will be given below.

(1) Preparation of an Evacuated Cell

A pair of transparent glass substrates with transference electrodes are laminated together via spacers, with an end-sealing part, which is made of heat-curing-type sealing materials and through which liquid crystals are injected, being interposed between the substrates, and then the sealing materials are completely cured by heating, to prepare the evacuated cell.

(2) Preparation of the Mixture

Liquid crystal materials, thermal polymerization initiators, photo polymerization initiators and polymerizable materials are added and then the resultant mixture is stirred to prepare a homogeneous mixed solution.

Here, as for the liquid crystal materials, various kinds of liquid crystal materials, such as nematic liquid crystals, cholesteric liquid crystals, and smectic liquid crystals, which have anisotropy in positive dielectric constant and exhibit the liquid crystal condition at around ordinary temperatures, may be employed. An actual example of the liquid crystal materials is TL-213 (made by Merck Japan Limited). One kind of or the mixture of two or more kinds of liquid crystal materials may be available. Also, for example coloring matters of dichroism may be contained in the liquid crystal materials. Further, the invention may be designed so that the coloring matters of dichroism, different in color from each other, are contained in the liquid crystal materials and the polymer liquid crystal complex layers are laminated so that the invention can be applicable to the liquid crystal display element able to display in full color.

As the thermal polymerization initiators, t-butyl peroxide may be employed, for example.

As the photo polymerization initiators, DAROCUR 1173 (made by CIBA-GEIGY LTD.) may be employed, for example.

As the polymerizable materials, various kinds of polymerizable materials which are polymerized by light or heat to produce polymer compounds having transparency may be employed. Typically, monomers and oligomers having polymerizable functional group including e.g. acrylate, methacrylate and epoxy are employed. Specifically, as the polymerizable monomers, n-tridecyl acrylate, 2-ethylhexyl acrylate, 2-hydroxyethyl acrylate, monohydroxyethyl acrylate phthalate, neopentyl glycol diacrylate and hexane diol diacrylate may be employed, for example. As the polymerizable oligomers, polyurethane acrylate, 1,6 hexane diol diacrylate, pentaerythol diacrylate monostearate, oligourethane acrylate, polyester acrylate, glycerine diglycidyl ether may be employed, for example.

The thermal polymerization initiators' content and the photo polymerization initiators' content are determined allowing for the first and second polymerization processes. Specifically, when the first polymerization process is performed by the polymerization, the thermal polymerization initiators' content is set to such an amount that the thermal polymerization initiators may be wholly consumed by polymerization reaction with the polymerizable materials, to produce a first polymerization state. The first polymerization state means a predetermined curing state in which polymers and liquid crystals are in phase separation and also the polymerization reaction of the polymerizable materials is in the course of progress, so that unreacted polymerizable materials remains in the polymers and also the curing state of the polymers allows a part of the liquid crystals in the separated liquid crystal droplets to be extruded out from between the substrates.

When the second polymerization process is performed by the photo polymerization, the photo polymerization initiators' content is set to such an amount that at least the photo polymerization initiators may be reacted with the remaining unacted polymerizable materials, to produce a second polymerization state. The second polymerization state means a curing state in which the polymers are completely cured by subjecting the remaining unacted polymerizable materials to photo polymerization to allow the polymerization reaction of all the polymerizable materials to be completely concluded.

In the case where the first polymerization process is performed by the photo polymerization and the second polymerization process is performed by the thermal polymerization, the thermal initiators' content and the photo polymerization initiators' content are determined based on the same concept as in the case where the first polymerization process is by the thermal polymerization and the second polymerization process is performed by the photo polymerization.

(3) Injection Process of the Mixture into Between the Substrates

The solution mixture is injected from the end-sealing part of the evacuated cell.

(4) First Polymerization Process

The mixture in the liquid crystal cell is heated. By the heating, the polymerizable materials (polymerizable monomers and oligomers) are reacted with the thermal polymerization initiators, so that the polymers and the liquid crystals are phase separated. The liquid crystals phase separated are formed into spherical liquid crystal droplets having a diameter of around a few $\mu$m and are dispersed in the polymer liquid crystal complex.

Figure 25:
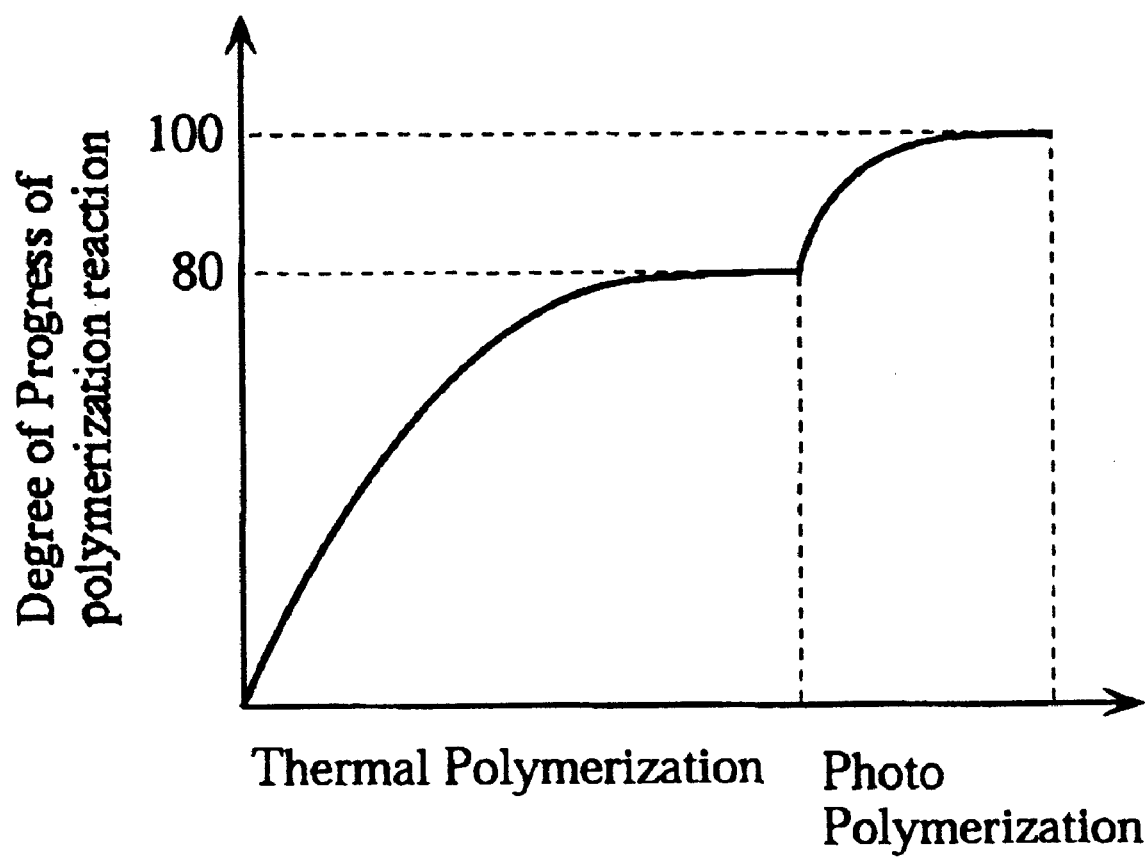
FIG. 25 is a diagram for illustrating a polymerization method of Example 1 of the 2nd Embodiment of the invention.

As shown in FIG. 25, the first polymerization process ends at the first polymerization state in which the polymerization reaction of all the polymerizable materials is not completely concluded (in which e.g. 80% of the entirety are polymerized). Hence, in the first polymerization state, the polymerizable materials of for example about 20% remains unreacted.

(5) Extrusion Process of the Liquid Crystals

To deform the spherical liquid crystal droplets into compressed or flattened form, the liquid crystal cell is pressed to extrude the liquid crystals from the end-sealing part of the liquid crystal cell. It is noted here that as mentioned above, in the first polymerization process, the polymerization reaction of all the polymerizable materials is not completely concluded, and hence the extrusion of the liquid crystals can be made easily. Thus, the extrusion of the liquid crystals allows the liquid crystal droplets to have a compressed structure of their being contacted in the cell gap direction. This can form an increasing proportion of the liquid crystal molecules aligned in nearly parallel with the substrates with respect to the liquid crystal molecules in the liquid crystal droplets, to increase the intensity of the scattering. The compression of the liquid crystal droplets has a deformation ratio of 1.15 or less, when expressed in deformation ratio.

A press, a roller, a vacuum pack and the like are used as means for pressing the liquid crystals.

It should be noted that the extrusion process of the liquid crystal may be performed during the first polymerization process.

(6) Second Polymerization Process

After the extrusion process of the liquid crystals, the mixture is irradiated with the ultraviolet, to subject the remaining unreacted polymerizable materials to the photo polymerization, and thereby the polymerization reaction of all the polymerizable materials in the mixture are completely concluded, as shown in FIG. 25. Since the polymers are completely cured by this process, the liquid crystal droplets are allowed to keep their compressed structure over the long time, to improve the reliability of the liquid crystal display element. It should be noted that the second polymerization process may be performed during the extrusion process of the liquid crystals.

Thus, according to the invention, the liquid crystal display element excellent in scattering for light and high in reliability can be produced.

Figure 26:
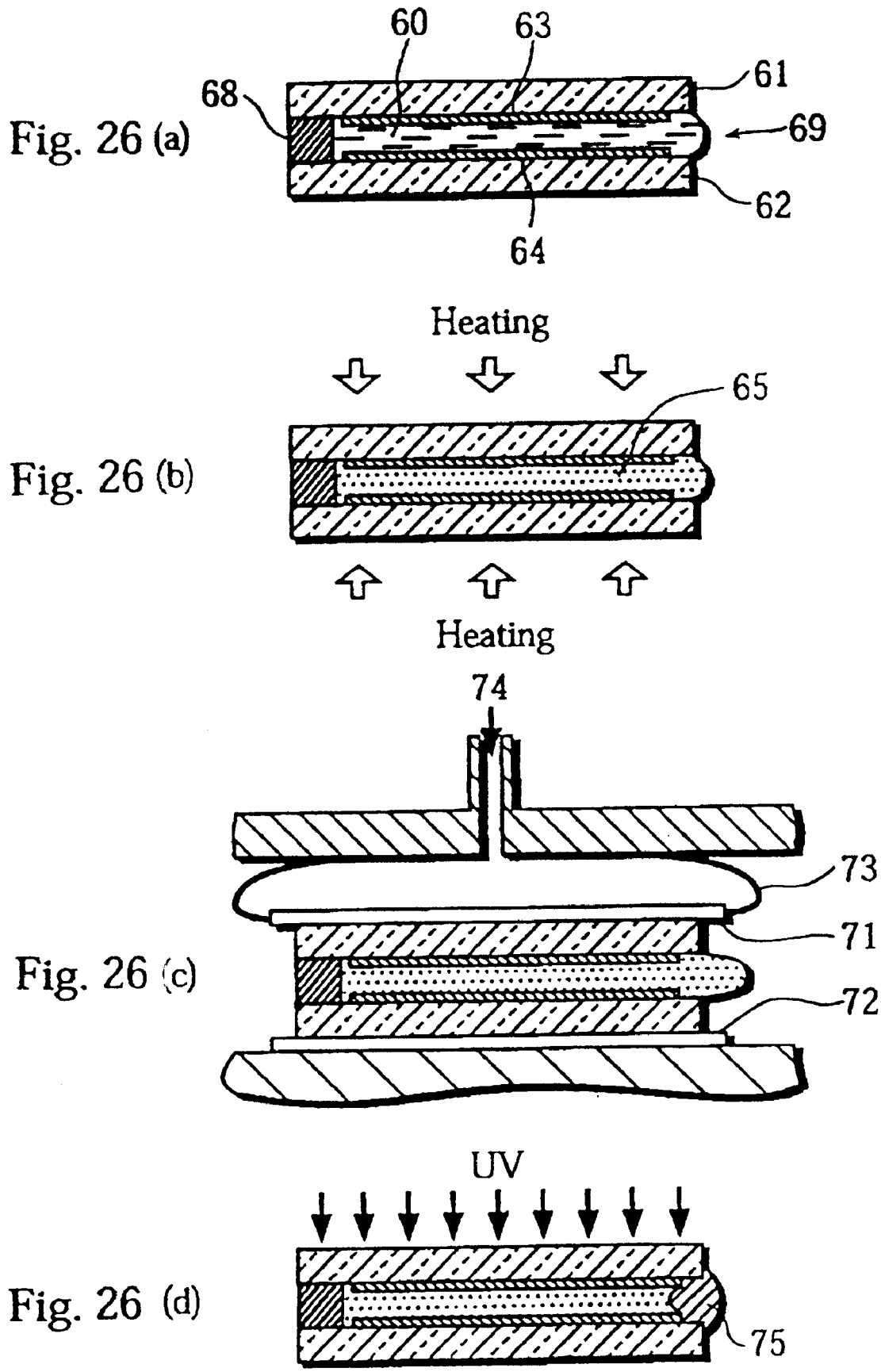
FIGS. 26(a)–(d) are diagrams showing a production process in Example 1 of the 2nd Embodiment of the invention.

The producing method of Example 1 is more specifically described below with reference to FIG. 26.

Figure 27:
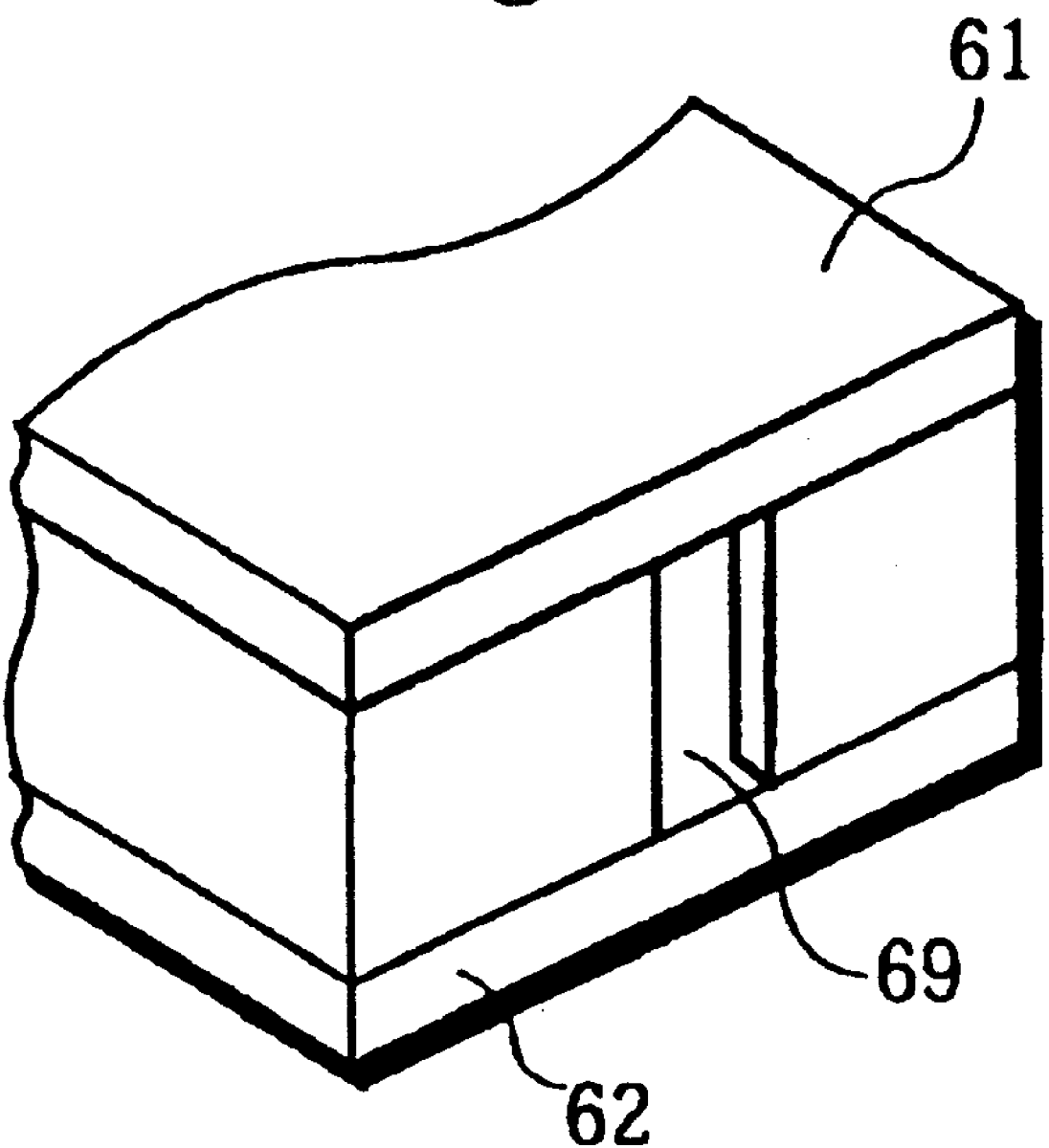
FIG. 27 is a perspective view of a part of the liquid crystal display element in the vicinity of an end-sealing part 69.

A pair of transparent glass substrates 61, 62 with tranferance electrodes 63, 64 made of indium.tin oxide layer were laminated together via plastic spacers having a diameter of 12 $\mu$m (MICRO PEAL (trade name) made by SEKISUI FINE CHEMICAL CO., LTD), with an end-sealing part 69 (FIG. 27) of heat-curing-type sealing materials 68 (STRUCT BOND (trade name) made by MITSUI TOATSU CHEMICALS, INC) being interposed between the substrates, and then were heated at 150° C. for 2 hours to allow the sealing materials to be completely cured, to obtain the evacuated cell.

Next, 8.50 g of TL-213 (made by Merck Japan Limited) as the liquid crystal material, 0.80 g of n-tridecyl acrylate as the polymerizable monomer, 0.60 g of polyurethane acrylate as the polymerizable oligomer, 0.05 g of t-buthyl peroxide as the thermal polymerization initiator, and 0.05 g of DAROCUR 1173 (made by CIBA-GEIGY LTD.) as the photo polymerization initiator were added and then the resultant mixture was fully stirred at 25° C. to prepare a homogeneous mixed solution 60.

The homogeneous mixed solution 60 was vacuum injected into the evacuated cell from the end-sealing part 69 at 25° C. to form the state as shown in FIG. 26(a). The end-sealing part 69 was kept unsealed at this stage. Then, the liquid crystal cell in which the mixture was filled was heated as shown in FIG. 26(b), or specifically, the liquid crystal cell was left in a constant temperature tank set at 100° C. for 1 hour. As a result of this, the polymers and the liquid crystals were phase seated to obtain the polymer liquid crystal complex 65. At this time, unreacted polymerizable materials remained in the complex 65. This was confirmed by measuring a phase transition temperature of nematic phase-isotropic phase of the liquid crystal cell. Also, it was also confirmed that the complex 65 in the liquid crystal cell had a structure in which a continuous phase of the liquid crystal was charged in the three dimensional network-like polymer.

Next, as shown in FIG. 26(c), the liquid crystal cell was pressed under room temperature with a pressing device in which compressed air 74 of 1 kg/cm$^2$ is charged in a balloon 73 through cushioning materials 71, 72 to extrude the liquid crystals from the end-sealing part 69.

After the liquid crystal cell was allowed to stand for 10 minutes, the extrude liquid crystals were wiped off the end-sealing part 69, which was then sealed by ultraviolt-curing-type sealing resin 75 (e.g. LOCTITE LPD-155 made by LOCTITE JAPAN CORPORATION).

Next, as shown in FIG. 26(d), the liquid crystal cell was irradiated with the ultraviolet from a high pressure mercury lamp of 1 mW/cm$^2$ in light intensity, which was allowed to pass through an ultraviolet intercepting filter UV-35 (made by TOSHIBA GLASS CO., LTD) capable of intercepting wavelength components of 350 nm or less, at 25° C. for 60 seconds. In this process, the remaining unreacted polymerizable materials were polymerized by the reaction with the photo polymerization initiators. At the same time, the ultraviolet-curing-type sealing resins 75 were also cured.

The polymer dispersion type liquid crystal display element thus produced was evaluated on the scattering of light by means of transmittance. The reason the scattering of light can be evaluated by means of transmittance is that there is a correlation between the transmittance and the scattering of light; when the scattering of light increases, the transmittance decreases, and vice versa.

Specifically, when the transmittance was measured with an optical property evaluation unit of LCD-5000 made by OTSUKA DENNSHI CO., LTD. under the conditions of 30° C. in temperature; 2.8° in light-interception angle; and no electric field, it was 0.8%, as shown in Table 3.

Next, when the polymer dispersion type liquid crystal display element thus produced was measured with a microscope on an average mesh size (gaps between liquid crystal droplets of an average size aligned in parallel with the plane of the substrates), the average mesh gap was 1.2 μm.

Also, when the cell gap was measured, with the liquid crystal molecules allowed to be fully aligned in parallel to the electric field by applying 10V, 30 Hz of rectangular waves to the transference electrodes 13, 14 of the polymer dispersion type liquid crystal display element, it was 10.9 μm, as shown in Table 3.

Next, after the polymer dispersion type liquid crystal display element was allowed to stand at 60° C. for 1,000 hours, the transmittance and the call gap were measured as in the case of the above. No changes were seen, as shown in Table 3.

Also, the complex before extrusion and the complex irradiated with the ultraviolet after extrusion were taken out by cutting. After only the polymers were left by washing the liquid crystals with isopropyl alcohol, the endothermic peak was measured with a differential scanning calorimeter (DSC) to determine the glass-transition temperature Tg (temperature of endothermic peak) of the polymers. The results were that the Tg1 of the polymers in the complex before the extrusion was about 20° C., and the Tg2 of the polymers of the complex irradiated with ultraviolet after the extrusion was 30° C. Thus, the condition of the Tg2 being higher than the Tg1 by 10° C. or more was fulfilled.

EXAMPLE 2

Figure 28:
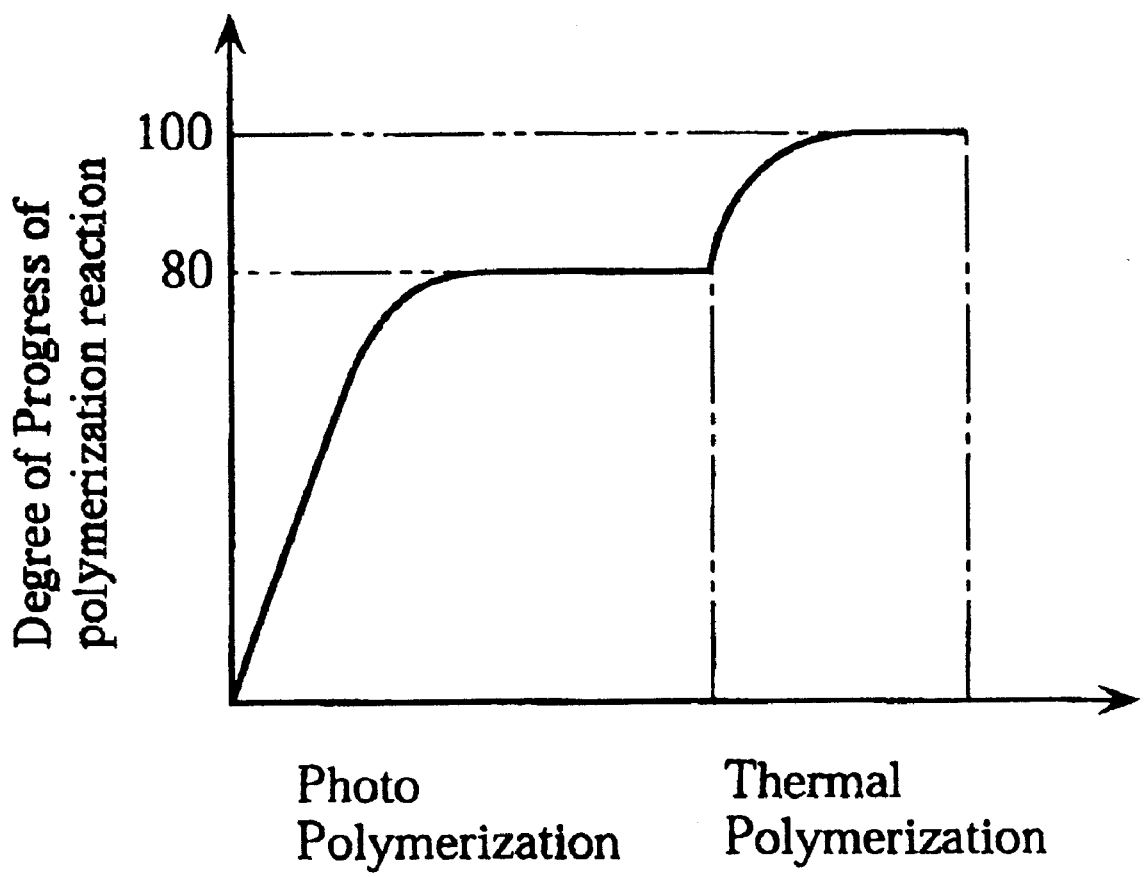
FIG. 28 is a diagram for illustrating the polymerization method of Example 2 of the 2nd Embodiment of the invention.

In Example 2, the liquid crystal display element was prepared, with the first polymerization process performed by the photo polymerization and the second polymerization process performed by the thermal polymerization, as shown in FIG. 28, though, in Example 1, the first polymerization process was performed by the thermal polymerization the second polymerization process was performed by the photo polymerization.

A more specific description will be given below.

The mixture prepared in the same manner as in Example 1 was vacuum injected into the evacuated cell prepared in the same manner as in Example 1 at 25° C. Thereafter, the liquid crystal cell was put on a hot plate of 25° C., with keeping unseated, and then was irradiated with the ultraviolet from a high pressure mercury lamp of 50 mW/cm$^2$ in light intensity, which was allowed to pass through the ultraviolet intercepting filter UV-35, for 20 seconds. As a result of this, the polymerizable materials were polymerized

TABLE 3

|  | Transmittance (%) Immediately After Completion of Element | Cell Gap (μ m) Immediately After Completion of Element | Transmittance (%) After Passage of Time | Cell Gap (μ m) After Passage of Time |
|---|---|---|---|---|
| Example 1 | 0.8 | 10.9 | 0.8 | 10.9 |
| Comparative Example 1 | 1.4 | 12.0 | 1.4 | 12.0 |
| Comparative Example 2 | 0.8 | 10.9 | 1.0 | 11.4 |
| Comparative Example 3 | 0.8 | 10.9 | 0.9 | 11.2 |
| Comparative Example 4 | 1.5 | 10.0 | 1.5 | 10.0 |
| Comparative Example 5 | 1.0 | 10.4 | 1.0 | 10.4 |
| Comparative Example 6 | 0.8 | 10.9 | 0.9 | 11.2 | and the liquid crystals and the polymers were phase separated to obtain the complex. The intensity of the ultraviolet then irradiated and the irradiation time were slightly weaken and shorten, as compared with Example 1, so that unreacted polymerizable materials were allowed to exist. It was confirmed that the complex had a structure in which a continuous phase of the liquid crystal was charged in the three dimensional network-like polymer, as in the case of Example 1.

Next the liquid crystal cell was pressed with the press, to extrude the liquid crystals from the end-sealing part in substantially the same manner as in Example 1.

Thereafter, the extruded liquid crystals were wiped off the end-sealing part, which was then sealed by ultraviolet-curing-type sealing resin. The sealing resin at the end-sealing part was cured with a spot UV irradiation device, as in the case of Example 1.

Next, the liquid crystal cell was left in the constant temperature tank set at 100° C. for 1 hour and was subjected to the thermal polymerization to allow the remaining polymerizable materials to be completely polymerized.

The polymer dispersion type liquid crystal display element thus produced were measured on the transmittance, the mesh size and the cell gap in the same manner as in Example 1. The results were that the transmittance was 0.8%, the mesh size was 1.2 $\mu$m, and the cell gap was 10.9 $\mu$m.

Next, after having been allowed to stand at 60° C. for 1,000 hours, the polymer dispersion type liquid crystal display element was measured on the transmittance and the call gap, as in the case of the above. The result was that no changes were observed.

EXAMPLE 3

In Example 3, the first polymerization process was performed by the photo polymerization and the second polymerization process was performed by the thermal polymerization, as in the case of Example 2. However, Example 3 is different from Example 2 in that the extrusion process of the liquid crystals was made by heating. A more specific description will be given below.

The complex were obtained by preparing the evacuated cell, preparing the mixture, conducting the vacuum injection and subjecting to the photo polymerization in substantially the same manner as in Example 2.

In the next extrusion process, the liquid crystal cell was heated. Specifically, the liquid crystal cell was put in the constant temperature tank and was allowed to stand at 120° C. for 10 hours and thereby the extrusion of the liquid crystals and the thermal polymerization were simultaneously performed.

Thereafter, the squeezed or extruded liquid crystals were wiped off the end-sealing part, which was then sealed by ultraviolet-curing-type sealing resin. Then, the liquid crystal cell was cooled to 25° C.

The polymer dispersion type liquid crystal display element thus produced was measured on the transmittance, the mesh size and the cell gap in the same manner in Example 1. The results were that the transmittance was 1.1%, the mesh size was 1.2 $\mu$m, and the cell gap was 11.6 $\mu$m.

Next, after having been allowed to stand at 60° C. for 1,000 hours, the polymer dispersion type liquid crystal display element measured on the transmittance and the call gap, as in t case of the above. The result was that no changes were observed.

EXAMPLE 4

In Example 4, the first polymerization process was by the thermal polymerization, and the second polymerization process was performed by the photo polymerization, as in the case of Example 1. However, the extrusion process of Example 4 is different from that of Example 1 in that the liquid crystals was extruded by being pressed with rollers, rather than with the press. A more specific description will be given below.

The complex was obtained by preparing the evacuated cell, preparing the mixture, conducting the vacuum injection, and making the thermal polymerization in substantially the same manner as in Example 1.

In the net extrusion process, the liquid crystal cell was pressed with rollers. Specifically, with its kept in heat at 100° C., the liquid crystal cell containing the complex was allowed to pass through between the rollers from the side opposite to the end-sealing part. The linear velocity of the liquid crystal cell was set at about 5 mm/sec.

Thereafter, the extruded liquid crystals were wiped off the end-sealing part, which was then sealed by ultraviolet-curing-type sealing resin. Then, the liquid crystal cell was cooled to 25° C. and was polymerized through the irradiation of ultraviolet, as in the case of Example 1.

The polymer dispersion type liquid crystal display element thus produced was measured on the transmittance, the mesh size and the cell gap in the same manner as in Example 1. The results were that the transmittance was 1.0%, the mesh size was 1.2 $\mu$m, and the cell gap was 11.4 $\mu$m.

Next, after having been allowed to stand at 60° C. for 1,000 hours, the polymer dispersion type liquid crystal display element was measured on the transmittance and the call gap, as in the case with the above. The result was that no changes were observed.

EXAMPLE 5

In Example 5, the first polymerization process was performed by the thermal polymerization and the second polymerization process was performed by the photo polymerization, as in the case of Example 1. However, the extrusion process of Example 5 is different from that of Example 1. However, the liquid crystals was extruded by being pressed with the vacuum package, rather than with the press. A more specific description will be given below.

The complex was obtained by preparing the evacuated cell, preparing the mixed composition, conducting the vacuum injection, and making the thermal polymerization in the same manner as in Example 1.

In the next extrusion process, the liquid crystal cell was pressed by means of the vacuum package. Specifically, with its kept in heat at 100° C., the liquid crystal cell containing the complex was subjected to vacuum-packed treatment quickly and was allowed to stand again in the constant temperature tank of 100° C.

After the liquid crystal cell was allowed to sand for about 2 hours, the vacuum package was broken and the extruded liquid crystals were wiped off the end-sealing part, which was then sealed by ultraviolet-curing-type sealing resin. Then, the liquid crystal cell was cooled to 250° C. and was polymerized through the irradiation of ultraviolet, as in the case of Example 1.

The polymer dispersion type liquid crystal display element thus produced was measured on the transmittance, the mesh size and the cell gap in the same manner as in Example 1. The results were that the transmittance was 0.9%, the mesh size was 1.2 $\mu$m, and the cell gap was 11.2 $\mu$m.

Next, after having been allowed to stand at 60° C. for 1,000 hours, the polymer dispersion type liquid crystal display element was measured on the transmittance and the call gap, as in the case with the above. The result was that no changes were observed.

EXAMPLE 6

In Example 6, an active matrix type liquid crystal display element using a TFT (thin-film transistor) substrate was used as the liquid crystal display element, and the photo polymerization was performed in both of the first polymerization process and the second polymerization process.

First, in the first polymerization process, the ultraviolet is irradiated from the TFT substrate side on which metal wiring in the form of matrix (scanning lines, signal conductors, etc.) is provided. This provides the result that the polymerization reaction of the polymerizable materials is not produced in an area shielded from light by the metal wiring. The shielded area acts as a passage for the liquid crystals to be squeezed out in the extrusion process of the liquid crystals, so that the extrusion of the liquid crystals is facilitated. In the second polymerization process after the extrusion process, the ultraviolet is irradiated from the other substrate side. This allows the remaining unreacted polymerizable materials in the shielded area to be polymerized. The polymerized materials in the area can act as an adhesive for the entire substrate to fix and stabilize the compressed form of the liquid crystals droplets.

Thus, the specific effect that the extrusion process is facilitated can be produced for the active matrix type liquid crystal display element Further by virtue of this specific effect, the difficulty in producing the liquid crystal display element, which occurs when the photo polymerization is performed in both of the first polymerization process and the second polymerization process, as mentioned in the article of "Description of Prior Art", can be solved. The reason therefore is that even if hardness of the polymers becomes larger than a set value by, for example, some more time than a set time being spent for the irradiation of ultraviolet to cause the polymerization reaction to advance beyond the first polymerization state, since the polymerizable materials in the area associated with the metal wiring of matrix form are unreacted and so act as the passage for the liquid crystals extruded out, such will not form an obstacle to the extrusion process of the liquid crystals. Hence, the manufacturing profits can be increased and also the manufacturing works can be facilitated.

It is noted that the TFD (thin-film diode) may be used as an active element instead of the TFT in the embodiment. Also, the invention may be suitably workable to the manufacture of not only the active matrix type liquid crystal display element but also to liquid crystal display element with a structure in which a light shielding area is provided by a wiring of a strive or matrix form on one of a pair of substrates.

Figure 30:
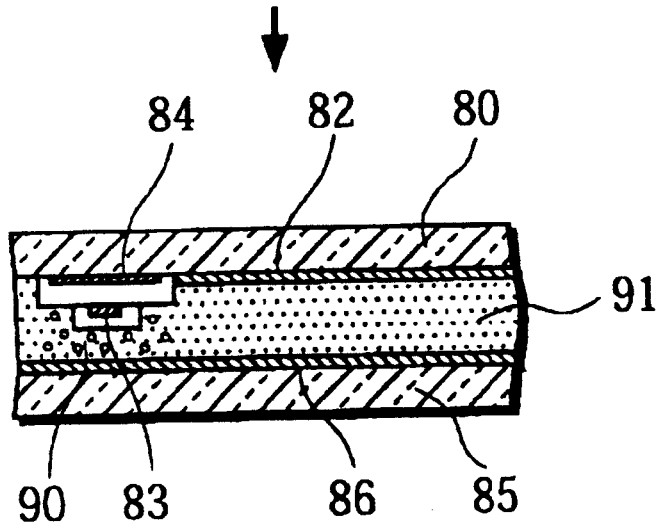
FIG. 30 is a sectional view of the active matrix type liquid crystal display element of Example 6 of the 2nd Embodiment of the invention.

A more specific description of Example 6 will be given below with reference to FIGS. 29 and 30.

A pixel electrode 82, a TFT part 83 and a light shielding layer 84 are formed in each of the areas into which a surface of a TFT array substrate 80 is partitioned by the matrix wiring 81. The light shielding layer 84 is arranged for preventing the characteristics of the TFT from being deteriorated by light, because the liquid crystal display element of Example 6 are used with projection type display devices. A counter electrode 86 is formed on an opposite substrate 85. For the sake of simplification of the drawing, the pixel electrode 82, the TFT part 83 and the light shielding layer 84 are omitted from FIG. 29.

The liquid crystal display element with this structure was produced in the manner described below.

The substrates 80, 85 were laminated together via plastic spacers each having a diameter of 11 µm (MICRO PEAL (trade name) made by SEKISUI FINE CHEMICAL CO., LTD), with an end-sealing part of heat-curing-type sealing materials (STRUCT BOND (trade name) made by MITSUI TOATSU CHEMICALS, INC) being formed, and then the sealing materials were completely cured by heating at 150° C. for 2 hours, to obtain the evacuated cell.

Next, 8.50 g of the TL-213 as the liquid crystal material, 0.80 g of n-tridecyl acrylate as the polymerizable monomer, 0.60 g of polyurethane acrylate as the polymerizable oligomer, and 0.10 g of the DAROCUR 1173 as the photo polymerization initiator were added and then the resultant mixture of the liquid crystal materials and the polymerizable materials was fully stirred at 25° C. to prepare a homogeneous mixed solution.

The homogeneous mixed solution was vacuum injected into the evacuated cell from the end-sealing part at 25° C. The end-sealing part was kept unsealed at this stage.

Next, the liquid crystal cell was irradiated with ultraviolet from a high pressure mercury lamp of 50 mW/cm$^2$ in light intensity, which was allowed to pass through the ultraviolet intercepting filter UV-35 from the side of the array substrate 80, at 25° C. for 20 seconds for polymerization, and the complex was obtained. In this state, the complex 90 in a light shielding part under the light shielding area occupied by the wiring 81 and the light shielding layer 84 make little progress in polymerization and remain unreacted. Also, the polymerization reaction of the polymerizable materials in the complex 91 in an aperture of the liquid crystal cell (all parts except the light shielding part) are not completely concluded, and the polymerizable materials of for example about 20% remain unreacted.

Next, the liquid crystal cell was pressed under room temperature by use of a pressing device of Example 1 as shown in FIG. 26(c) to extrude the liquid crystals from the end-sealing part.

After the liquid crystal cell was allowed to stand for about 10 minutes, the extruded liquid crystals were wiped off the end-sealing part, which was then sealed by ultraviolet-curing-type sealing resin 40 (e.g. LOCTITE LPD-155).

Next, the liquid crystal cell was irradiated with ultraviolet from a high pressure mercury lamp of 100 mW/cm$^2$ in light intensity, which was allowed to pass through an ultraviolet intercepting filter UV-35, at 25° C. for 60 seconds from the side of the opposite substrate 85. In this process, the remaining unreacted polymerizable materials were polymerized by the reaction with the photo polymerization initiators.

The polymer dispersion type liquid crystal display element thus produced was measured on the transmittance with an optical property evaluation unit of LCD 500 made by OTSUKA DENNSHI CO., LTD. Specifically, the transmittance was measured under the conditions of 30° C. in temperature; 2.8° in light-interception angle; and no electric field. The value of the light transmittance was 0.8%, with a corrected aperture rate (60% in this case).

Next, when the polymer dispersion type liquid crystal display element thus produced was measured on the average mesh size for the complex 91 at the end-sealing part, the value of the average mesh size was 1.2 µm. On the other hand, the mesh size of the complex 90 in the light shielding area was larger than 1.2 µm.

Next, after the TFT type of polymer dispersion type liquid crystal display element was allowed to stand at 60° C. for 1,000 hours, the transmittance was measured as in the case of the above. No changes were observed.

Figure 31:
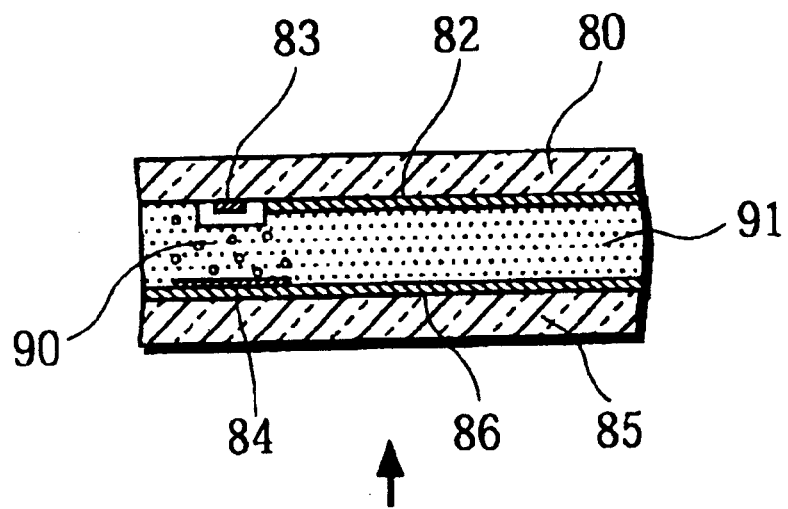
FIG. 31 is a sectional view of a modified active matrix type liquid crystal display element.

It should be noted that Example 6 may be suitably workable to the liquid crystal display element in which the light shielding layer 84 is formed on the opposite substrate 85, as shown in FIG. 31.

EXAMPLE 7

In Example 7, the mixture was prepared via the photo polymerization in both of the first polymerization and the second polymerization. When the second polymerization is performed by photo polymerization, the separated liquid crystal droplets can be deformed in the cell gap direction by the cooling process of the liquid crystal cells, in place of by the extruding process of the liquid crystals, provided that the liquid crystal cell must be irradiated with ultraviolet with being kept in its cooled state. Unless the liquid crystal cell is kept in its cooled state, there may be a possibility of the deformed liquid crystals being returned to its original form during the irradiation of ultraviolet, which may cause reduction of the reliability of the liquid crystal display element. It should be noted that the cooling process may be used together with the extrusion process, in addition to being replaced with the extrusion process.

A more specific description will be given below.

The mixture prepared in substantially the same manner as in Example 6 was vacuum injected into the evacuated cell prepared in substantially the same manner as in Example 1 at 25° C. Thereafter, the liquid crystal cell was put on a hot plate of 25° C., with keeping unsealed, and then was irradiated with the ultraviolet from a high pressure mercury lamp of 50 mW/cm$^2$ in light intensity, which was allowed to pass through the ultraviolet intercepting filter UV-35, for 20 seconds. As a result of this, the polymerizable materials were photo polymerized and the liquid crystals and the polymers were phase separated to obtain the complex Next, the liquid crystal cell was allowed to stand in the constant temperature tank of 80° C. for 2 hours, and thereafter the extruded liquid crystals were wiped off the end-sealing part, which was then sealed by ultraviolet-curing-type sealing resin, as in the case with Example 1. The sealing resin at the end-sealing part was cured with a spot UV irradiation device.

Next, after having been left in the constant temperature tank of −20° C. for 30 minutes, the liquid crystal cell was irradiated with ultraviolet from a high pressure mercury lamp of 100 mW/cm$^2$ in light intensity, which was allowed to pass through the ultraviolet intercepting filter UV-35, at −20° C. for 120 seconds, to allow the remaining polymerizable materials be polymerized completely by the reaction with the photo polymerization initiators.

The polymer dispersion type liquid crystal display element thus produced was measured on the transmittance, the mesh size and the cell gap in substantially the same manner as in Example 1. The results were that the transmittance was 1.1%, the mesh size was 1.2 µm, and the cell gap was 11.6 µm.

Next, after having been allowed to stand at 60° C. for 1,000 hours, the polymer dispersion type liquid crystal display element was measured on the transmittance and the call gap, as in the case of the above. The result was that no changes were observed.

EXAMPLE 8

Example 8 is designed such that the first polymerization process and the extrusion process can be performed automatically and successively by use of a production apparatus for the liquid crystal display element according to the invention. The production apparatus for the liquid crystal display element comprises a carrier means for carrying the liquid crystal cell along a carriage path, an ultraviolet irradiation means for irradiating ultraviolet to a part of the liquid crystal cell in the course of being carried and rollers for pressing the area of the liquid crystal cell irradiated with ultraviolet. A belt mechanism, a chain mechanism or the like is used as the carrier means, and a high pressure mercury lamp, for example, is used as the ultraviolet irradiation means. In addition to the high pressure mercury lamp, the ultraviolet irradiation means may include an optical filter to intercept only wavelength components which allow the liquid crystals to be optically resolved, among the wavelength component Of the ultraviolet from the high pressure mercury lamp. Further, the production apparatus may include a temperature control mechanism to maintain the liquid crystal cell at a preset temperature, in addition to the carrier means, the ultraviolet irradiation means and the rollers.

Next, the method of producing the liquid crystal display element by use of the abovesaid production apparatus will be described below.

First, the liquid crystal cell filled with the mixture Is carried along the carriage path. In the course of the carriage, a part of the liquid crystal cell was irradiated with the ultraviolet and the part of the liquid crystal cell irradiated with the ultraviolet is pressed with the rollers within the period between the initiation of polymerization by the irradiation of ultraviolet and the conclusion of phase separation of the liquid crystals by the polymerization. In this way, the first polymerization process and the extrusion process of the liquid crystals are performed automatically and successively.

Where the second polymerization is performed by photo polymerization by means of ultraviolet, an additional ultraviolet irradiation means may be provided on the carriage path at a position downstream from the rollers. This can provide the result that a series of processes including the first polymerization process, the extrusion process of liquid crystals and the second polymerization process can be fully automated.

Figure 32:
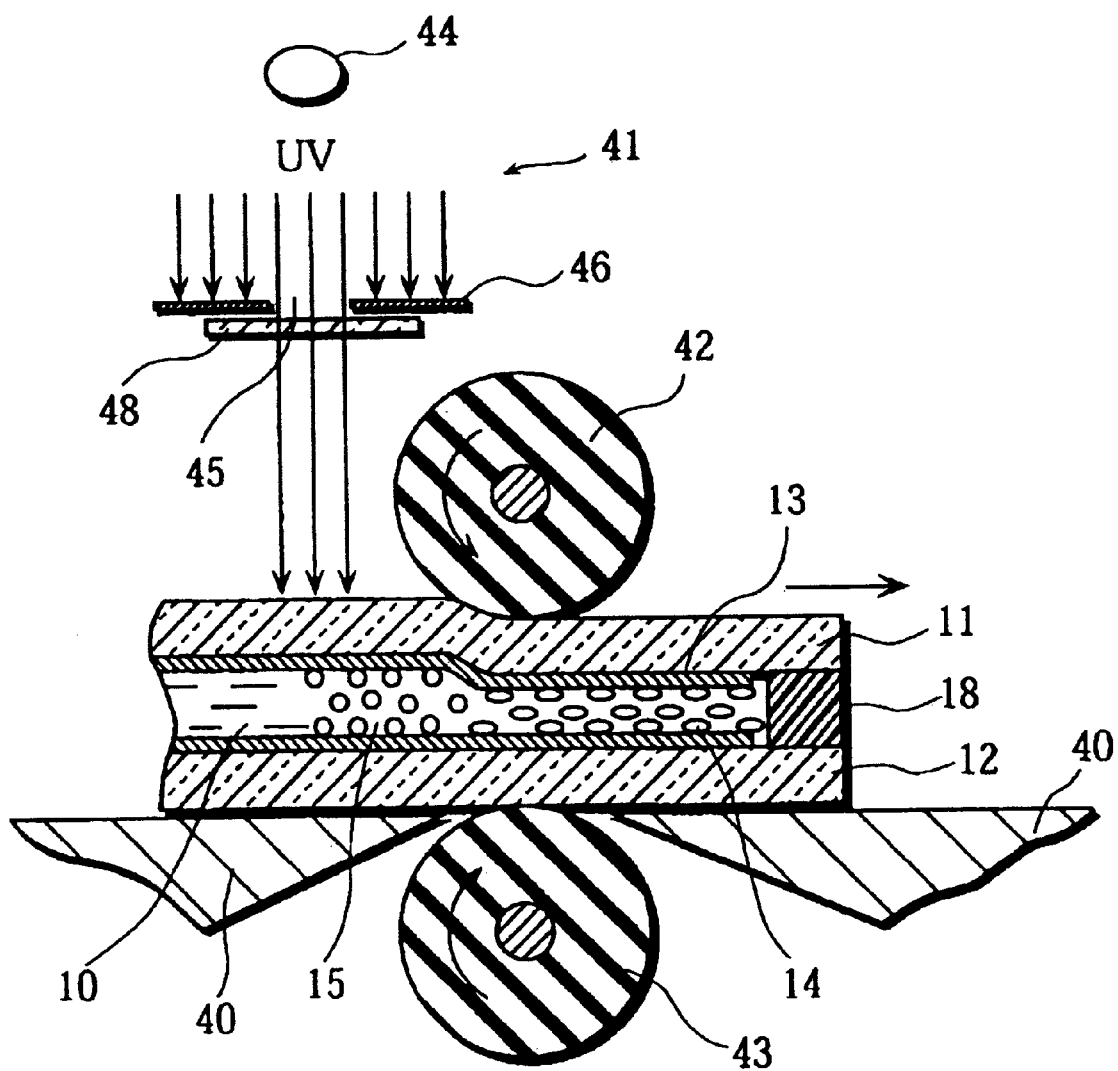
FIG. 32 is a sectional view of a producing apparatus used in Example 8 of the 2nd Embodiment of the invention.
Figure 33:
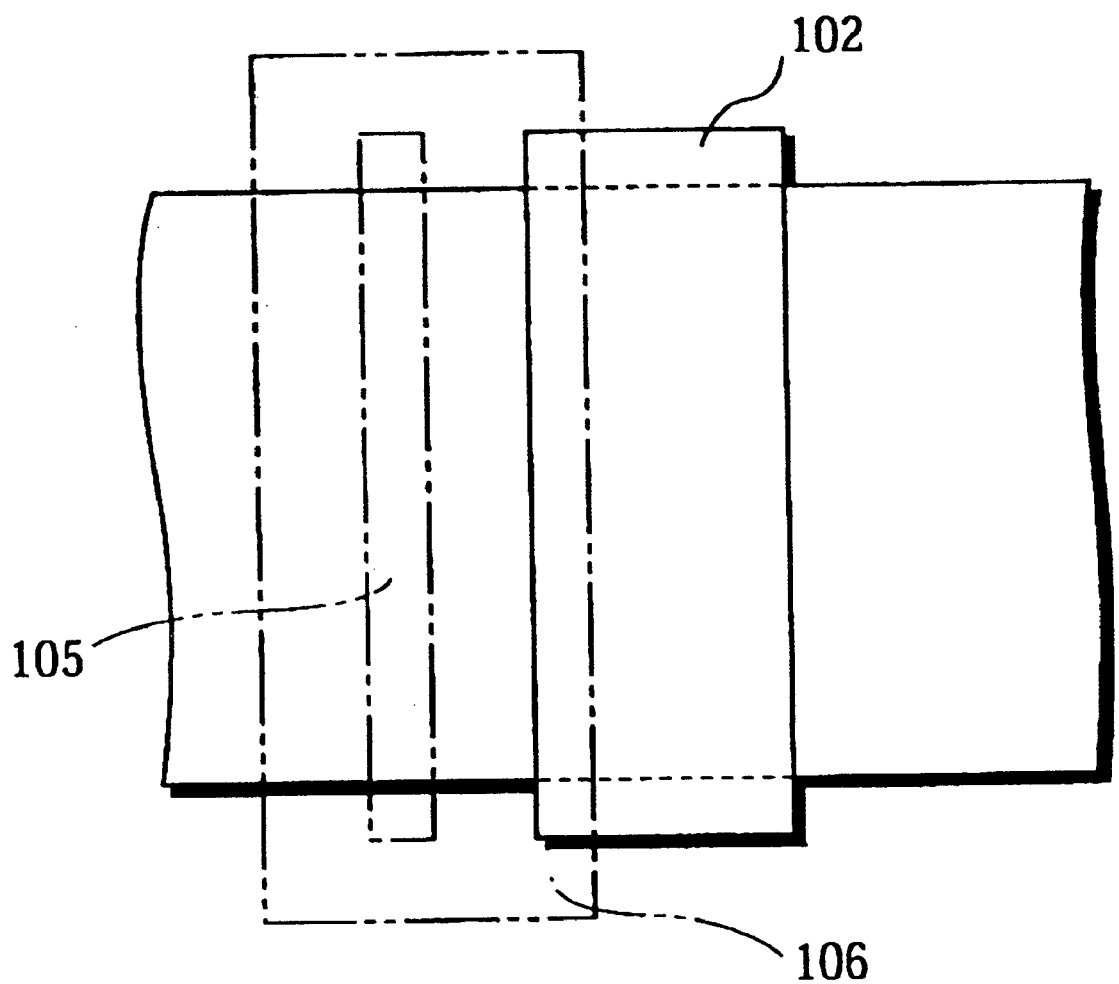
FIG. 33 is a plan view of the producing apparatus used in Example 8 of the 2nd Embodiment of the invention.

A more specific description of Example 8 will be given below with reference to FIGS. 32 through 34.

The production apparatus comprises a carrier means (not shown) for carrying the liquid crystal cell along a table 100, an ultraviolet irradiation means 101 for irradiating ultraviolet to a part of the liquid crystal cell and a pair of rollers 102, 103 for pressing the area of the liquid crystal cell irradiated with ultraviolet. The ultraviolet irradiation means 101 includes a high pressure mercury lamp 104 as a light source a light shielding plate 106 having a rectangular slit 105 and an optical filter 108. The optical filter 108 used is the ultraviolet intercepting filter UV-35, for example.

The table 100 is so designed that its temperature can be controlled. Thus, the temperature of the liquid crystal call put on the table 100 can be adjusted to control the phase separation reaction sensitive to temperature.

Also, the feed rate at which the liquid crystal cell is fed by the carrier means is so set that the liquid crystal cell can reach the rollers 102, 103 when a preset curing state of the polymers (the first polymerization state) has achieved within the period between the initiation of polymerization by the irradiation of ultraviolet and the conclusion of the polymerization.

The liquid crystal display element was produced with the production apparatus with the abovesaid structure in the manner described below.

The mixture prepared in substantially the same manner as in Example 6 was vacuum injected into the evacuated cell prepared in substantially the same manner as in Example 1 at 25° C. Thereafter, the liquid crystal cell was put on the table 100 and carried by means of the carrier means. The temperature of the table 100 was set at 25° C. Under this temperature condition, the liquid crystal cell was irradiated with the ultraviolet of 100 mW/cm$^2$ in light intensity so that the polymerizable materials was polymerized, while the part of the liquid crystal cell (the area irradiated with the ultraviolet) was pressed with rollers. To facilitate the extrusion of the liquid crystals, the liquid crystal cell was injected from the opposite side of the end-sealing part. The first polymerization process by the ultraviolet and the extrusion process of the liquid crystals were thus performed successively and automatically.

Next, after the extruded or squeezed liquid crystals were wiped off the end-sealing part, the end sealing part was sealed by ultraviolet-curing-type sealing resin, which was then cured with a spot UV irradiation device, as in the case with Example 1.

Next, after the liquid crystal cell was irradiated with ultraviolet from a high pressure mercury lamp of 100 mW/cm$^2$ in light intensity, which was allowed to pass through the ultraviolet intercepting filter UV-35, for 60 seconds, to allow the remaining polymerizable materials be polymerized by the reaction with the photo polymerization initiators.

The polymer dispersion type liquid crystal display element thus produced was measured on the transmittance, the mesh size and the cell gap in the same manner as in Example 1. The results were that the transmittance was 0.8%, the mesh size was 1.2 μm, and the cell gap was 10.9 μm.

Next, after having been allowed to stand at 600° C. for 1,000 hours, the polymer dispersion type liquid crystal display element was measured on the transmittance and the call gap, as in the case of the above. The result was that no changes were observed.

Figure 34:
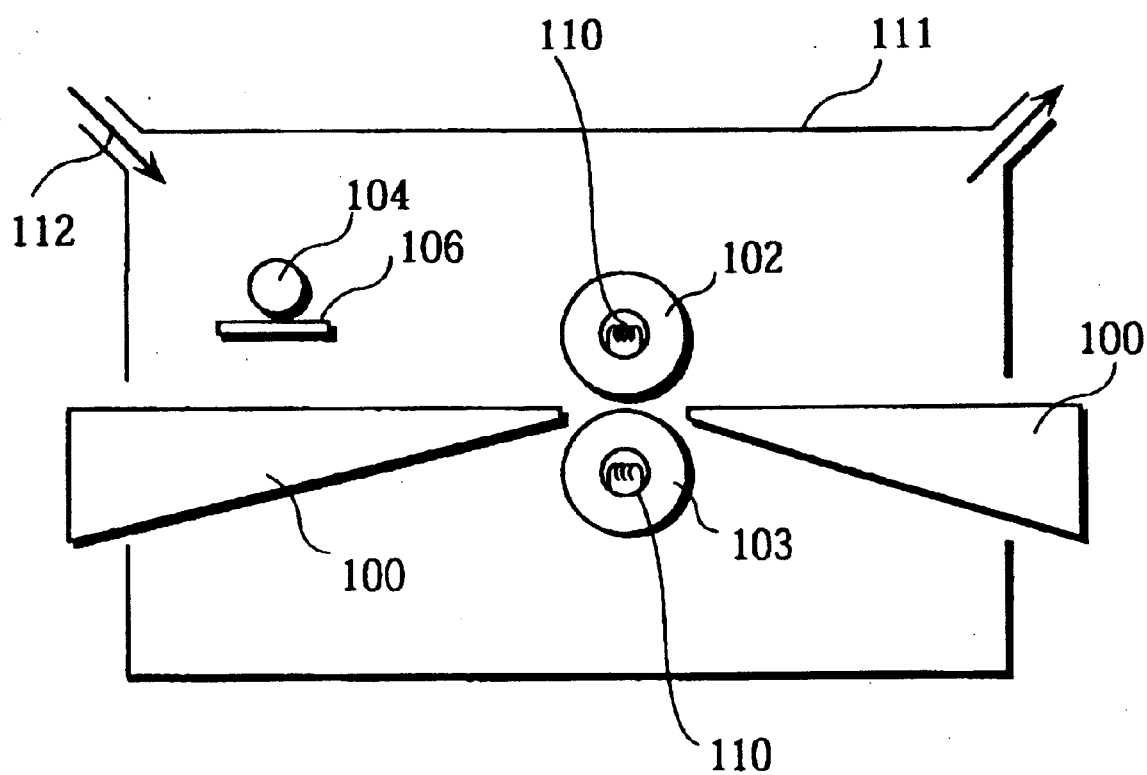
FIG. 34 is a sectional view of a modification of the producing apparatus.

Further, as shown in FIG. 34, the rollers 102, 103 may be provided at the inside thereof with heaters 110 so that the first polymerization process by the irradiation of ultraviolet and the extrusion process of the liquid crystals can be successively and automatically in the constant temperature tank 111. This enables the first polymerization process and the extrusion process of the liquid crystals to be successively and automatically performed under a further homogeneous and optimum thermal atmosphere by controlling the temperature of a hot air 112 blown into the constant temperature tank 111 and of the heaters 110.

In addition to Examples 1 trough 8, the embodiment may be modified such that the first and second polymerization are both performed by thermal polymerization. Even if both of the first and second polymerization are performed by the thermal polymerization, since the deformation rate achieved by the invention, according to which the deformation ratio is 1.15 or less, is very smaller than that of the prior art, the difficulties in producing the liquid crystal display element involved in The prior art can be solved.

COMPARATIVE EXAMPLE 1

8.50 g of TL-213 as the liquid crystal material, 0.80 g of n-tridecyl acrylate as the polymerizable monomer, 0.60 g of polyurethane acrylate as the oligomer, and 0.10 g of DAROCUR 1173 as the photo polymerization initiator were added to the evacuated cell prepared in the same manner as in Example 1 and then the resultant mixture of the liquid crystal materials and polymerizable materials was fully stirred at 25° C. to prepare a homogeneous mixed solution.

The homogeneous mixed solution was vacuum injected into the evacuated cell at 25° C. Thereafter, the liquid crystal cell was put on a hot plate of 25° C., with keeping unsealed, and then was irradiated with the ultraviolet from a high pressure mercury lamp of 100 mW/cm$^2$ in light intensity, which was allowed to pass through the ultraviolet intercepting filter UV-35, for 60 seconds, to polymerize the polymerizable materials and allow the liquid crystal and the polymers to be phase separated, and thereby the complex was obtained.

At this stage, the polymerization reaction of the complex was almost completely concluded. The complex in the liquid crystal cell has a structure in which a continuous phase of The liquid crystal was charged in the three dimensional network-like polymer, as in the case of Example 1.

Next, the a liquid crystal were wiped off the end-sealing part, which was then sealed by the LOCTITE of ultraviolet-type sealing resin. The sealing resin at the end-sealing part was cured with its irradiated with ultraviolet for 30 seconds by use of a spot UV irradiation device.

The polymer dispersion type liquid crystal display element thus produced was measured on the transmittance, the mesh size and the cell gap in the same manner as in Example 1. The results were that the transmittance was 1.4%, the mesh size was 1.2 μm, and the cell gap was 12.0 μm, as shown in Table 3.

Next, after having been allowed to stand at 60° C. for 1,000 hours, the polymer dispersion type liquid crystal display element was measured on the transmittance and the call gap, as in the case of the above. The result was that no changes were observed, as shown in Table 3 shown above.

RESULTS

Comparison between Example 1 and Comparative Example 1 shows that the deformation ratio of the liquid crystal cell in Example 1 is 1.1. Also, as shown in Table 3 shown above, Example 1 having the deformation ratio of 1.1 is smaller in transmittance than Comparative Example 1 having the deformation rate of 1 which means that no deformation is given to the liquid crystal droplets or networks. It is appreciated from this that the liquid crystal droplets deformed can provide an improved scattering of light, as compared with the liquid crystal droplets not deformed. In addition, as shown in Table 3 shown above, after 1,000 hours, no change was observed in the cell gap of the completed liquid crystal display element of Example 1 and that of Comparative Example 1. This fact shows that when the polymerization reaction of polymerizable materials is completely concluded, no cell gap change occurs with passage of time.

COMPARATIVE EXAMPLE 2

The mixture prepared in the same manner as in Example 1 was vacuum injected into the evacuated cell prepared in the same manner as in Example 1 at 25° C., and the polymerizable materials were polymerized by heat under completely the same conditions as Example 1. Thereafter, after the liquid crystal cell was pressed with the press and allowed to stand, under the same conditions as those of Example 1, the end-sealing part was sealed.

The polymer dispersion type liquid crystal display element thus completed was measured on the transmittance, the mesh size and the cell gap in the same manner as in Example 1. The results were that the transmittance was 0.8%, the mesh size was 1.2 µm, and the cell gap was 10.9 µm, as shown in Table 3 shown above.

Next, after having been allowed to stand at 60° C. for 1,000 hours, the polymer dispersion type liquid crystal display element was measured on the transmittance and the call gap, as in the case of the above. The result was that transmittance was 1.0% and the cell gap was 11.4 µm, as sown in Table 3 shown above, so that the changes were observed.

RESULTS

From comparison between Example 1 and Comparative Example 2 it is understood that the liquid crystal display element of Comparative Example 2, in which the first polymerization process (the thermal polymerization in this case) is only performed but the second polymerization is not performed, changed with time in transmittance and cell gap, as shown in Table 3 as shown above. From this fact it can be understood that only the first polymerization process allows the deformation of the liquid crystal droplets to be returned to their original form with long time. Hence, the liquid crystal display element of Comparative Example 2 are poorer in reliability.

COMPARATIVE EXAMPLE 3

The mixed solution prepared in the same manner as in Comparative Example 1 was vacuum injected into the evacuated cell prepared in the same manner as in Example 1 at 25° C. Thereafter, the liquid crystal cell was put on a hot plate of 25° C., with keeping unsealed, and then was irradiated with the ultraviolet from a high pressure mercury lamp of 100 mW/cm² in light intensity, which was allowed to pass through the ultraviolet intercepting filter UV-35, for 60 seconds, to polymerize the polymerizable materials, while the liquid crystals and the polymers are allowed to be phase separated to obtain the complex. At this stage, the polymerization reaction of the complex has been almost completely concluded, and it was confirmed that the complex had a structure in which a continuous phase of the liquid crystal was charged in the three dimensional network-like polymer, as in the case of Example 1.

Next, the liquid crystal cell was pressed with the same press as the in Example 1, so that the liquid crystal materials were extruded out from the end-sealing part, under the temperature set at 100° C. and the pressure set at 2 kg/cm². Then, the liquid crystal cell was allowed to stand for about 60 minutes.

Thereafter, the extruded liquid crystals were wiped off the end-sealing part, which was then sealed by the LOCTITE of ultraviolet-curing-type sealing resin. The sealing resin at the end-sealing part was irradiated with ultraviolet from a spot UV irradiation device for 30 seconds to be cured.

The polymer dispersion type liquid crystal display element thus completed was measured on the transmittance, the mesh size and the cell gap in the same manner as in Example 1. The results were that the transmittance was 0.8%, the mesh size was 1.2 µm, and the cell gap was 10.9 µm, as shown in Table 3 shown above.

Next, after having been allowed to stand at 60° C. for 1,000 hours, the polymer dispersion type liquid crystal display element was measured on the transmittance and the call gap, as in the case of the above. The result was that transmittance was 0.9% and the cell gap was 11.2 µm, as sown in Table 3 shown above, so the changes were observed.

RESULTS

From comparison between Example 1 and Comparative Examples 2, 3 it is understood that although the polymerization is performed by use of ultraviolet, only the first polymerization process causes the deformed liquid crystal droplets to return to their original form, though the degree of return to the original form is slightly gentle, as compared with Comparative Example 2, as shown in Table 3. There is no substantial difference between Comparative Examples 2 and 3 in that the composed form of the liquid crystal droplets cannot be maintained for a long time. Hence, the liquid crystal display element of Comparative Example 3 is poorer in reliability, as in the case of Comparative Example 2.

COMPARATIVE EXAMPLE 4

The mixture prepared in the same manner as in Comparative Example 2 was vacuum injected into the evacuated cell prepared in the same manner as in Example 1 at 25° C. Thereafter, the liquid crystal cell was left in the constant temperature tank set at 100° C., with keeping unsealed, so that the polymerizable materials were polymerized while the liquid crystals and the polymers were phase separated to obtain the complex.

New, the liquid crystal cell was pressed with the press, as in the case of Example 1, so that the liquid crystal materials were extruded out from the end-sealing part with the pressure set at 2 kg/cm². Then, the liquid crystal cell was allowed to stand for 60 minutes.

Thereafter, the extruded liquid crystal materials were wiped off the end-sealing part, which was then sealed by ultraviolet-curing-g-type sealing resin. The sealing resin at the end-sealing part was cured with the spot UV irradiation device, as in the case of Example 1.

Next, the liquid crystal cell was irradiated with ultraviolet from a high pressure mercury lamp of 100 mW/cm² in light intensity, which was allowed to pass through the ultraviolet intercepting filter UV-35, at 250° C. for 60 seconds, so that the remaining unreacted polymerizable materials were polymerized by, the reaction with the photo polymerization initiators.

The polymer dispersion type liquid crystal display element thus completed was measured on the transmittance, the mesh size and the cell gap in the same manner as in Example 1. The results were that the transmittance was 1.5%, the mesh size was 12 µm, and the cell gap was 10.0 µm, as shown in Table 3 shown above.

Next after having been allowed to stand at 60° C. for 1,000 hours, the polymer dispersion type liquid crystal display element was measured on the transmittance and the call gap, as in the case of the above. The result was that no change was observed, as sawn in Table 3 shown above.

RESULTS

The results of Comparative Example 4 will be described later together with the results of Comparative Example 5 as will be described later.

COMPARATIVE EXAMPLE 5

The mixture prepared in the same manner as in Comparative Example 4 was vacuum injected into the evacuated cell prepared in the same manner as in Example 1 at 25° C. Thereafter, the liquid crystal cell was left in the constant temperature tank set at 100° C. for 1 hour, with keeping unsealed, so that the polymerizable materials were polymerized while the liquid crystals and polymers were phase separated to obtain the complex.

Next, the liquid crystal cell was pressed with the press, as in the case of Example 1 so that the liquid crystals were extruded out from the end-sealing part with the pressure set at 1 kg/cm². Then, the liquid crystal cell was allowed to stand for about 20 minutes.

Thereafter, the liquid crystal cell was irradiated with ultraviolet as in the same manner as in Comparative Example 4 to obtain the complex.

The polymer dispersion type liquid crystal display element thus completed was measured on the transmittance, the mesh size and the cell gap in the same manner as in Example 1. The results were that the transmittance was 1.0%, the mesh size was 1.2 μm, and the cell gap was 10.4 μm, as shown in Table 3 shown above.

Next, after having been allowed to stand at 60° C. for 1,000 hours, the polymer dispersion type liquid crystal display element was measured on the transmittance and the call gap, as in the case of the above. The result was that no change was observed, as sown in Table 3 shown above.

RESULTS

As shown in Table 3 shown above, even after the passage of a long time, no change was observed on the transmittance and cell gap of the liquid crystal display element of each of the Comparative Examples 4 and 5, as in the case of Example 1. It is assumed that that is because a further polymerization process performed after the extrusion of the liquid crystals allowed the remaining unreacted polymerizable materials to be polymerized so that the polymerization reaction of the polymerizable materials can be completely concluded.

On the other hand, in Comparative Example. 4, the after-deformation cell gap measured 10.0 μm, which equals the deformation ratio of 1.2. In Comparative Example 5, the after-deformation cell gap measured 10.4 μm, which equals the deformation ratio of 1.15. Also, in Comparative Example 4, the after-deformation transmittance measured 1.5%, and in Comparative Example 5, the after-deformation transmittance measured 1.0%. From comparison between Example 1 and Comparative Examples 4 and 5 it is appreciated that an excessive deformation provides an increased transmittance (in other words, a decreased light scattering); rather than improvement In addition, from comparison between Comparative Example 1 and Comparative Examples 4 and 5 it is also appreciated that when deformation is given at a deformation ratio of over 1.2, the transmittance increases (in other words, the scattering of light decrease), rather than when no deformation is given.

COMPARATIVE EXAMPLE 6

Except the differences in intensity of light and irradiation time of ultraviolet irradiated after the extrusion process, the polymer dispersion type liquid crystal display element was produced in the same manner as in Example 1. In other words, the polymer dispersion type liquid crystal display element was produced under different conditions from those in Example 1 in terms of intensity of light and irradiation time of ultraviolet in the second polymerization process performed by the photo polymerization. In Comparative Example 6, the intensity of light is set at 50 mW/cm² and the irradiation time is set 30 seconds.

The polymer dispersion type liquid crystal display element thus completed was measured on the transmittance, the mesh size and the cell gap in the same manner as in Example 1. The results were that the transmittance was 0.8%, the mesh size was 1.2 μm, and the cell gap was 10.9 μm.

Next, after having been allowed to stand at 60° C. for 1,000 hours, the polymer dispersion type liquid crystal display element was measured on the transmittance and the call gap, as in the case of the above. The transmittance measured 0.9% and the cell gap measured 1.2 μm, so the changes were observed.

Next, the complex before extrusion and the complex irradiated with ultraviolet after extrusion were taken out by cutting the panel. After only the polymers were left in the same manner as in Example 1, the endothermic peak was measured with a differential scanning calorimeter (DSC) to determine the glass-transition temperature Tg (temperature of endothermic peak) of the polymer. The Tg1 of the polymers in the complex before extrusion measured about 20° C. and the Tg2 of the polymers of the complex after extrusion measured 25° C. Hence, the condition of the Tg2 being higher than the Tg1 by 10° C. was not fulfilled.

RESULTS

When Example 1 and Comparative Example 6 are judged from the viewpoint of the glass-transition temperature of the polymers, it is understood that when the Tg2 is higher than the Tg1 by the order of 5° C., the compressing effects cannot be maintained for a long time, whereas when the Tg2 is higher than the Tg1 by the order of 10° C., the liquid crystal droplets can be maintained in their compressed form for a long time, without returning to their original form.

THIRD EMBODIMENT

To sum up the third embodiment, the third embodiment is basically constructed such that a plurality of polymer liquid crystal complex layers are laminated, so that the liquid crystals in each layer can be aligned in parallel with the substrates and also the orientations of the liquid crystals aligned in a plane parallel with the substrates can be made different for each of the layers. The third embodiment includes such a construction that the liquid crystals in each layer are aligned in parallel with the substrates and are oriented randomly in a plane parallel with the substrates. According to this constructed third embodiment, a sufficient scattering of light can be attained, and as a result, the liquid crystal display element of high-contrast can be produced. The contents of the third embodiment will be detailed below with reference to Examples 1 to 3.

EXAMPLE 1

Example 1 will be described below with reference to FIG. 35.

FIG. 35($a$) is a sectional view schematically depicting the liquid crystal droplets according to the invention. Transference electrodes (not shown) are formed on opposite surfaces of transparent glass substrates 124A, 124B. A layered product 127 is held via the transparent glass substrates 124A, 124B. The layered product 127 has a structure of a first polymer liquid crystal complex layer 131, a second polymer liquid crystal complex layer 132 and a third polymer liquid crystal complex layer 133 being layered. The first to third polymer liquid crystal complex layers 131–133 are the polymer dispersion type liquid crystal layers in which liquid crystal droplets 139 are dispersed in polymers 138.

Liquid crystal molecules 136 in each of the first to third polymer liquid crystal complex layers 131–133 are aligned with their major axes extending substantially parallel with the substrates. This enables the difference in refractive index between the polymers and the liquid crystals to be increased and thus provides high scattering effects. As a result of this, a high contrast can be produced. This is known as described in Japanese Laid-Open Patent Publication No. Hei 8(1996)-248398.

It is noted here that the inventors have discovered that the liquid crystal molecules aligned in parallel with the substrates combined with the liquid crystal molecules oriented as randomly as possible when viewed along the cell gap direction can provide a more satisfactory scattering of light. Accordingly, according to the invention, the orientations 135 of liquid crystal molecules 136 are rendered different for each of the polymer liquid crystal complex layers 131–133, as shown in FIG. 35(b). It has been ascertained that with this construction, the difference in orientations 135 produce the difference in refractive index between the layers 131–133 to thereby produce an increased scattering of light. It is most desirable that the liquid crystal molecules 136 are oriented on a completely random basis in a horizontal plane parallel with the substrates 124A, 124B, if possible.

With some conventional type liquid crystal display element, the liquid crystal molecular alignments are attempted to be controlled by means of the rubbing. However, the rubbing requires that the orientations or alignments of the liquid crystal molecules for each of polymer liquid crystals layer complex layers are so set as to intersect each other at right angles, so the liquid crystal molecules are oriented, in principle, only in two directions, when viewed along the cell gap direction, and hence it is impossible to obtain a fully satisfactory scattering of light. In this respect, the invention is so structured that the polymer liquid crystal complex layers are laminated, without any rubbing treatment, so that the liquid crystal molecules can be oriented in different directions for each layer. Consequently, the invention can provide remarkably high scattering effects, as compared with the prior art.

Further, this laminated structure according to the invention provides the results that an alignment treatment of the liquid crystal molecules is pod for each polymer liquid crystal complex layer of reduced thickness and then the resultant layers are laminated. As a result, an eternal force to control the alignments of the liquid crystals, e.g. an external force required to compress the liquid crystal droplets, can be readily transmitted to the polymer liquid crystal complex layers, as compared with the structure in which a single polymer liquid crystal complex layer of increased thickness is formed at a time and then an alignment treatment of the liquid crystals is penned for the single, thickened polymer liquid crystal complex layer. Hence, the laminated structure of the invention can achieve more homogeneous liquid crystal display element by performing the alignment treatment for each polymer liquid crystal complex layer, than the structure in which the single polymer liquid crystal complex layer of increased thickness is formed at a time and then the alignment treatment of the liquid crystals is perked for the single, thickened polymer liquid crystal complex layer.

Next, two different methods for performing the alignment treatment of the liquid crystal molecules, which form the characteristics of the invention, will be described below.

The first treatment is a method of curing the polymers in a polarizing direction by irradiating polarized light when the mixture including the liquid crystal materials and the polymerizable materials of precursors of polymers is irradiated with light to cause phase separation to obtain the complex layers. This method produces rod-like or football-like liquid crystal droplets, and as such allows the liquid crystal molecules in the liquid crystal droplets to be aligned in accordance with the form of the liquid crystal droplets to regulate the orientations or alignments of the liquid crystals in a layer. The operations are repeated to change the polarizing direction for each layer, whereby the layered product formed of laminated layer different in liquid crystal molecular orientations for each layer can be formed.

The second treatment is a method of adding magnetic field or electric field for each layer at the time of phase separation to regulate the orientations of the liquid crystals for each layer. The preparation of the layered product can be made in substantially the same manner as in the first treatment. Also, in the second method, it is practicable that the polymer liquid crystal complex layers after prepared are heated until they become isotropic solutions, in this state of which the magnetic field or the electric field is added, in addition to at the time of phase separation, to drop the temperature until the isotropic solutions become the liquid crystals state, to regulate the orientations of the liquid crystals for each layer.

For the methods it is important that the respective layers must be uniform in thickness to produce the layered product having a uniform thickness. To that end, according to the invention, spacers are used for each layer to obtain the complex layers uniform in thickness.

EXAMPLE 2

Figure 36:
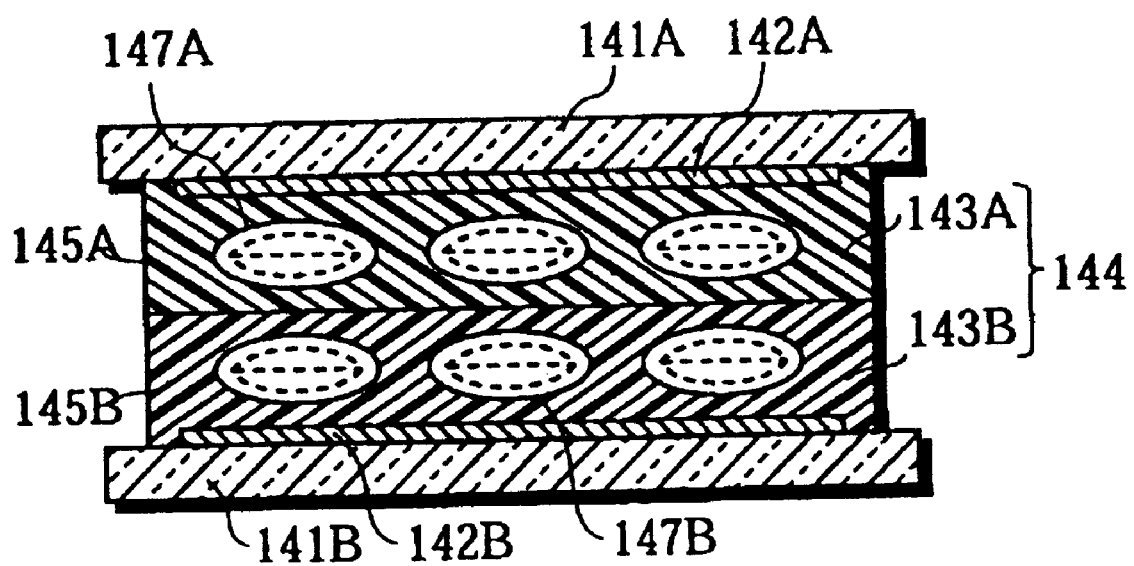
FIG. 36 is a sectional view of the liquid crystal display element of Example 2 of the 3rd Embodiment of the invention.

FIG. 36 is a sectional view schematically depicting the liquid crystal display element according to the invention. In Example 2, two layers of polymer liquid crystal complex layers are laminated. Transference electrodes 142A, 142B are formed on opposite surfaces of transparent glass substrates 141A, 141B. A layered product 144 comprising two laminated polymer liquid crystal complex layers 143A, 143B is held between the transparent glass substrates 141A, 141B. The respective polymer liquid crystal complex layers 143A, 143B form the polymer dispersion type liquid crystal display element in which liquid crystal droplets 147A, 147B are dispersed in polymers 145A, 145B. Liquid crystal molecules in the liquid crystal droplets 147A, 147B in each of the polymer liquid crystal complex layers 143A, 143B are aligned with their major axes extending substantially parallel with the glass substrates 141A, 141B and also oriented randomly in a plane nearly parallel to the substrates 141A, 141B. The term "liquid crystal molecules are parallel to the substrates" is intended to mean that the liquid crystal molecules with average tilt angles of all liquid crystal molecules in the liquid crystal droplets (which correspond to liquid crystal molecules oriented along the bipolar axes) are parallel to the substrates." The liquid crystal droplets 147A, 147B have a nearly flat or nearly disc-like shape, in other words, oval in cross section but circular when viewed from the cell gap direction.

Next, the method of producing the liquid crystal display element with the abovesaid construction will be described below.

First, liquid crystal materials, polymerizable materials, and photo polymerization initiators are added and the resultant mixture is stirred to prepare a homogeneous mixed solution. Specifically, E-8 (made by Merck Japan Limited) was employed as the liquid crystal materials. The mixture of three kinds of materials of butyl octyl acrylate (BOA), 2-ethylhexyl acrylate (2EHA) and 1,6 hexane diol diacrylate (HDDA) was employed as the polymerizable materials. The mixing ratio among butyl octyl acrylate (BOA), 2-ethylhexyl acrylate (2EHA) and 1,6 hexane diol diacrylate (HDDA) was set 1.5: 1.5:1.

DAROCUR 1173 (made by CIBA-GEIGY LTD.) was employed as the photo polymerization initiators. The amount of DAROCUR 1173 added was set 2 wt %. The mixing ratio of the liquid crystal materials relative to the polymerizable monomers was set 8:2.

Various kinds of materials as described in the second embodiment as aforementioned may be employed for the liquid crystal materials, the polymerizable materials and the photo polymerization initiators.

Figure 37:
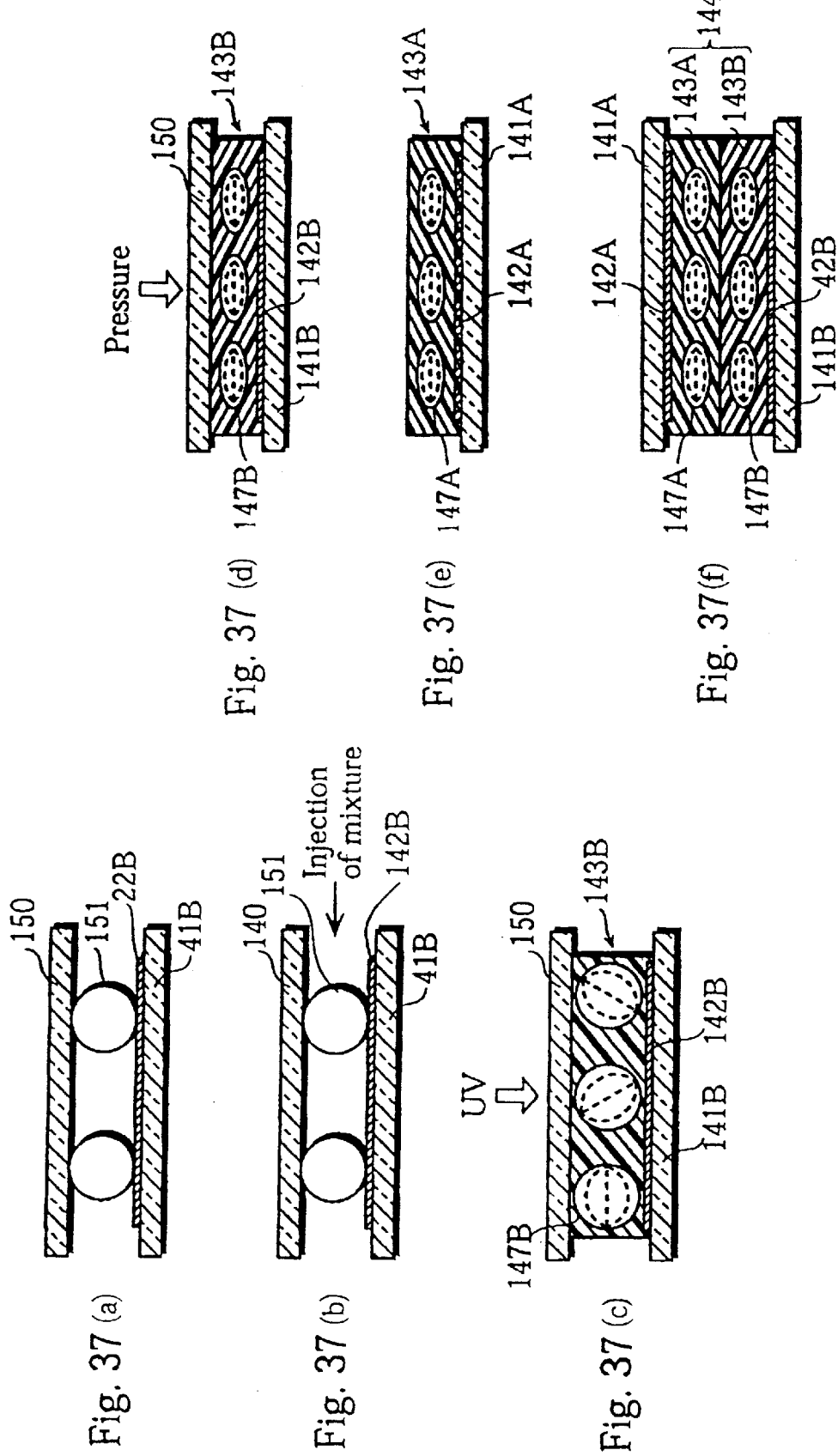
FIGS. 37(a)–(f) are production processes diagram of the liquid crystal display element of Example 2 of the 3rd Embodiment of the invention.

Next, as shown in FIG. 37(a), the glass substrate 141B and a glass substrate 150 for forming the polymer liquid crystal complex layer are laminated together with spacers 151 of a grain size of 2 μm interposed between the substrates 141B, 150 to keep the distance between them uniform. While the transference electrode 142B is formed on the glass substrate 141B, no transference electrode is formed on the glass substrate 150. This is because the glass substrate 150 which is intended specifically for use in forming the polymer liquid crystal complex layer is peeled off from the polymer liquid crystal complex layer 143B after formation of the polymer liquid crystal complex layer 143B, so that it does not form any element of the liquid crystal display element. Because of this, a plastic film, for example, may be used instead of the glass substrate 150.

Next, as shown in FIG. 37(b), the mixed solutions is introduced in between the substrates 141B, 150.

Then, as shown in FIG. 37(c), the mixture injected in between the substrates 141B, 150 was irradiated with ultraviolet of dominant wavelengths of 365 nm and an intensity of 30 mW for 1 minute. By the photo polymerization from the irradiation of ultraviolet, the polymers and the liquid crystals are phase separated and a single-layer of polymer liquid crystal complex layer 143B was obtained. In the state shown in FIG. 37(c), the liquid crystal droplets 147B in the polymer liquid crystal complex layer 143B are spherical in shape and the liquid crystal molecules in the liquid crystal droplets 147B are oriented in different directions, rather than in parallel with the substrates. This was confirmed by the inventors observing the polymer liquid crystal complex layer 143B with a polarization microscope.

Figure 38:
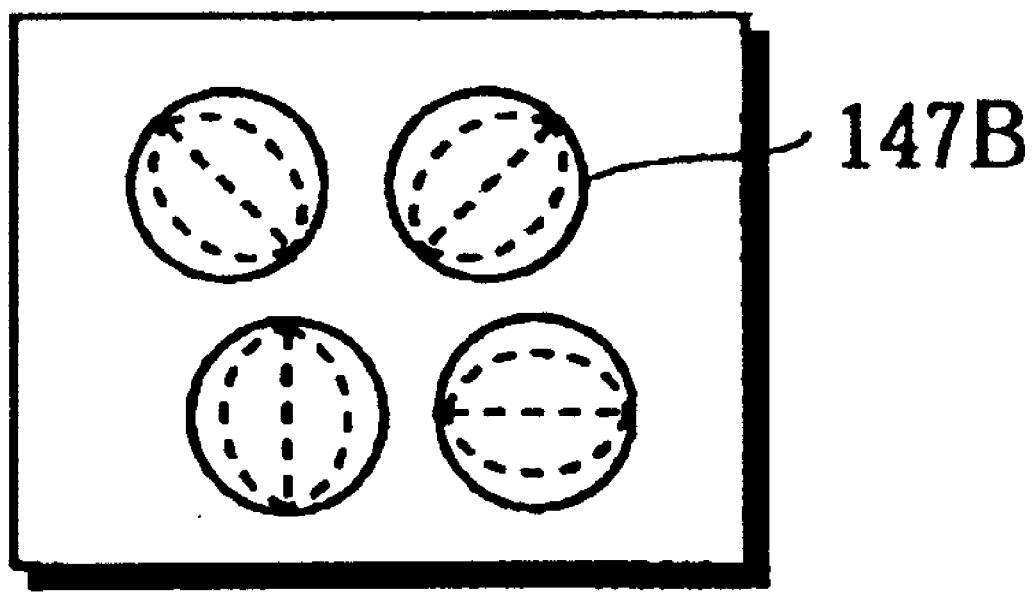
FIG. 38 is a view of a polymer liquid crystal complex layer 143B in the state shown in FIG. 37(d) as viewed from the top.

Next, as shown in FIG. 37(d), a pressure of 5 Kg/cm$^2$ was uniformly applied to the substrates 141B. 150 with, for example, a press to extrude a part of the liquid crystals in the liquid crystal droplets 147B out from between the substrates 141B, 150 and thereby the liquid crystal droplets 147B were deformed. When the deformed liquid crystal droplets 147B was observed with the polarization microscope, the liquid crystal molecules in the liquid crystal droplets 147B were found to be aligned nearly parallel with the substrate 141B and oriented randomly in a plane parallel to the substrate 141B, as shown in FIG. 38. However, for the sake of simplicity, the liquid crystal droplets 147B are depicted in FIG. 37(d) as if they were completely deformed and oriented in the uniform direction, but actually they were distorted. It was confirmed, however, that although the liquid crystal droplets 147B were distorted, the liquid crystal molecules in the liquid crystal droplets 147B were aligned in nearly parallel to the substrate 141B. Further, when the liquid crystal droplets were observed with a scanning electron microscope, the liquid crystal droplets 147B were discovered to be deformed into a compressed shape or a disc-like shape.

Next, as shown in FIG. 37(e), the substrate 150 was peeled off from the single layer of polymer liquid crystal complex layer 143B and was then used as a lower layer for forming the layered product 144.

Next, another single layer of polymer liquid crystal complex layer 143A was prepared in the same manner as shown in FIGS. 37(a)–(d) and was then used as an upper layer.

Next, as shown in FIG. 37(e), the upper layer and the lower layer were laminated together with confronting each other and then were sealed around the periphery, whereby the liquid crystal display element was prepared.

The characteristic tests performed by the inventors showed that the transmittance was 85%; the contrast was 100:1; and the driving voltage was 5V, and sufficient scattering effects were obtained.

Further, it was discovered that a higher contrast was achieved by increasing the number of layers; for instance, five polymer liquid crystal complex layers provided the contrast of 300:1 and the driving voltage of 10V.

If coloring matters of dichroism are added to the liquid crystal display element, such liquid crystal display element will be applicable to absorption type devices as well.

COMPARATIVE EXAMPLE 1

Except that the pressing process of Example 1 as shown in FIG. 37(d) is omitted, two, single-layer, polymer liquid crystal complex layers were formed in the same manner as in Example 2 and were laminated together as in the case of Example 2, whereby the liquid crystal display element was prepared as Comparative Example 1. The characteristics of Comparative Example 1 were measured under substantially the same conditions as those of Example 1. The results were that the transmittance was 85%; the contrast was 20:1; and the driving voltage was 7V. Thus, sufficient scattering effects were not obtained.

EXAMPLE 3

In Example 3, the liquid crystal molecules in the liquid crystal droplets 147A, 147B in the polymer liquid crystal complex layers 143A, 143B forming the layered product 144 are aligned in nearly parallel with the substrates 141A, 141B and also oriented in different directions in a plane parallel to the substrates 141A, 141B for each of the polymer liquid crystal complex layers 143A, 143B.

This constructed Example 3 can provide satisfactory scattering effects, as compared with the prior art, though it is slightly inferior, in characteristics, to the most preferable Example 2 which is constructed such that the liquid crystal molecules in each layer are aligned in nearly horizontal with the substrates and also oriented on a random basis in a plane parallel with the substrates. Though Example 3 takes an example of use of two layers, a increased number of layers enables alignments of the liquid crystals to come doser to an ideal.

Figure 39:
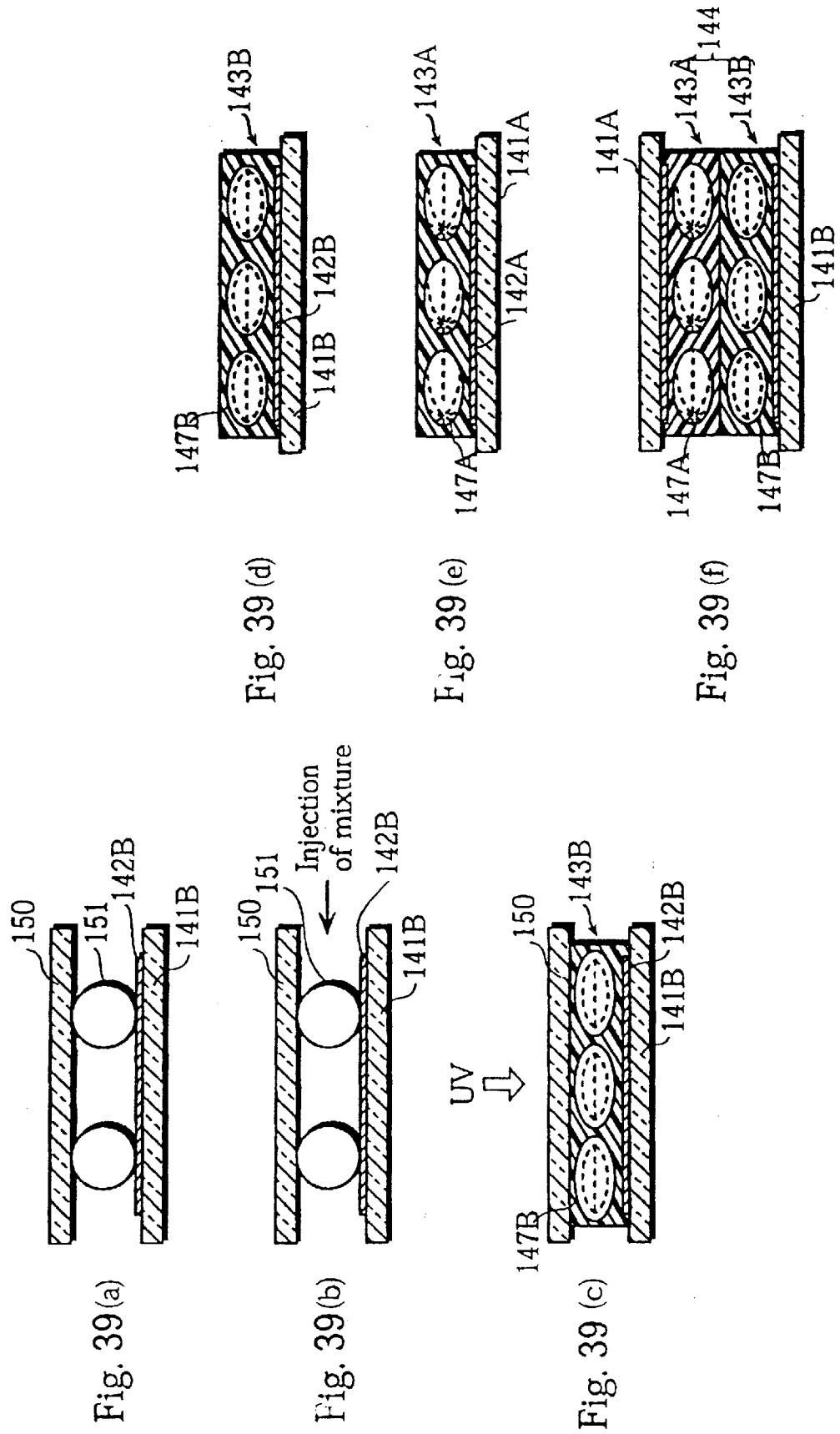
FIGS. 39(a)–(f) are production processes diagram of the liquid crystal display element of Example 3 of the 3rd Embodiment of the invention.
Figure 40:
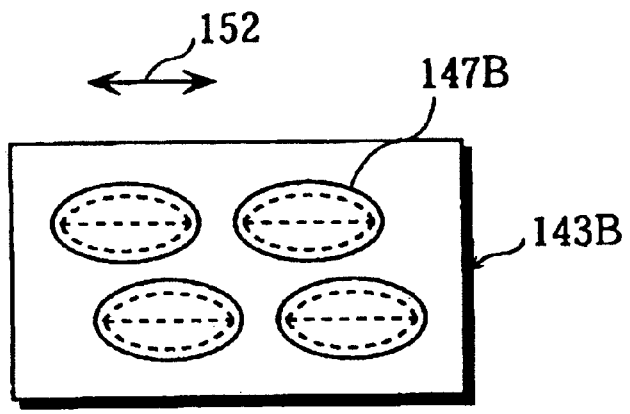
FIG. 40 is a view of a polymer liquid crystal complex layer 143B in the state shown in FIG. 39(d) as viewed from the top.

This constructed liquid crystal display element was produced in the following manner:

By the processes shown in FIGS. 39(a),(b) similar to those of Example 2 shown in FIGS. 37(a),(b), the mixture is injected in between the substrates 141B, 150. Thereafter, as shown in FIG. 39(c), the mixture was irradiated with ultraviolet with dominant wavelengths of 365 nm and an intensity of 30 mW via a polarizing element for 1 minute. The direction 152 of a polarizing axis of the polarizing element then orients in a lateral direction of the substrate 141B (the right and left direction in FIG. 40) as shown in FIG. 40. Through the photo polymerization by irradiation of the polarized ultraviolet, the polymers and the liquid crystals were phase separated to obtain a single-layer of polymer liquid crystal complex layer 143B in which liquid crystal droplets 147B are dispersed in the polymers 145B. It is known that the liquid crystal molecules in the liquid crystal droplets 147B would then be deposited along the direction 152 of the polarizing axis of the polarizing element. Accordingly, the liquid crystal molecules are aligned in nearly parallel with the substrate 141B (See. FIG. 39(c)) and also are oriented in the direction 152 of the polarizing axis in a plane parallel to the substrates, as shown in FIG. 40.

For confirmation on this, the inventors observed the polymer liquid crystal complex layer 143B with a polarization microscope and confirmed that the liquid crystal molecules were aligned in nearly parallel with the substrate and also are oriented in the direction 152 of the polymerizing axis. Also, the inventors observed a cross section of the liquid crystal droplets 147B with a scanning electron microscope and confirmed that the liquid crystal droplets 147B were a rod-like or football-like in cross section.

Next, as shown in FIG. 39(d), the substrate 150 was peeled off from the single layer of polymer liquid crystal complex layer 143B and was then used as a lower layer for forming the layered product 144.

Figure 41:
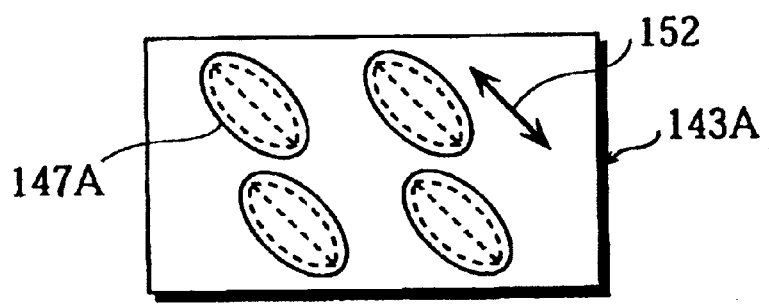
FIG. 41 is a view of a polymer-liquid crystal complex layer 143A in the state shown in FIG. 39(e) as viewed from the top.

Next, in basically the same manner as shown in FIGS. 39(a)–(d) another single layer of polymer liquid crystal complex layer 143A was prepared and was then used as an upper layer. It is noted here that difference between the polymer liquid crystal complex layer 143A and the polymer liquid crystal complex layer 143B is in the direction for the polarized ultraviolet to be irradiated when the polarized ultraviolet is applied for preparation of the layers, as shown in FIG. 39(c). Specifically, the polarizing axis of the polarizing element is oriented in the direction 152 shown in FIG. 41 for preparation of the polymer liquid crystal complex layer 143A, which is different from the direction 152 oriented in the direction 152 shown in FIG. 40 for preparation of the polymer liquid crystal Complex layer 143B. Accordingly, the liquid crystal molecules in the liquid crystal droplets 147A in the polymer liquid crystal complex layer 143A are aligned in nearly parallel with the substrate 141A (see FIG. 39(e)) and also are oriented in the direction 152 in a plane parallel to the substrate 141A, as shown in FIG. 40.

Figure 42:
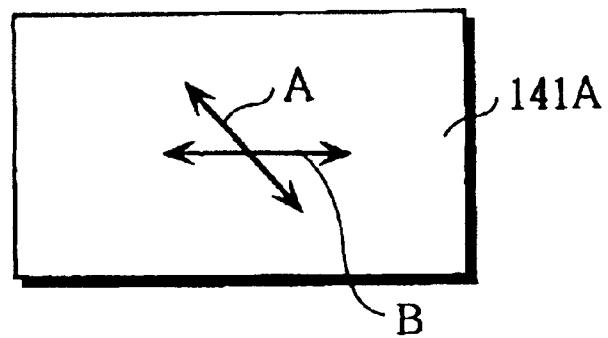
FIG. 42 is an illustration showing directions in which the liquid crystal molecules of the polymer liquid crystal complex layers 143A and 143B are oriented.

Next, as shown in FIG. 39(f), the upper layer and the lower layer were laminated together with confronting each other and then were sealed around the periphery, thereby preparing the liquid crystal display element. The liquid crystal display element thus produced have the upper layer and the lower layer which were made different from each other in orientations of the liquid crystal molecules in planes parallel to the substrates, as shown in FIG. 42. In FIG. 42, the reference mark A designates an orientation of the liquid crystal molecular alignments in the upper layer when viewed from the top of the substrate, and the reference mark B designates an orientation of the liquid crystal molecular alignments in the lower layer when viewed from the top of the substrate. The characteristic tests of the produced liquid crystal display element, which were performed by the inventors, showed that the transmittance was 85%; the contrast was 60:1; and the driving voltage was 5V.

In Example 3 in which the orientations of the liquid crystal molecules are controlled by the polarized light, although the liquid crystal molecules cannot be formed on a completely random basis in orientations in the direction parallel to the substrates, since orientations of the liquid crystals are made different for each layer, the obtained liquid crystal display element was superior to that of Comparative Example 1 in terms of contrast, though inferior to that of Example 1.

EXAMPLE 4

In Example 4, instead of the polarized ultraviolet of Example 3, a normally-used, non-polarized ultraviolet is irradiated and also magnetic field is added horizontally to the substrates at that time. The magnetic field strength was set 10 KG(gauss). The results of the observations with microscope and scanning electron microscope were the same as those of Example 3. Also, the characteristic tests of the produced liquid crystal display element, which were performed by the inventors, showed that the transmittance was 87%; the contrast was 70:1; and the driving voltage was 6V.

In Example 4, although the liquid crystal molecules cannot be formed on a completely random basis in the direction parallel to the substrates, since orientations of the liquid crystals are made different for each layer, the obtained liquid crystal display element was superior to that of Comparative Example 1 in terms of contrast, though inferior to that of Example 1.

In the above Examples 2 to 4, the liquid crystal display element is designed to have a two-tier structure, but the liquid crystal display element may be designed to have a laminated structure of three or more layers being laminated. Take the laminated structure with three or more layers corresponding to that of Example 2 for instance: First, the mixture is injected in between a pair of for-polymer liquid crystal complex layer-use glass substrates and then an interlayer use polymer liquid crystal complex layer is formed by substantially the same processes as those shown in FIGS. 37(c), 37(d). Thereafter, the pair of for-polymer liquid crystal complex layer-use glass substrates are peeled off from the interlayer use polymer liquid crystal complex layer to produce a single layer of an interlayer use polymer liquid crystal complex layer. These processes are repeated according to the required number of layers, to produce a plurality of interlayer use polymer liquid crystal complex layers. Then, an upper polymer liquid crystal complex layer 143A and a lower polymer liquid crystal complex layer 143B are laminated, with the plurality of interlayer use polymer liquid crystal complex layers being sandwiched between them. The liquid crystal display element having a laminated structure with three or more layers are thus obtained.

The liquid crystal display element having a laminated structure with three or more layers corresponding to those of Examples 3 and 4 can also be produced in basically the same manner as the producing manner for the laminated structure with three or more layers corresponding to the laminated structure of Example 2, except that the liquid crystal molecules in each layer are oriented differently for each of the layers.

Alternatively, this method may be modified such that a plurality of polymer liquid crystal complex layers are produced in advance and are sandwiched between the pair of substrates, so that the polymer liquid crystal complex layers are laminated each other and also the substrates and the polymer liquid crystal complex layers are laminated each other.

Further, in the above Examples 1 to 4, coloring matters of dichroism may be added to the liquid crystals. This can produce guest host mode of liquid crystal display element capable of absorbing light by means of the coloring matters of dichroism.

Further, in the above Example 1 to 4, different coloring matters of dichroism may be added for each of the layers, and also driving voltages may be varied for each of the layers. This can produce a multi-color-display. Also, different liquid crystal materials may be employed for each of the layers.

While the preferred form of the present invention has been described, it is to be understood that modifications will be apparent to those skilled in the art without departing from the sprit of the invention. The scope of the invention, therefore, is to be determined solely by the following claims.

What is claimed is:

1. A polymer dispersion type liquid crystal display element comprising:
    a pair of substrates, one of the substrates being an active matrix substrate having thin film transistors formed thereon;
    an electrode formed on an opposite surface of each of the substrates;
    polymers;
    liquid crystal droplets being deformed into a compressed structure compressed in a cell gap direction; and
    a polymer-liquid crystal complex held between the pair of substrates, the polymer-liquid crystal complex comprising the polymers and the liquid crystal droplets dispersed in the polymers;
    wherein:
        an amount of deformation of the liquid crystal droplets is set to be in range in which a phenomenon of liquid crystal molecules rising up in the cell gap direction is not caused by excluded volume effects of the liquid crystals;
    when an anchoring strength is represented by a driving voltage $V_{90}$, where $V_{90}$ is a driving voltage at a transmittance of 90%, the anchoring strength being an index showing the interaction of the polymers and liquid crystal at the phase boundary between the liquid crystal and the polymers, the anchoring strength is such that the driving voltage $V_{90}$ is in the range of about 7.5 V to about 12.5 V; and
        a deformation rate of the liquid crystal droplets is 20% or lower.

2. A polymer dispersion type liquid crystal display element according to claim 1, wherein the liquid crystal droplets are formed such that liquid crystal and polymer are phase separated by photopolymerization using ultraviolet irradiation.

3. A polymer dispersion type liquid crystal display element comprising:
    a pair of substrates, one of the substrates being an active matrix substrate having thin film transistors formed thereon;
    an electrode formed on an opposite surface of each of the substrates;
    polymers;
    liquid crystal droplets being deformed into a compressed structure compressed in a cell gap direction; and
    a polymer-liquid crystal complex held between the pair of substrates, the polymer-liquid crystal complex comprising the polymers and the liquid crystal droplets dispersed in the polymers;
    wherein:
        an amount of deformation of the liquid crystal droplets is set to be in range in which a phenomenon of liquid crystal molecules rising up in the cell gap direction is not caused by excluded volume effects of the liquid crystals;
        when an anchoring strength is represented by a driving voltage $V_{90}$, where $V_{90}$ is a driving voltage at a transmittance of 90%, the anchoring strength being an index showing the interaction of the polymers and liquid crystal at the phase boundary between the liquid crystal and the polymers, the anchoring strength is such that the driving voltage $V_{90}$ is less than about 7.5 V; and
        a deformation rate of the liquid crystal droplets is 10% or lower.

4. A polymer dispersion type liquid crystal display element according to claim 3, wherein the liquid crystal droplets are formed such that liquid crystal and polymer are phase separated by photopolymerization using ultraviolet irradiation.

5. A method for producing a polymer dispersion type liquid crystal display element, the method comprising:
    the first step in which a mixture including liquid crystal materials and photo polymerizable monomers is injected between a pair of substrates; and
    the second step in which after the first step, the polymerizable monomers are irradiated with ultraviolet to allow polymers and liquid crystals to be phase separated by photo polymerization, to form a polymer-liquid crystal complex in which the liquid crystal molecules are oriented substantially parallel to the substrates and oriented randomly in a plane parallel to the substrates;
    wherein the mixture before polymerization shows a liquid crystal phase.

6. A method according to claim 5, wherein, in the liquid crystal-polymer complex, liquid crystal droplets are dispersed in a polymer.

7. A method according to claim 6, wherein molecular alignments of the mixture showing the liquid crystal phase are in parallel to a phase boundary of the substrates.

8. A method according to claim 6, wherein the polymerizable monomers are liquid crystal monomers.

9. A method according to claim 6, wherein the pair of substrates are given no rubbing treatment.

10. A method according to claim 6, wherein at least one substrate of the pair of substrates is given a rubbing treatment in several directions.

11. A method according to claim 6, wherein fine asperities are formed on at least one substrate of the pair of substrates.

* * * * *